United States Patent [19]
Tsukamoto et al.

[11] Patent Number: 5,902,715
[45] Date of Patent: May 11, 1999

[54] METHOD OF FORMING A MIRROR IN A WAVEGUIDE

[75] Inventors: Koji Tsukamoto; Takeshi Ishitsuka; Tetsuzo Yoshimura; Katsusada Motoyoshi; Yasuhiro Yoneda, all of Kawasaki, Japan

[73] Assignee: Fujitsu Limited, Kawasaki, Japan

[21] Appl. No.: 08/831,973

[22] Filed: Apr. 2, 1997

Related U.S. Application Data

[62] Division of application No. 08/554,499, Nov. 7, 1995.

[30] Foreign Application Priority Data

| Nov. 9, 1992 | [JP] | Japan | 4-298920 |
| Sep. 8, 1993 | [JP] | Japan | 5-223723 |
| Mar. 7, 1995 | [JP] | Japan | 7-47604 |
| Mar. 20, 1995 | [JP] | Japan | 7-60770 |

[51] Int. Cl.$^6$ ............... G03C 5/00; C03B 37/023; G02B 6/10
[52] U.S. Cl. ............... 430/290; 65/385; 65/425; 385/130
[58] Field of Search ............... 430/290, 97, 280.1, 430/281.1; 65/385, 425; 385/130

[56] References Cited

U.S. PATENT DOCUMENTS

| 4,487,475 | 12/1984 | Ogawa | 350/96.21 |
| 4,695,306 | 9/1987 | Hakoun et al. | 65/152 |
| 4,784,458 | 11/1988 | Horowitz et al. | 350/96.21 |
| 4,789,620 | 12/1988 | Sasaki et al. | 430/280 |
| 4,825,092 | 4/1989 | Mehadji | 250/561 |
| 4,854,667 | 8/1989 | Ebata et al. | 350/96.2 |
| 4,958,892 | 9/1990 | Jannson et al. | 350/3.6 |
| 4,958,897 | 9/1990 | Yanagawa et al. | 350/96.15 |
| 4,971,418 | 11/1990 | Dorsey et al. | 350/96.21 |
| 5,054,872 | 10/1991 | Fan et al. | 385/130 |
| 5,208,629 | 5/1993 | Matsuo et al. | 355/53 |
| 5,263,111 | 11/1993 | Nurse et al. | 385/130 |
| 5,285,516 | 2/1994 | Wong | 385/140 |

FOREIGN PATENT DOCUMENTS

| 0 125 710 | 11/1984 | European Pat. Off. . |
| 0 129 443 | 12/1984 | European Pat. Off. . |
| 0 320 947 | 12/1988 | European Pat. Off. . |
| 0 323 563 | 7/1989 | European Pat. Off. . |
| 0 324 480 | 7/1989 | European Pat. Off. . |
| 0 324 481 | 7/1989 | European Pat. Off. . |
| 0 420 027 | 9/1990 | European Pat. Off. . |
| 0 491 366 | 12/1991 | European Pat. Off. . |
| 53-018452 | 9/1978 | Japan . |
| 55-17153 | 2/1980 | Japan . |
| 55-043538 | 3/1980 | Japan . |
| 60-173508 | 9/1985 | Japan . |
| 64-6909 | 1/1989 | Japan . |

(List continued on next page.)

OTHER PUBLICATIONS

Teji Uchida et al., "Optical Surface Mount Technology", Jpn. J. Appl. Phys., vol. 31, (1992), Part 1, No. 5B, May 1992, pp. 1652–1655.

(List continued on next page.)

*Primary Examiner*—John A. McPherson
*Assistant Examiner*—Rosemary Ashton
*Attorney, Agent, or Firm*—Armstrong, Westerman, Hattori, McLeland & Naughton

[57] ABSTRACT

A method of forming a mirror in a waveguide, including the steps of forming a layer constituting a waveguide in a substrate and forming a mirror-finished surface at a boundary between a portion irradiated with radiation and a non-irradiated portion by obliquely irradiating a layer constituting the waveguide with radiation. The waveguide may be composed of a photosensitive material, and either the irradiated area on the non-irradiated area may be removed by solvent. The waveguide may be composed of a refractive index imaging material in which a refractive index distribution is formed by irradiation with radiation or the refractive index may be increased by heating the irradiated portion. The refractive index imaging material may include a catalyzer to assist in increasing the refractive index distribution of the irradiated area.

8 Claims, 33 Drawing Sheets

FOREIGN PATENT DOCUMENTS

| | | |
|---|---|---|
| 2-3081 | 1/1990 | Japan . |
| 3-36582 | 2/1991 | Japan . |
| 3-50588 | 3/1991 | Japan . |
| 6-148455 | 5/1994 | Japan . |
| 1 408 586 | 11/1972 | United Kingdom . |
| 1 482 996 | 11/1974 | United Kingdom . |
| 2 067 210 | 7/1981 | United Kingdom . |
| 2 143 650 | 7/1984 | United Kingdom . |
| 2 185 127 | 12/1986 | United Kingdom . |
| 2 189 048 | 4/1987 | United Kingdom . |
| 91 03751 | 2/1991 | United Kingdom . |
| 2 252 842 | 1/1992 | United Kingdom . |

OTHER PUBLICATIONS

Fusao Shimokawa et al., "Fabrication of Fluorinated Polyimide Waveguides on Copper–Polyimide Multilayer Substrates for Opto–Electronic Multichip Modules", Proc. of 43rd ECTC, pp. 705–710, (May 1993).

Morio Kobayashi et al., "Hybrid Optical Integration Technology", The Institute of Electronic Information Communications, bulletin, C–I, vol. J77–C–I, No. 5, pp. 340–351.

Jun'ichi Sasaki et al., "Self–aligned Assembly for Optical Devices Using AuSn Solder Bump Bonding", Technical Report of IEICE., OQE93–145, (1993–12), pp. 61–66.

Teiji Uchida et al., "Mounting of an Optical SMD on an Optical PWB", The Institute of Electronic Information Communications in Japan, National Spring Meeting 1993, C–277, p. 4–313.

Hideyuki Takahara et al., "Optical Waveguide Interconnection for Optoelectronics Multichip Modules", Technical Report of IEICE., CPM93–80, (1993–10), pp. 35–40.

M. Itoh et al., "Optical coupling between photodoiode and single–mode fiber using a solder bump", The Institute of Electronic Information Communications in Japan, National Autumn Meeting 1993, C–192, p. 4–272.- light light

METHOD OF FORMING A MIRROR IN A WAVEGUIDE

This is a divisional of application Ser. No. 08/554,499 filed Nov. 7, 1995, now pending.

BACKGROUND OF THE INVENTION

1. Field of the Invention

The present invention relates to a method of coupling optical parts, particularly to a method for coupling optical part such as optical waveguides, optical devices, optical fibers, and lends in optical communication and optical interconnection and to a material used for coupling the optical parts, and relates to a method of forming a mirror.

2. Description of the Related Art

An optical circuit is used for various optical information processing systems including optical interconnection and optical communication. In the optical circuit, a light outputted from a light source such as an LD and a light-emitting diode is transmitted through a waveguide or an optical fiber and optical signal of the light is converted further into an electric signal by means of a photodiode or the like. Thus, in order to manufacture an optical circuit, an optical coupler for coupling the light source with an optical fiber and an optical waveguide and an optical coupler for coupling the optical fiber with an optical fiber or an optical waveguide become necessary.

Further, while further diffusion and high advancement of an optical technique are being expected, drastic technical innovation on packaging of optical devices is demanded. Namely, module packages that are used easily, manufactured easily and provided inexpensively become necessary. When the development process of electronics is discerned, what is lacking mostly in optical packaging is producibility, and optical device surface packaging (optical surface mounting technology SMT) is proposed for the purpose of meeting such requirements. For example, it is described in a document [1] that labor is reduced by mounting optical device packages each containing a lens automatically on a printed board where the optical waveguide is arranged.

[1] Uchida T., Masuda Y. and Akasawa M.: Optical Surface Mount Technology, J.J.A.P., 31, Pt. 1. 5B, pp 1652–1655, May 1991

Further, as to the technique of mounting optical devices in a hybrid manner on the optical waveguide, detailed examination is carried forward with a quartz waveguide on a silicon substrate. This examination is described in the document [2].

[2] Kobayashi M. and Kumiharu K.: Hybrid Optical Integration Technology, The institute of electonic information communications, bulltine, C-I Vol. J77-C-I No.5, pp. 340–351

It is the subject in this case how precisely to fix the chip on a mother board, and attention is being given to a self-alignment method using solder bump that is described in the document [3]. Although there are various subjects such that solder is to be reflown with high positional precision or influence by flux on optical devices, various devices are being made.

[3] Sasaki J., Ito M., Honmou H. and Kanayama Y.: Self-Alignment Packaging of Optical Devices by AuSn Bump Coupling, Shingaku Technical Bulletin, OQE93-145, 1993-12.

Further, the multi chip module (MCM) technique in electronics is applied to the bump packaging on the mother board that is performed in order to simplify modularization of array elements. The research of optoelectronic hybrid MCM that an optical device has been taken into the MCM has also begun to take shape already. This research has been reported in the document [4] for instance.

[4] Shimokawa F., Koike S and Matsuura T.: Fabrication of Fluorinated Polyimide Waveguides on Copper-Polyimide Multilayer Substrates for Opto-Electronic Multichip Modules, Proc. of 43rd ECTC, pp. 705–710, May 1993

In order to realize such optical device surface packaging, it is required to emit a waveguide light advancing within a waveguide formed in a plane by some method or other out of the plane and to make the light from the outside of the plane incident into the waveguide in the plane. To meet such requirements, various methods have been proposed. For example, a processing method of cutting a waveguide obliquely using a dicing saw or the like is described in the document [5] as a method of forming a reflecting mirror by working the waveguide end obliquely, and a method of etching obliquely by reactive ions is also described in the document [6].

[5] Uchida et al.: The Institute of Electronic Information Communications in Japan, National Spring Meeting 1993, C-277

[6] Takahara H., Koike S. and Matsui S.: Optical Interconnection Technique of Optoelectronic Hybrid MCM, Shingaku Technical Bulletin, CPM 93-80, 1993-10

Furthermore, a method of utilizing solder bump at the waveguide end as a reflecting mirror has been proposed in the document [7].

[7] Ito M., Honmo H. and Sasaki J.: PD-SMF Optical Coupling Using Solder Bump, the Institute of Electronic Information Communications in Japan, National Autumn Meeting 1993, C-192

However, since the method of mechanically cutting a waveguide obliquely shows low precision in a processing position, it is not only unsuitable for a minute single-mode type optical circuit, but is neither suitable for mass production. Further, although the method of etching obliquely with reactive ions can obtain high processing precision since the photolithography technique is applicable, the etching rate therein is comparatively slow. Thus, the etching time gets longer and the throughput is lowered when an object of processing is thick.

Further, in the method of utilizing solder bump as a reflecting mirror, it is required to place the solder bump with high accuracy at the waveguide end, and moreover it is required to form the solder bump into a desired configuration, either of which cannot be performed easily.

Now, when optical devices such as an optical waveguide and an optical fiber are optically coupled with each other, a method of polishing light incident ends or light emitting ends of optical devices and fixing them thereafter while butting against each other is adopted. This method is referred to as a direct coupling method.

In order to obtain high optical coupling efficiency in any of the methods described above, however, it is required to have electromagnetic field distributions in the waveguide and the optical fiber match with each other sufficiently. Therefore, it is required to have the thickness of the waveguide layer and optical fiber core diameters coincide with each other and also to reduce axial divergence (deviation) and angle divergence between them at the same time.

To realize this, it is necessary to accurately align the coupling faces between optical parts. However, it is not easy to improve the alignment accuracy. Therefore, a method for easily and efficiently optically-coupling optical parts such as optical fibers and optical devices is desired.

FIGS. 1 (a) to 1 (c) show a general step for optical-coupling two optical fibers.

These optical fibers 1 and 2 have a structure in which cores 1a and 2a are enclosed by cladding 1b and 2b and the cores 1a and 2a have larger refractive index than the cladding 1b and 2b.

To optically couple the optical fibers 1 and 2, as shown in FIG. 1 (a), the optical fiber 2 is secured to a fiber securing portion 3 and the optical fiber 1 is set to a mobile stage 4. Then, an operator moves the mobile stage 4 while observing it with a microscope 5 to accurately align the edge of the core 2a of the optical fiber 2 with that of the core 1a of the optical fiber 1 as shown in FIG. 1 (b). After the alignment is completed, the joint between the optical fibers 1 and 2 is welded with an arc discharge apparatus 6.

However, the above method for optically coupling optical parts has a problem that optical coupling between optical parts cannot easily be performed because it is necessary to previously perform accurate alignment.

A measure for solving the above problem is desired for optical coupling between optical fibers or a coupler for optically coupling a light-emitting device or light-detecting device with an optical fiber or optical waveguide.

To accurately couple optical parts, Japanese Patent Laid-Open Nos. Sho. 53-108452 and Sho. 64-6909 disclose a method for melting the edges of two optical fibers and coupling them by surface tension. However, these prior art references only disclose the coupling between optical fibers but do not disclose the coupling between other optical parts.

Moreover, accurate optical coupling between optical parts is considered by using couplers.

These couplers are described in the following documents.

[8] Optical Communication Device Optics—Light-Emitting and Light-Detecting Devices, Hiroo Yonezu, Kogakutosho, Japan

[9] Optical Fiber Technology In ISDN Age, Katsuhiko Okubo, Rikogakusha, Japan

[10] Optical Communication Handbook, Edited by Hiroshi Hirayama et al., Kagakushinbunsha, Japan These documents show that an edge emitting laser has a rectangular structure with an active layer of approximately hundreds of nanometers by several microns and its radiation angle ranges between 20 and 60° in the vertical direction and between 5° and 20° in the horizontal direction. A surface emitting LED has a large emitting region diameter of 30 to 40 $\mu$m and a radiation angle of approximately 120°.

In this connection, a single-mode optical fiber has a core diameter of several to 10 microns and a multiple-mode optical fiber has a core diameter of several tens of microns. Therefore, to couple an optical semiconductor device with an optical fiber, accurate alignment along the order of 1 micron is desirable to decrease the coupling loss.

When accurately aligning and directly coupling a light-emitting device with an optical fiber by contacting the edge of the device with that of the fiber, more specifically, for direct coupling of an edge emitting laser with a single-mode optical fiber, the coupling efficiency approachs 30%. For direct coupling of the edge emitting laser with a multiple-mode optical fiber, the coupling efficiency approachs 50%. For direct coupling of a surface emitting LED with the multiple-mode optical fiber, the coupling efficiency approachs approximately 6%.

A method for setting a lens between an edge emitting laser and single-mode optical fiber has been proposed as a method for coupling the laser with the fiber. In this case, the coupling efficiency is approximately 50%. However, optical coupling becomes further difficult because the number of parts requiring accurate alignment increases.

For direct coupling of an optical fiber with a waveguide, a coupling efficiency of 56 to 79% is obtained by equalizing the core diameter of the waveguide edge diameter with that of the optical fiber and preventing misalignment of axes.

However, there is a problem that the direct coupling of the waveguide with the optical fiber is not easy because the core diameters of the waveguide and optical fiber are limited and accurate alignment at 1 $\mu$m order is desired.

Moreover, a method different from the above direct coupling and lens coupling methods is proposed. In Japanese Patent Laid-Open Nos. Sho. 55-43538 and Sho. 60-173508, it is proposed to use a material whose refractive index changes by applying light to the material.

However, the optical coupler connection method proposed in Laid-Open No. Sho. 55-43538 includes a method for manufacturing an optical coupler characterized by applying light to the optical coupler substrate made of a material whose refractive index changes proportionally to a light intensity from a position where light should be inputted or outputted and changing the refractive index of the optical coupler substrate so as to form an optical waveguide in self-alignment. To use the optical coupler, it is necessary to arrange and secure optical parts including optical fibers to be coupled by the optical coupler. Therefore, for example, a hole for inserting an optical fiber is formed on the optical coupler.

In Laid-Open No. Sho.60-173508, an optical waveguide connection method is proposed which is characterized by setting a phase-charge-type photosensitive medium material between two waveguides facing each other, applying light to the photosensitive medium material from the both waveguides, and locally denaturalizing the photosensitive medium so as to form a waveguide for optical coupling.

The reference to set a photosensitive medium material between waveguides to be mutually connected, form a waveguide for optical coupling in it, and thereby decrease a loss due to misalignment of optical axes and it is preferable to set the interval between waveguides to 0.1 mm or less and use ultraviolet rays as the light to be applied to the photosensitive medium material. As a result, though the light spreads due to diffraction in the photosensitive medium material, a waveguide for coupling with a small spread is formed. The optical coupling disclosed in this reference uses connection between waveguides formed in the photosensitive medium and misalignment between waveguides to be connected is also taken over between waveguides in the photosensitive medium. Therefore, it is impossible to correspond to a large misalignment exceeding a core diameter.

The following materials can be used for the optical coupler.

For example, Laid-Open No. Sho. 55-43538 mentioned above discloses that a chalcogenide-based amorphous semiconductor or macromolecular material containing photopolymerizable monomer is used for the optical coupler and Laid-Open No. Sho. 60-173508 discloses that the photopolymer made by DU PONT LIMITED, Photoresist KPR (trade name) made by KODAK LOMITED, and U.V. 57 (trade name) made by OPTION CHEMICAL LIMITED are known.

The following are refractive-index imaging materials whose refractive indexes change by applying light to them.

For example, Japanese Patent Laid-Open No. Hei. 2-3081 discloses a material made of thermoplastic polymers, ethylene-based unsaturated monomers, and polymerization initiator. Japanese Patent Laid-Open No. Hei. 2-3082 discloses a material made of interpolymers containing such segments as polyvinyl acetate, polyvinyl butyral, polyvinyl acetal, and polyvinyl formal as the main part, or made of polymerizable binder selected among groups made of the mixture of the segments, ethylene-based unsaturated monomers, and an optical initiator. Japanese Patent Laid-Open No. Hei. 3-50588 discloses a material made of solvent-soluble fluorine-contained polymerizable binder, ethylene-based unsaturated monomers, and photopolymerization initiator. Moreover, Japanese Patent Laid-Open No. Hei. 3-36582 discloses a material made of allyl diglycol carbonate, 2,2,-bis{3,5-dibromo-4-(2-mathasryroiloxiethoxy) phenyl} propane, and a photopolymerization initiator.

However, these materials have a low heat resistance because they use thermoplastic resin and methacryroil-based polymeric products as a binder.

SUMMARY OF THE INVENTION

It is an object of the present invention to provide an optical part coupling method for simplifying optical coupling between optical parts and improving optical coupling efficiency.

Furthermore, it is an object of the present invention to provide a method of forming an optical waveguide and a method of optically coupling optical devices having high processing accuracy and capable of improving throughput.

According to the present invention, a first optical waveguide is coupled with a second optical waveguide by relatively movably retaining the waveguides, facing the optical coupling faces of the waveguides with each other, and fusing the optical coupling faces of the waveguides to each other.

When the optical coupling faces of the first and second optical waveguides are fused, surface tension works on the fused portions. In this case, because the first and second optical waveguides are relatively movably retained, the first and second optical waveguides relatively move each other by the fact that the surface tension works on the fused portions.

Because the surface tension works so as to minimize the surface area of a fused object in general, the first and second optical waveguides move in the direction in which the surface areas of the fused portions of the waveguides are minimized. As a result, the waveguides are coupled under the state in which the optical axes of the waveguides are almost completely aligned and the optical coupling efficiency is maximized.

Further, according to the present invention, a photosensitive material is applied to an end portion (face) of an optical device, the photosensitive material is sensitized by irradiation emitted from an optical device thereafter, and a portion of the photosensitive material that has not been sensitized is removed by a solvent (in case of a negative type). As a result, a waveguide is formed with high accuracy and easily at the light incident end or the light emitting end of the optical device.

Further, when optical devices in which these waveguides have been formed are optically coupled with each other, those waveguides are connected by fusing and a force arised in a direction of bringing optical devices close to each other by surface tension at the time of fusion. Thus, the accuracy of optical coupling is improved, and the throughput is also improved.

Further, since a layer of a material for improving the wettability of a waveguide (photosensitive material) in a fused state is formed between the end face of the optical device and the photosensitive material, no positional deviation of the fused waveguide is caused when the waveguides are coupled optically, thus making highly precise optical coupling possible.

Further, since a mirror finished surface is formed at a boundary between a portion irradiated with radiation and a non-irradiated portion by irradiating the layer forming a waveguide with radiation obliquely, the mirror finished surface is formed easily and with high accuracy, which is suitable for mass-producibility.

According to another aspect of the present invention, optical parts are optically coupled with each other by securing the coupling faces of optical parts so that the parts face each other at an interval, feeding an adhesive refractive-index imaging material between the optical parts, applying light to the material from at least one of the parts, and thereby forming a refractive index distribution having the beam-condensing lens effect.

To form the beam-condensing refractive-index distribution, it is necessary to keep the distance between the optical parts at 0.1 mm or more. This condition is contrary to the condition preferred to form a waveguide disclosed in Japanese Patent Laid-Open No. Sho. 60-173508. It is desirable to use a long-wavelength light for the light for forming a refractive index in order to increase the spread of a beam after emitted from the optical part. However, it is easier to increase the distance between the optical parts because the spread of the beam is also limited depending on a characteristic such as the photosensitive wavelength zone of the refractive-index imaging material.

Thus, the coupling efficiency between the optical parts is improved by a refractive-index imaging material, a high accuracy is not needed for alignment of the parts, and the yield is improved. Moreover, because the optical parts to be coupled are secured and the refractive-index imaging material is supplied before the refractive-index distribution is formed by using the light emitted from the optical part, the refractive-index distribution is formed in self-alignment in accordance with the positions where the optical parts are secured. Therefore, the optical parts can be secured by rough alignment and moreover, the labor for forming optical fiber inserting holes to arrange and secure the devices to be coupled is unnecessary.

According to still another aspect of the present invention, alicyclic epoxy, chain epoxy, organic denatured silicone, and copolymer having an ethylene unsaturated compound having a hydroxyl group at the end in its building block or copolymer having an ethylene unsaturated compound containing silicone in its building block are used as the binder constituting the refractive-index imaging material used for optical coupling of optical parts. Moreover, a mixture having multifunctional acrylate or multifunctional methacrylate and an ethylene unsaturated monomer containing aromatic rings or halogen are used as the optical reaction monomer constituting the refractive-index imaging material. Furthermore, an optical initiator is contained in the refractive-index imaging material.

The above refractive-index imaging material is able to form a refractive-index distribution only by applying light and moreover, able to core by heating a binder compound of applying light because a compound having the above reactive group can be used as a binder, and has a high durability. Furthermore, when using the refractive-index imaging material, a refractive-index distribution having a lens effect of a high refractive index is formed in accordance with a light intensity because the monomer density in the region where monomers are polymerized by applying light with a certain wavelength increases. After optical devices are coupled by using the refractive-index imaging material and a refractive-index distribution having a lens effect is formed by applying light from the optical devices, unreacted monomers in the material react by either light application or heating.

By using the above coupling method and refractive-index imaging material, optical parts are efficiently coupled by rough alignment.

According to the present invention, a plurality of optical elements are coupled optically with one another using a refractive index imaging material (an optical refractive index material or a photosensitive material) in which there is no change in refractive index distribution at time of light irradiation in a specific wavelength band and a high refractive index image is produced in the light irradiation area by activation processing after the irradiation. As such a refractive index imaging material, there is a material having a chemical amplification operation, which is composed of, for example, a compound having a functional group of cationic polymerization nature and a material having a photocatalytic effect.

Otherwise, a plurality of optical elements are coupled optically with one another using a refractive index imaging material in which the refractive index distribution is increased at time of light irradiation in a specific wavelength band and the refractive index of the refractive index distribution is increased by activation processing after the light irradiation.

As a result, a higher refractive index distribution (image) is not formed at a point of time when light is irradiated in these refractive index imaging materials. Therefore, it does not occur that a higher refractive index distribution (image) not becomes narrower and not becomes broader depending on the irradiation time with light.

As activation processing thereof, heating processing is used.

Further, it is possible to restrain the refractive index imaging material from flowing and spreading by forming a groove in the area where the refractive index imaging material is filled.

DESCRIPTION OF THE PREFERRED EMBODIMENTS

The First Embodiment

Figure 1A:
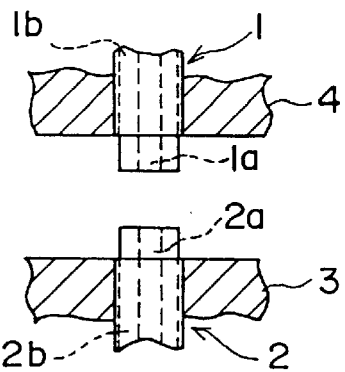
FIGS. 1 (*a*) to 1 (*c*) are side views showing an existing optical coupling method.

FIGS. 2(a), 2(b), 3(a) and 3(b) show the optical coupling steps of the first embodiment of the present invention.

In these figures, symbols 11 and 12 are first and second optical parts, and concretely they show optical fibers.

The optical fibers 11 and 12 comprise cores 11a and 12a in which light is confined, cladding 11b and 12b for concentrically enclosing the cores 11a and 12a, and jackets 11c and 12c for protecting the cladding 11b and 12b.

The refractive index of the cores 11a and 12a is larger than the refractive index of the cladding 11b and 12b. The light incoming from the edge of an optical fiber is confined in the cores 11a and 12a and propagates in the optical fiber.

The cores 11a and 12a and the cladding 11b and 12b use a fusible optical waveguide material. Though the optical waveguide material is not restricted as long as it is fused by heating and transparent for guided light, organic materials and glass are particularly desirable.

For example, organic materials include thermoplastic resins such as polymethyl methacrylate, polystyrene, polyester, polycarbonate, polyolefin, styrene-methylmethacrylate copolymer, styrene-acrylonitrile copolymer, and poly-4-methylpentene-1-polyvinyl chloride. Moreover, it is possible to use thermosetting or photo-curing resins such as epoxy resin, polyamide, crosslinkable polyester, crosslinkable polyacrylate, and silicon in order to improve the heat resistance and mechanical strength after fusion.

Furthermore, it is possible to thermopolymerizable or photopolymerizable monomers such as styrene, methacrylate, acrylate, acrylic compound, and isocyanate compound.

It is also possible to use hybrid materials made by mixing the above resins and monomers.

Moreover, it is possible to properly add polymerization initiator to the mixed hybrid materials so as to quickly start polymerization by heat or light. Furthermore, it is possible to use a proper additive to the materials in order to adjust the properties such as the viscosity, fusing temperature, refractive index, and transparency of them. In this case, even if the material is liquid, it is possible to fuse it by increasing the viscosity of the material.

The glass material can use soda glass, pyrex, or quartz. It is also possible to add a proper additive to the material in order to adjust the properties of the material such as the fusing temperature, refractive index, and transparency.

The following is the description of optical coupling of an optical fiber.

An optical fiber 11 is set to a movable retainer 13. In the movable retainer 13, a fiber securing portion 13a is coupled with a movable fiber retaining portion 13b for retaining the optical fiber 11 by a spring 13c and the movable fiber retaining portion 13b is kept movable. The optical fiber 11 is secured to the movable fiber retaining portion 13b and kept movable relative to a fiber securing portion 13a.

The movable fiber retaining portion 13b is constituted so that it is movable from a fixed retainer 14 for retaining an optical fiber 12 in order to position the optical coupling face 11b (edges of the core 11a and clad 11b) of the optical fiber 11 and the optical coupling face 12d (edges of the core 12 and clad 12b) of the optical fiber 12. These optical coupling faces 11d and 12d are optically coupled to each other by moving the movable fiber retaining portion 13b of the movable retainer 13 from the fixed retainer 14, and facing and contacting the optical coupling face 11d and the optical coupling face 12d each other so that the faces are overlapped in at least 10% of the areas respectively.

When the optical fibers 11 and 12 contact each other, the position of the fiber securing portion 13a of the movable retainer 13 is fixed. In this case, it is not necessary to position the optical fibers so that the edges of the both fibers are accurately aligned.

Figure 3A:
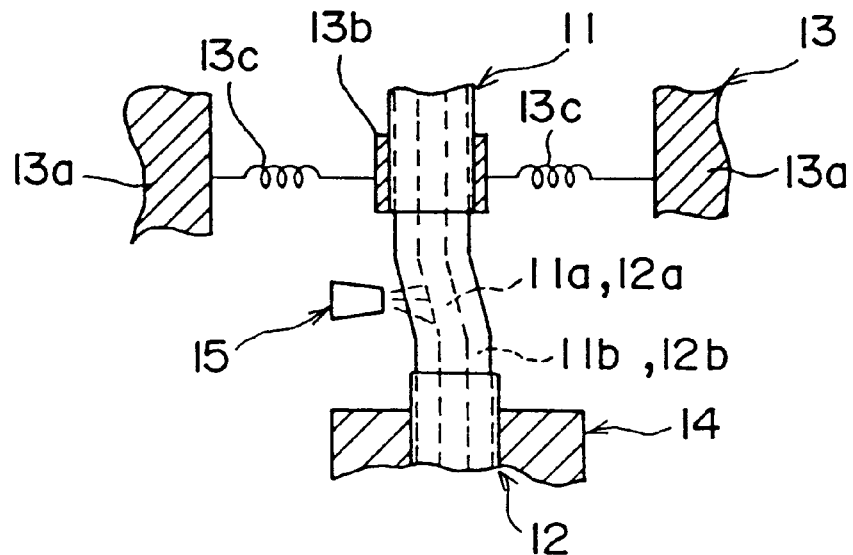
Figure 3B:
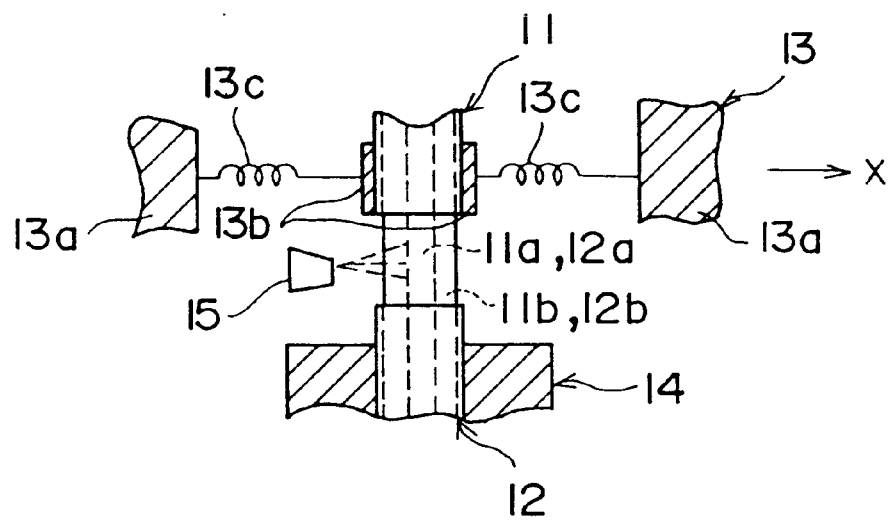

As shown in FIG. 3(a), the joint between the optical coupling face 11d of the optical fiber 11 and the optical coupling face 12d of the optical fiber 12 is heated by a heater 15 using arc discharge to fuse the cores 11a and 12a.

Thereby, the cores 11a and 12a and the cladding 11b and 12b are fused and united into one body and surface tension works on the surfaces of the cladding 11b and 12b to minimize the surface area of the side of the joint between the cladding 11b and 12b. The surface areas of the cladding 11b and 12b are minimized when the center lines (optical axes) of the cores 11a and 12a are aligned.

Therefore, a force for aligning the center lines of the cores 11a and 12a works on the cores 11a and 12a and cladding 11b and 12b.

In this case, the optical fiber 11 is retained by the movable fiber retaining portion 13b so that it is movable and the optical fiber 12 is secured by the fixed retainer 14. Therefore, a force for aligning the center lines of the optical fibers 11 and 12 works, the optical fiber 11 moves in the direction of the arrow X in FIG. 3 (b), and the center lines of the optical fibers 11 and 12 are aligned.

When heating is stopped, the optical fibers 11 and 12 are coupled with each other with their center lines aligned. When the center lines are aligned, the optical coupling efficiency increases because the optical coupling faces 11d and 12d are aligned. It is also possible to forcibly cool the optical fibers 11 and 12 as soon as heating is stopped.

Because the optical coupling faces 11d and 12d of the optical fibers 11 and 12 are automatically aligned by the surface tension of the fused portion by using the movable retainer 13 for movably retaining the optical fiber 11 and contacting and fusing the optical faces 11d and 12d of the optical fibers 11 and 12 with each other, a high optical coupling efficiency is obtained without performing the existing laborious accurate alignment.

The cores 11a and 12a and cladding 11b and 12b are made of a hydrophobic material or provided with hydrophobic treatment and the jackets 11c and 12c are made of a hydrophilic material or provided with hydrophilic treatment. Thus, because the hydrophobic material and hydrophilic material hardly get intimate with each other, fused cores 11a and 12a and cladding 11b and 12b do not spread on the jacket 11c and thereby the cores 11a and 12a and cladding 11b and 12b are optically coupled at a high yield.

The hydrophobic material is an organic material having "—OH" group and "—COOH" group in its molecule, which includes polyvinyl alcohol, polyphenol, polyvinyl butyral, polyvinyl formal, and copolymer of them. The hydrophobic treatment is to coat a surface with a hydrophobic material.

The hydrophilic material is an organic material having no or a little "—OH" or "—COOH" group but having "—F" in its molecule, which includes fluorine resin, polystyrene, polycarbonate, and silicon resin. The hydrophilic treatment is to coat a surface with a hydrophilic material.

The Second Embodiment

Figure 4:
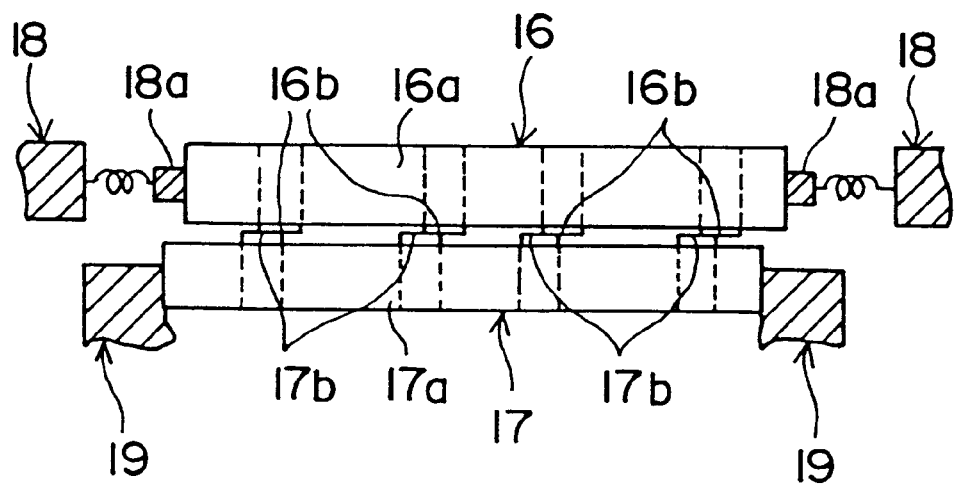
FIG. 4 is a side view showing the optical coupling method of the second embodiment of the present invention.

FIG. 4 shows a sectional view of the second embodiment of the present invention.

In FIG. 4, symbols 16 and 17 represent optical waveguide plates. The basic materials 16a and 17a of them correspond to the cladding 11b and 12b shown in FIGS. 1 and 2, which are made of the same material as the cladding 11b and 12b. A plurality of optical waveguides 16b and 17b formed in the basic materials are made of the same material as the cores 11a and 12a.

The basic material 16a of the optical waveguide plate 16 is retained by a movable retaining portion 18a of a movable retaining stage 18. The basic material 17a of the optical waveguide plate 17 is retained by a fixed retaining stage 19. These optical waveguide plates 16 and 17 are arranged so that they face each other and the optical waveguides 16b and 17b at the facing side are protruded from the basic materials 16a and 17a and formed so that they are at least partially overlapped.

By facing and fusing a plurality of optical waveguides 16b and a plurality of optical waveguides 17b, the optical waveguides 16b and optical waveguides 17b facing each other are automatically aligned by a surface tension generated when they are fused and optically coupled at a high efficiency similarly to the description for FIGS. 2 and 3.

Though the optical waveguide plate 16 is retained by the movable retaining stage 18 in the above description, it is also possible to fuse the optical waveguides 16b and 17b by movably mounting the optical waveguide plate 16 on the optical waveguide plate 17 and contacting the optical waveguides 16b of the plate 16 with the optical waveguides 17b of the plate 17. In this case, because the optical waveguide plate 16 is not fixed, it moves on the optical waveguide plate 17 and alignment is automatically performed according to the same principle as the case of the first embodiment.

The Third Embodiment

Figure 5:
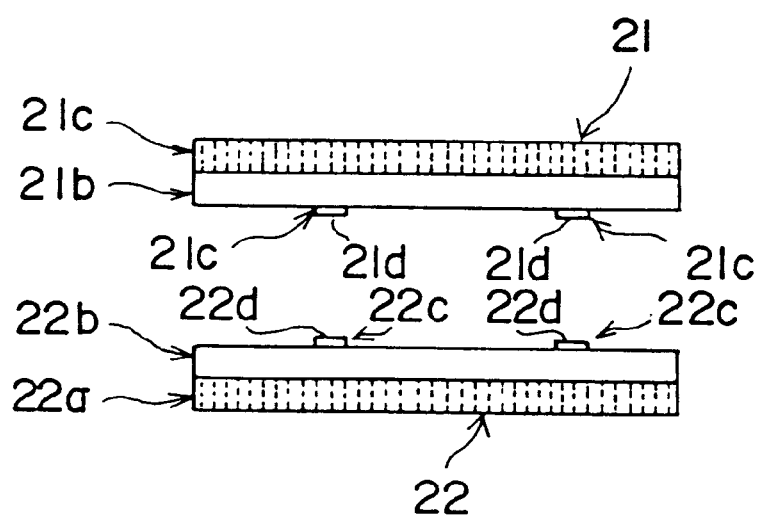
FIG. 5 is a side view showing the initial state of the optical coupling method of the third embodiment of the present invention.
Figure 6:
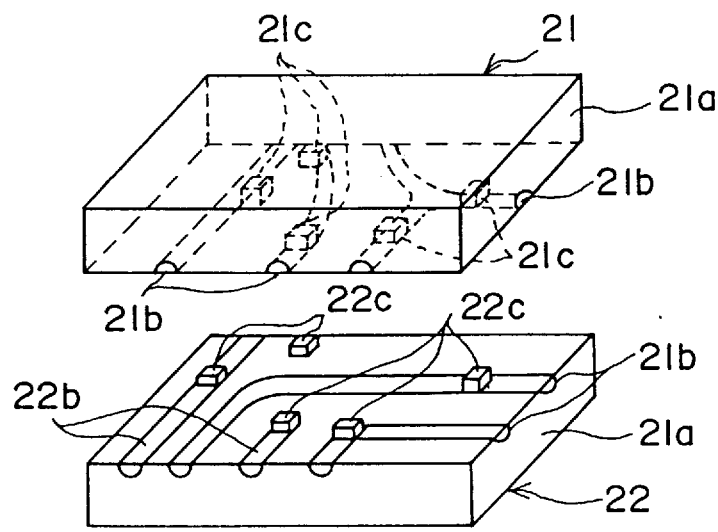
FIG. 6 is a perspective view showing the initial state of the optical coupling method of the third embodiment of the present invention.

In FIGS. 5 and 6, symbol 21 represents an optical waveguide plate serving as a first optical part and 22 represents an optical waveguide plate serving as a second optical part.

The optical waveguide plate 21 has a structure in which an optical waveguide 21b is formed on a basic material 21a. An optical coupling portion 21c is protruded and formed at a plurality of positions on the optical waveguide 21b. The optical coupling portion 21c is made of the same material as the optical waveguide 21b, which is applied to and formed on the optical waveguide 21b after the optical waveguide 21b is formed on the basic material 21a.

The optical waveguide plate 22 has a structure in which an optical waveguide 22b is formed on a basic material 22a. On the optical waveguide 22b, an optical coupling portion 22c is protruded and formed at a position corresponding to the optical coupling portion 21c formed on the optical waveguide 21b of the optical waveguide plate 21. The optical coupling portion 22c is made of the same material as the optical waveguide 22b, which is formed by applying it onto the optical waveguide 22b.

Figure 7A:
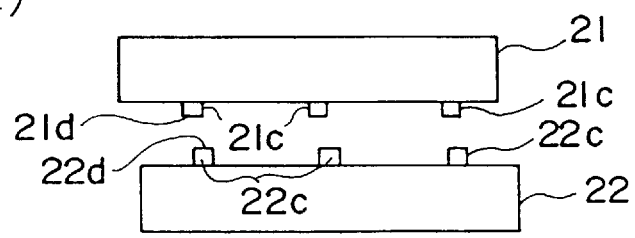
FIGS. 7 (*a*) to 7 (*c*) are side views showing the steps of the optical coupling method of the third embodiment of the present invention.
Figure 7B:
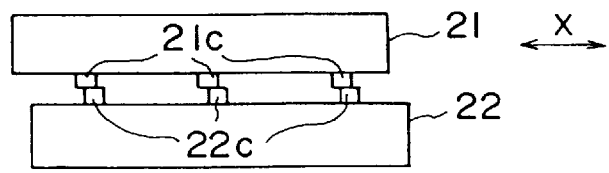
Figure 7C:
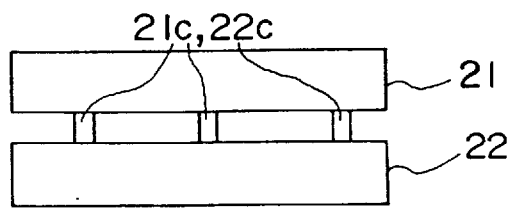

FIGS. 7 (a) to 7 (c) show the optical coupling steps of the third embodiment of the present invention.

As shown in FIGS. 7 (a) to 7 (c), the optical waveguide plate 22 is almost horizontally fixed so that the optical coupling portion 22c is turned upward. Then, as shown in FIG. 7 (b), the waveguide plate 21 is mounted on the waveguide plate 22 so that the optical coupling face 21d of the optical coupling portion 21c of the optical waveguide plate 21 and the optical coupling face 22d of the optical coupling portion 22c of the optical waveguide plate 22 are faced each other. In this case, the optical coupling faces 21d and 22d may be slightly misaligned.

Then, as shown in FIG. 7 (c), the optical coupling portions 21c and 22c which are faced and contacted are fused to couple the optical waveguide s 21b and 22b faced each other. In this case, because the optical waveguide plate 21 is only mounted on the optical waveguide plate 22, they are automatically positioned by the surface tension when the optical coupling portions 21c and 22c are fused. Thus, the optical coupling portions 21c and 22c can optically be coupled securely and efficiently. It is possible to forcibly cool them after they are positioned.

The Fourth Embodiment

Figure 8:
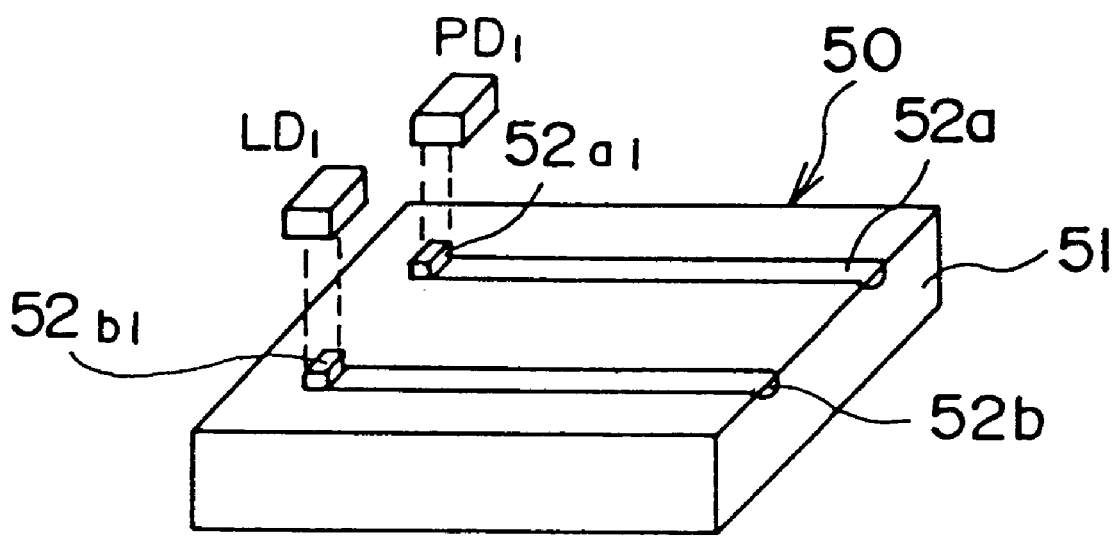
FIG. 8 is a side view showing the initial state of the optical coupling method of the fourth embodiment of the present invention.
Figure 9A:
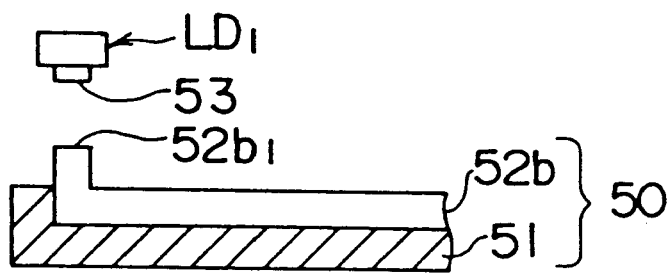
FIGS. 9 (*a*) to 9 (*d*) are side views showing the steps of the optical coupling method of the fourth embodiment of the present invention.
Figure 9B:
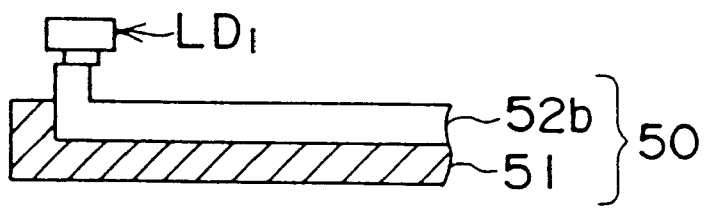
Figure 9C:
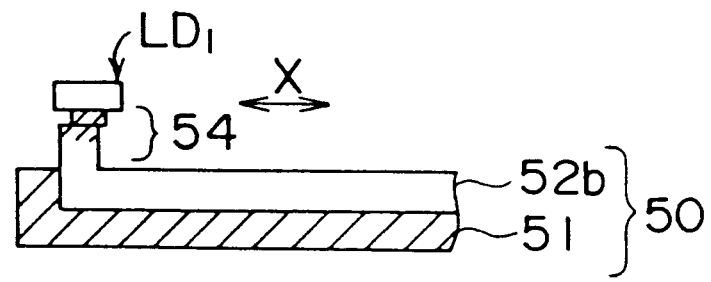
Figure 9D:
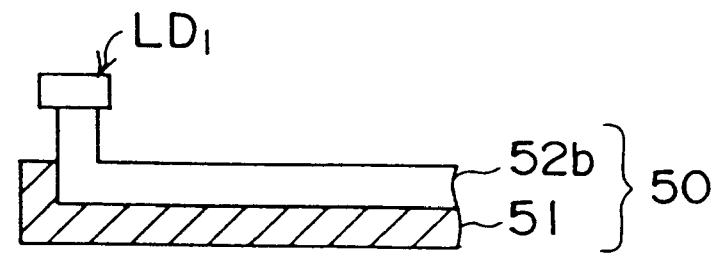

FIG. 8 shows a perspective view of the fourth embodiment of the present invention. In FIG. 8, an optical waveguide plate 50 has optical waveguides 52a and 52b formed on a basic material 51.

Optical coupling faces 51a1 and 52b1 protruded from the surface of the basic material 51 are formed at the optical coupling portions of the optical waveguides 52a and 52b. These optical coupling faces 51a1 and 52b1 are formed by removing the optical waveguides 52a and 52b through etching or the like. A photodiode PD1 is optically coupled with the optical coupling face 52a1 and a semiconductor laser LD1 is optically coupled with the optical coupling face 52b1.

FIGS. 9(*a*) to 9(*d*) shows optical coupling step diagrams of the fourth embodiment of the present invention.

The optical coupling method for the photodiode PD1 and the semiconductor laser LD1 is the same as that for the optical waveguide 52a with the optical waveguide 52b. Therefore, the optical coupling method for the semiconductor laser LD1 is described below.

First, as shown in FIG. 9 (*a*), the optical waveguide 50 is supported so that the optical coupling face 52b1 becomes approximately horizontal.

Then, as shown in FIG. 9 (*b*), the semiconductor laser LD1 is mounted on the optical coupling face 52b1 in a free state so that the optical coupling face 53 of the laser LD1 is butted against the optical coupling face 52b1 of the optical waveguide 52b in 10% of the areas respectively.

Thereafter, as shown in FIG. 9 (*c*), the optical coupling portion 54 is heated by the heating method previously described. In this case, because the semiconductor laser LD1 is mounted on the optical coupling face 52b1 in a free state, the optical axis of the LD1 is automatically adjusted to the optical coupling face 52b1 by the surface tension generated on the optical coupling portion 54 when the optical coupling portion 54 fuses. As a result, as shown in FIG. 9 (*d*), the optical coupling face 53 of the semiconductor laser LD1 and the optical coupling face 52b1 of the optical waveguide 52b are aligned and fused. Therefore, because the semiconductor laser LD1 and the optical waveguide 52b are optically coupled without misalignment of optical axes, optical coupling is performed securely and efficiently.

After positioning is completed, it is permitted to perform forcible cooling.

The Fifth Embodiment

Figure 10:
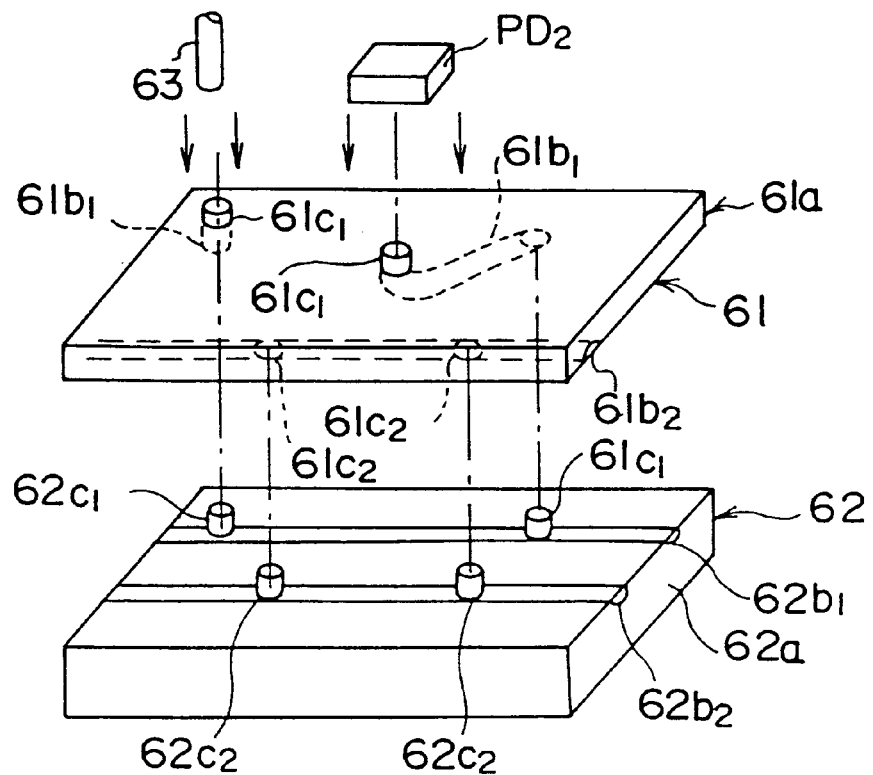
FIG. 10 is a side view showing the optical coupling method of the fifth embodiment of the present invention.

FIG. 10 shows a perspective view of the fifth embodiment of the present invention.

In FIG. 10, symbols 61 and 62 represent optical waveguides, 63 represents an optical fiber, and PD2 represents an light-emitting diode.

This embodiment optically couples an optical waveguide plates 61 and 62 and also optically couples an optical waveguide plate 61, optical fiber 63, and light-emitting diode PD2.

An optical waveguide 62 is made by forming an optical waveguide 62b1 and 62b2 in a basic material 62a and an optical coupling portions 62c1 and 62c2 is protruded from and formed on the optical waveguides 62b and 62b2. The optical coupling portions 62c1 and 62c2 is formed by applying the same material as the optical waveguides 62b.

The optical waveguide plate 61 is made by forming the optical waveguides 61b1 and 61b2 in the basic material 61a and optically coupled with the optical waveguides 62b1 and 62b2. An optical waveguide 61b1 passing from one face through the other face of the optical waveguide plate 61 and an optical waveguide 61b2 formed on the one face are present on the optical waveguide plate 61.

An optical coupling portion 61c1 is formed on the optical waveguide 61b1 by applying the same material as the optical waveguide 61b1 to the one face of the optical waveguide plate 61, the optical coupling portion 61c1 is optically coupled with an optical fiber 63 and the light-emitting diode PD2, and the optical waveguide 61b1 is optically coupled with the optical waveguide 62b1 of the optical waveguide plate 62 at the other face of the optical waveguide plate 61.

The optical waveguide 61b2 is optically coupled with the optical waveguide 62b2 through the optical coupling portions 61c2 and 62c2.

The optical waveguide plates 61 and 62 are optically coupled with each other at a high efficiency through the steps described in the third embodiment. The optical waveguide plate 62 and optical fiber 63 are optically coupled with the optical coupling portions 61c1 and 62c2 at a high efficiency through the steps described in the first embodiment. The light-emitting diode PD2 is optically coupled with the optical coupling portion 61c1 at a high efficiency through the steps described in the fourth embodiment.

As described above, it is possible to easily perform optical coupling of a plurality of optical parts by putting one optical part on another.

The Sixth Embodiment

Figure 11:
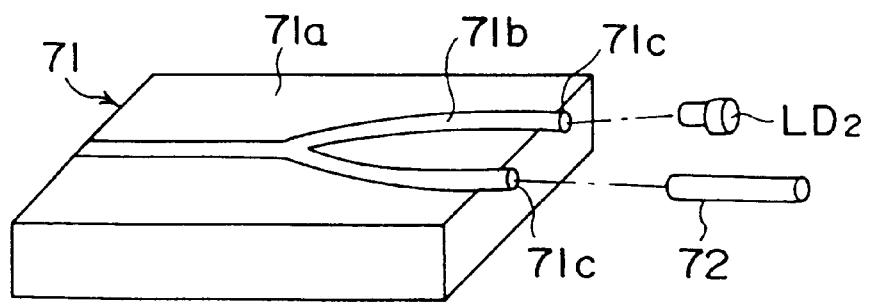
FIG. 11 is a perspective view showing the initial state of the optical coupling method of the sixth embodiment of the present invention.

FIG. 11 shows a perspective view of the sixth embodiment of the present invention.

In FIG. 11, symbol 71 represents an optical waveguide plate. The optical waveguide plate 71 is made by forming an optical waveguide 71b in a basic material 71a. The optical waveguide 71b is protruded from the edge of the basic material 71a and the protruded portion forms an optical coupling portion 71c. The optical coupling portion 71c is formed by etching, for example, the edge of the basic material 71a.

It is also possible to form the optical coupling portion 7c by applying it.

The optical coupling portion 71c is optically coupled with an optical fiber 72 and semiconductor laser LD2.

Figure 12A:
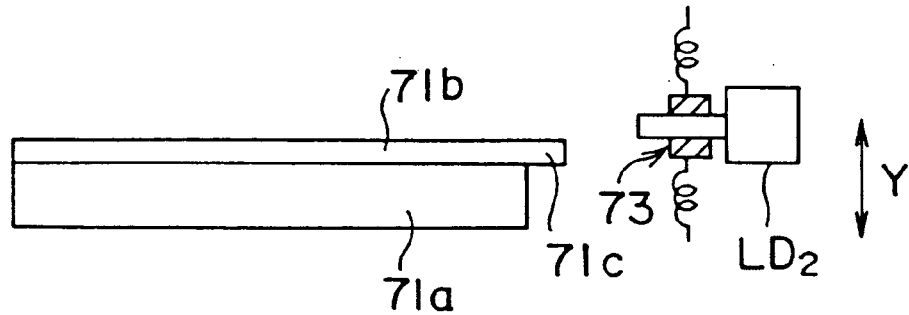
FIGS. 12 (*a*) to 12 (*c*) are side views showing the steps of the optical coupling method of the sixth embodiment of the present invention.
Figure 12B:
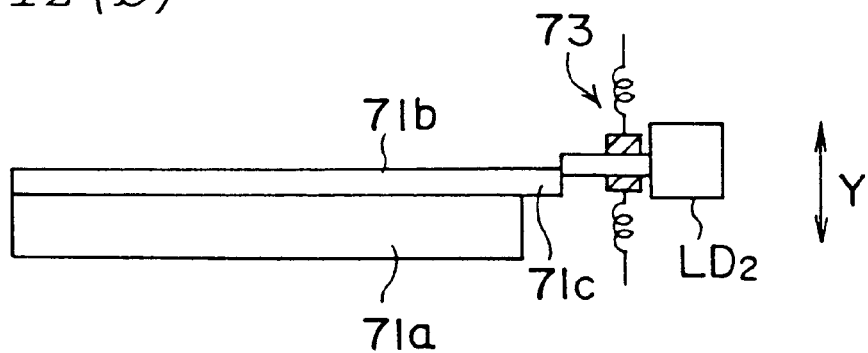
Figure 12C:
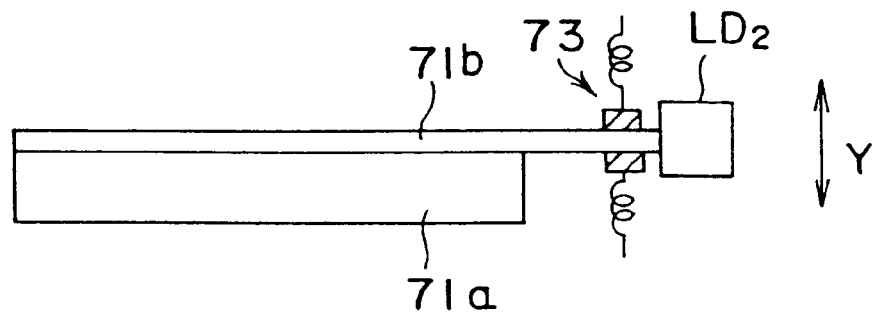

FIGS. 12 (*a*) to 12 (*c*) show the optical coupling steps of the sixth embodiment of the present invention. Because the optical fiber 72 and semiconductor laser LD2 are optically coupled in the approximately same steps, only the optical coupling steps of the semiconductor laser LD2 and optical coupling portion 71c are described below.

Figure 1B:
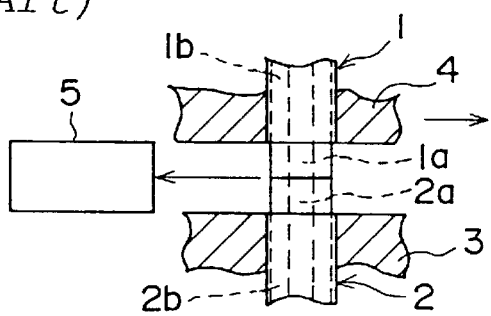
Figure 1C:
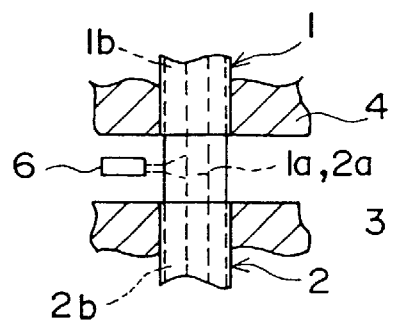
Figure 2A:
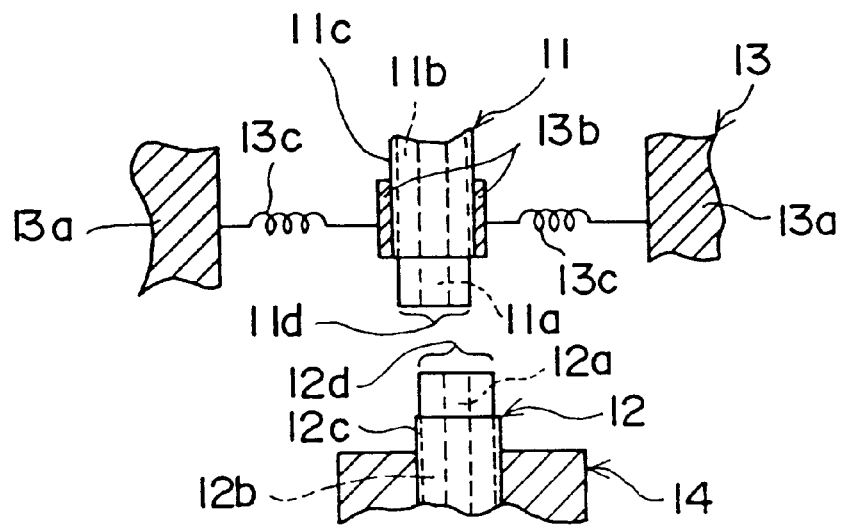
FIGS. 2 (*a*) and 2 (*b*) and 3 (*a*) and 3 (*b*) are side views showing the steps of the optical coupling method of the first embodiment of the present invention.
Figure 2B:
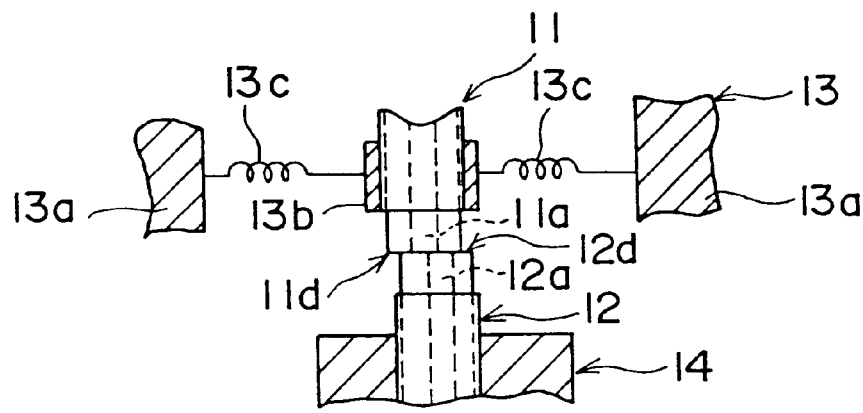

First, as shown in FIG. 12 (*a*), the semiconductor laser LD2 is retained by a movable retaining portion 73 having a constitution almost same as the movable retainer 13 shown in FIG. 1 so that it is movable in the direction of the arrow Y. Then, as shown in FIG. 11 (*b*), the light emitting face of the semiconductor laser LD2 is butted against the optical coupling face of the optical coupling portion 71c so that they are overlapped each other in at least 10% of the areas respectively.

Then, as shown in FIG. 12 (*c*), the light emitting face of the semiconductor laser LD2 is fused with the optical coupling portion 71c. In this case, because the semiconductor laser LD2 is movably retained in the direction of the arrow Y, the core position is automatically adjusted by the surface tension in fusing and optical coupling is performed securely and efficiently.

After the positioning is completed, the fused portion is cooled.

The Seventh Embodiment

Figure 13:
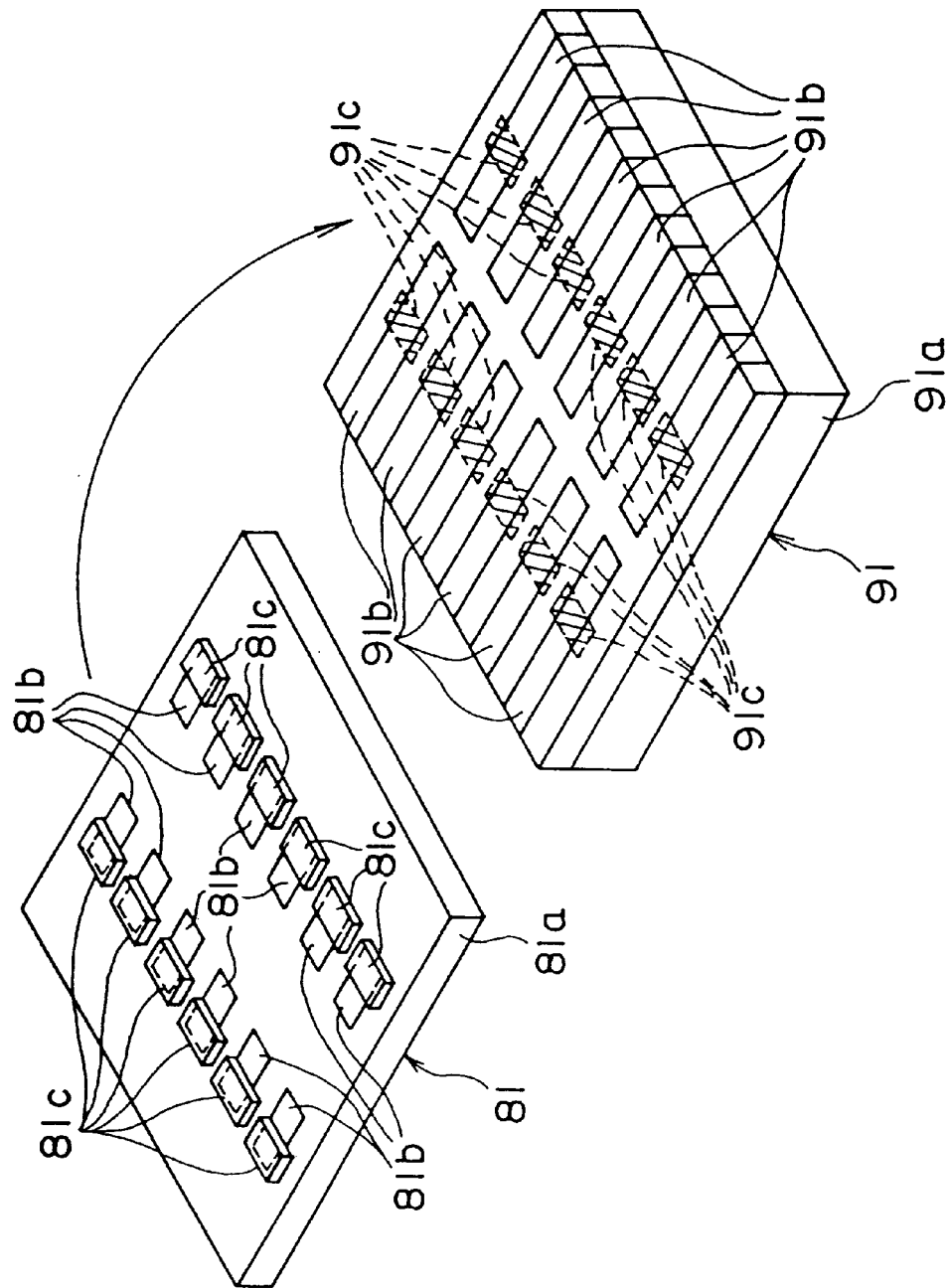
FIG. 13 is a perspective view showing the initial state of the optical coupling method of the seventh embodiment of the present invention.

FIG. 13 shows a perspective view of the seventh embodiment of the present invention.

In FIG. 13, symbol 81 represents a photodiode array and 91 represents an optical waveguide plate.

The photodiode array 81 is constituted by forming a plurality of photodiodes 81b on a semiconductor substrate 81a. The optical waveguide plate 91 is constituted by forming a plurality of optical waveguides 91b on a basic material 91a at the same intervals as the photodiodes 81b on the substrate 81a.

The photodiode 81b is coated with an optical coupling portion 81c protruded from the photodiode array 81. The optical coupling portion 81c is made of a thermoplastic or photo-curing polymer.

At a position to which the optical coupling portion 81c of the photodiode 81b is connected on the optical waveguide plate 91, a surface treated portion 91c applied with hydrophilic or hydrophobic surface treatment different from the periphery of the position is formed. It is also possible to apply the surface treatment to both the photodiode array 81 and optical waveguide plate 91. Moreover, it is possible to apply the surface treatment not to an optical coupling face but to the periphery of the face.

It is possible to form an optical coupling portion made of a thermoplastic or photo-curing polymer in the optical coupling area of not the photodiode array 81 but the optical waveguide plate 91, or in the optical coupling areas of both the photodiode array 81 and optical waveguide plate 91.

Figure 14:
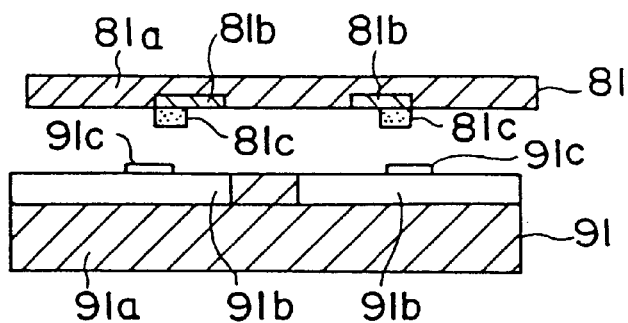
FIGS. 14 (*a*) to 14 (*d*) are side views showing the steps of the optical coupling method of the seventh embodiment of the present invention.
Figure 14:
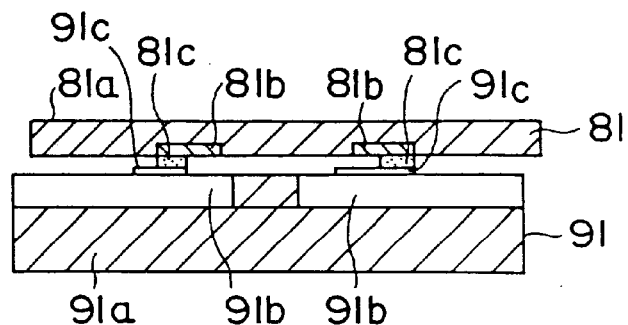
Figure 14:
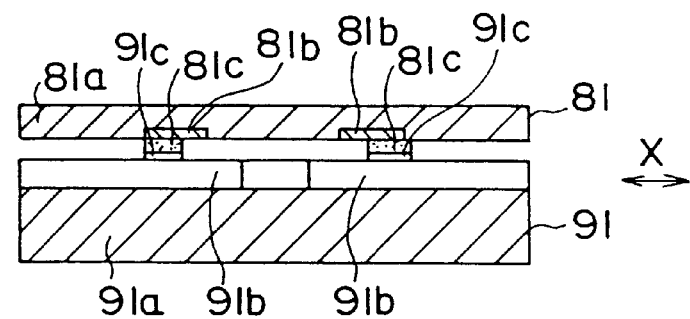
Figure 14:
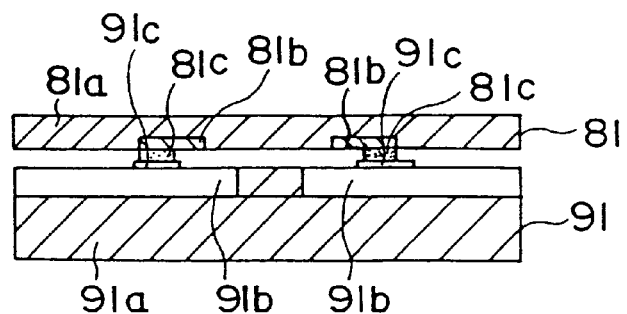

FIGS. 14 (a) to 14 (d) show optical coupling step diagrams of the seventh embodiment of the present invention.

First, as shown in FIG. 14 (a), the optical waveguide plate 91 is kept approximately horizontal so that the optical waveguide 91b turns upward. Thereafter, as shown in FIG. 14 (b), the photodiode array 81 is mounted on the optical waveguide plate 91 so that the optical coupling portion 81c of the photodiode array 81 faces the optical waveguide 91b of the optical waveguide plate 91.

As shown in FIG. 14 (c), when the optical coupling portion 81c is fused, the photodiode 81 moves horizontally {in the direction of the arrow X in FIG. 14 (c)} and the optical coupling portion 81c and surface treated portion 91c are positioned. And, by cooling the optical coupling portion 81c and surface treated portion 91c, the photodiode array 81 is optically coupled with the optical waveguide plate 91 as shown in FIG. 14 (d).

After they are positioned, fused portions are cooled.

Through the above steps, the photodiode array 81 and optical waveguide plate 91 are automatically positioned and optically coupled each other securely and efficiently.

Optical parts to be optically coupled by the optical coupling method of the present invention are not restricted to those used for the first to seventh embodiments.

Moreover, combinations of optical parts are not restricted to those in the first to seventh embodiments.

The Eighth Embodiment

Figure 15A:
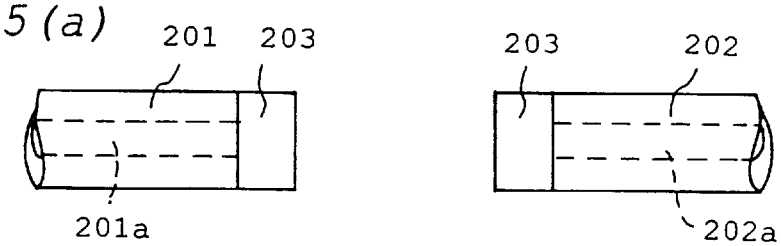
FIGS. 15(*a*) to 15(*e*) are side views showing a process of forming an optical waveguide and a method of optically coupling optical devices according to an eighth embodiment of the present invention.
Figure 15B:
Figure 15C:
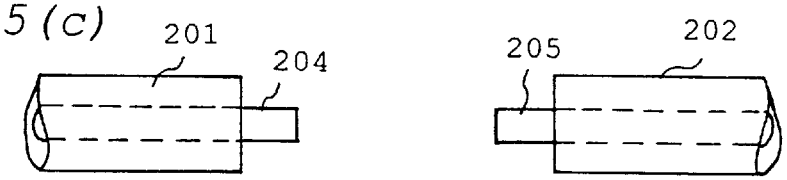

FIGS. 15(a) to 15(c) are side views showing a method of coupling optical devices according to an eighth embodiment of the present invention.

First, a first and a second optical fibers 201 and 202 for instance are prepared as two optical devices to be coupled with each other. As shown in FIGS. 15(a) and 15(b), after a photosensitive material 203 is applied to one end each of respective first and second fibers 201 and 202, irradiation for sensitization such as ultraviolet rays is irradiated to the photosensitive material 203 through cores 201a and 202a of the first and the second optical fibers 201 and 202, thereby to sensitize the photosensitive material 203 in the extended regions of the cores 201a and 202a.

Next, when the photosensitive material 203 is dipped into a solvent for the purpose of removing the portion that has not been irradiated with light, the photosensitive material 203 remains only on the extension of the cores 201a and 202a of the first and the second optical fibers 201 and 202 as shown in FIG. 15(c), and the remaining photosensitive material 203 is used as a first and a second waveguides (that are also cores or core protruding portions) 204 and 205.

Thus, a waveguide is formed with high precision and easily at the light incident end or the light emitting end of the optical device.

Figure 15D:
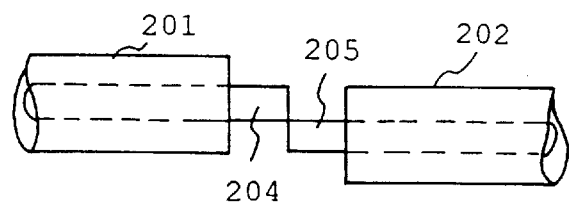

Next, as shown in FIG. 15(d), the first and the second waveguides 204 and 205 of the end faces of the first and the second optical fibers 201 and 202 are made to get close to each other. At this time, it is sufficient that the first and the second waveguides 204 and 205 are in partial contact with each other, and it is not required that they are coupled optically with each other. The contact may be made by heating.

Figure 15E:
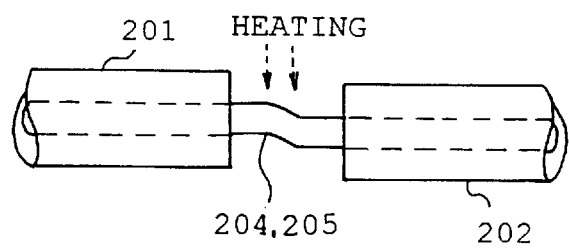

Then, as shown in FIG. 15(e), the first and the second waveguides 204 and 205 are coupled with each other when the first and the second waveguides 204 and 205 are heated to a temperature that the photosensitive material 203 of the first and second waveguides 204, 205 (core protrunding portions) is molten. In this case, such a force that makes the volume smaller by surface tension is applied to the molten first and second waveguides 204 and 205 by fixing the first optical fiber 201 and by supporting the second optical fiber 202 movably. Thus, the second optical fiber 202 couples optically with the first optical fiber 201 with high accuracy and easily by changing the position thereof so as to reach the shortest distance from the first optical fiber 201 being attendant upon surface tension due to melting of the photosensitive materials of the first and the second waveguides 204 and 205. After such optical coupling, the coupled first and second waveguides 204 and 205 are cooled, thus completing optical coupling of the first and the second optical fibers 201 and 202.

Besides, the first and the second waveguides 204 and 205, with environment thereof being air having a low refractive index, thus producing optical confinement effects as they are, but the environment of the first and the second waveguides 204 and 205 may be covered with a material having a low refractive index.

Now, a material that melts and fuses by heating and moreover transmits a signal light is desirable as the photosensitive material. A photosensitive organic compound is available as such a photosensitive material.

As the photosensitive organic compound, it is possible to use what is called a negative type photosensitive organic compound in which a bridging reaction or a polymerizing reaction etc. occurs by irradiation with light and which becomes insoluble, refractory against a solvent. The photosensitive organic compound includes a polymer type and a monomer type, and may also be a mixture thereof. As the polymer type, a polymer having acryloyl group, metacryloyl group, or vinyl group such as acrylamide, acrylonitrile, acrylic acid and acrylic ester in molecules can be used. For example, there are polycinnammic acid vinyl, photosensitive polyimide, photosensitive polyamide, photosensitive acrylic resin, photosensitive polyolefin, photosensitive polyester, photosensitive polyurethane, photosensitive epoxy resin, photosensitive silicone resin and the like. On the other hand, as the monomer type, monomer having an acryloyl group, a methacryloyl group, a vinyl group and the like such as acrylamide, acrylonitrile, acrylic acid and acrylic ester can be used. For example, there are styrene, methylacrylate, methyl methacrylate, methylenbisacrylamide, methyleneglycol dimethacrylate, an isocyanate compound or the like.

Further, in order that these materials start polymerization promptly by light, a polymerization initiator may be added thereto appropriately. The polymerization initiator is selected conforming to the wavelength of the light emitted from an optical device. A generally-known light polymerization initiator for acrylic and methacrylic monomer can be used as the light polymerization initiator in the present invention, and it is possible to use a plurality of light polymerization initiators described in the following document [11] or the like.

[11] NIKKEI NEW MATERIALS; Apr. 16, 1990, issue pp. 43–49, Material Technology; Vol. 2,10 (1984), p. 1–17, O plus E; No.133, p. 105–116 (1990), Photopolymer Handbook edited by Photopolymer Social Meeting; published by Industrial Investigation Committee, the first edition, (1989), pp. 442–457

For example, as a usable photopolymerization initiator, iron-allene complex such as pyrene-cyclopentadienyl-iron-hexafluoroantimonate, pyrene-cyclopentadienyl-iron-hexafluorophosphate, methyl ethyl benzene-cyclopentadienyl-iron-hexafluoroantimonate, methyl ethyl benzene-cyclopentadienyl-iron-hexafluorophosphate or the like can be used, and furthermore, as a sensitizer, 4-(dicyanomethylene)-2-methyl-6-(p-dimethylaminostyrile)-4H-pyrene, acridine orange 3,3'-carbonylbis (7-diethylaminocoumarin), 2,5-bis-(4-dimethylaminobenzyliden) cyclopentanone, 2,6-bis-(4-dimethylaminobenzyliden) cyclohexanone or the like can be used. Further, an organic peroxide such as 3,3' 4,4'-tetra(t-butylperoxycarbonyl)benzophenone, benzoyl peroxide, di(t-butylperoxy) phthalate, di(t-butylperoxy) terephthalate, and di(t-butylperoxy) isophthalate can be used, and as a sensitizer, 4-(dicyanomethylene)-2-methyl-6-(p-dimethylaminostyrile)-4H-pyrene, 3,3'-carbonylbis (diethylaminocoumarin), 2,5-bis-(4-diethylaminobenzyliden) cyclopentanone, and 2,6-bis-(4-dimethylaminobenzyliden) cyclohexanone or the like can be used. Further, imidazole or the like such as benzoimidazolle, 1-benzil-2-methylimidazole, 2-(o-chlorophenyl)-4,5-diphenylimidazolyl dimer, 2-(o-fluorophenyl)-4,5-diphenylimidazolyl dimer, 2-(o-chlorophenyl)-4,5-bis-(m-methoxyphenyl) imidazolyl dimer, 2-(o-methoxyphenyl) 4,5-diphenyl imidazolyl dimer, and compounds such as 7-diethylamino-4-methylcoumarin, 2-mercaptobenzothiazol, 5-chloro-2-mercaptobenzothiazol, 2-mercaptobenzoxythiazol, p-aminobenzophenone, p-diethylaminobenzophenone, p,p'-bis(ethylamino) benzophenone, p,p'-bis(dimethylamino) benzophenone, 1H-1,2,4-triazole-3-thiol, 4-methyl-4H-1,2,4-triazol-3-thiol, and as a sensitizer, 3,3'-carbonylbis (7-diethylaminocoumarin), 2,6-bis(4-dimethylaminobenzilidene) cyclohexanone, 2,5-bis-(4-diethylaminobenzilidene) cyclopentanone can be used.

Furthermore, mixed composed materials with resin shown hereunder may also be adopted. As the resin, there are, for instance, polymethyl methacrylate, polystyrene, polyester, polycarbonate, polyolefine, styrene-methylmethacrylate copolymer, styrene-acrylonitrile copolymer, poly-4-methylpentene-1, polyvinyl chloride, epoxy resin, polyimide, and silicone resin.

Further, appropriate materials may be added for the purpose of adjusting physical properties of the material such as viscosity, fusing temperature, refractive index and signal light permeability.

When photosensitive acrylic resin for instance is used as the photosensitive organic composition, the embodiment is executed under such conditions that are described hereunder. The photosensitive acrylic resin (one weight part) and a photopolymerization initiator (0.01 weight part of benzoyl peroxide) are dissolved in an organic solvent and adjusted as a solution. As the solvent, tetrahydrofuran, dichloromethane, dichloroethane, ethyl acetate, butyl acetate, dioxane, toluene or the like may be used. The adjusted solution can be applied to the end face of the optical device (optical fiber) by a method of dipping, knife-coating, screen-printing, spin-coating or the like. The solvent is removed by a method of leaving as it is, heating, decompression or the like. Further, ultraviolet rays (wavelength at 380 nm and exposure at 1 μJ) are suitable as the irradiation rays for sensitization that are made to pass through the core of the optical fiber. And tetrahydrofuran, dichloromethane, dichloroethane, ethyl acetate, butyl acetate, dioxane, toluene or the like can be used as the solvent for removing non-irradiated portion of the photosensitive material.

Besides, a process of forming a waveguide on an end face of non-fiber has been described in the present embodiment, which, however, is also applicable to LD, PD and other optical devices (the same is applied to a ninth to a 12th embodiments described hereinafter).

The Ninth Embodiment

In the eighth embodiment, it is apprehended that the waveguide in a fused state flows out of the core of the optical fiber when the first and the second waveguides protruding portions 204 and 205 are fused and coupled with each other. In order to prevent this, it is desired to improve the wettability between the core of the optical fiber and the waveguide (protruding portions 204 and 205) in a fused state, and on the other hand, to deteriorate the wettability between the cladding of the optical fiber and the waveguide in a fused state. An example thereof will be described hereinafter with reference to FIG. 16(a) to FIG. 16(e).

First, a photosensitive wettability adjusting material 206 having a property that resembles to the above-mentioned photosensitive material and has a higher fusing temperature than that of the above-mentioned photosensitive material is prepared. When the photosensitive organic compound shown in the eighth embodiment is used as the photosensitive material 203, an organic compound that resembles thereto is used as the wettability adjusting material 206. When a material 206 having a repetitive structure of molecules similarly to the photosensitive organic compound, in which the molecular weight is increased higher than the photosensitive organic compound 203 or aromatic ring or bridging density is increased in the photosensitive organic compound, is used, this wettability adjusting material 206 shows the fusing temperature higher than the photosensitive material of the photosensitive organic compound 203.

Figure 16A:
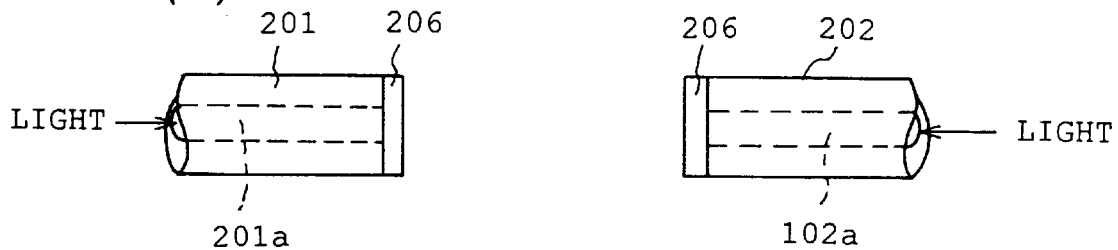
FIGS. 16(*a*) to 16(*e*) are sectional views showing a process of forming an optical waveguide and a method of optically coupling optical devices according to a ninth embodiment of the present invention.

Then, after the wettability adjusting material 206 is applied to one end face of each of the first and the second optical fibers 201 and 202 as shown in FIG. 16(a), a light for sensitization such as ultraviolet rays is irradiated to the wettability adjusting material 206 through the cores 201a and 202a of the first and the second optical fibers 201 and 202, thereby to sensitize the wettability adjusting material 206 located in the extended areas of the cores 201a and 202a.

Figure 16B:

Then, as shown in FIG. 16(b), when the wettability adjusting material 206 is soaked or developed in the solvent for removing the non-irradiated portion, the wettability adjusting material 206 remains only in the extended areas of the cores 201a and 202a of the first and the second optical fibers 201 and 202.

Figure 16C:
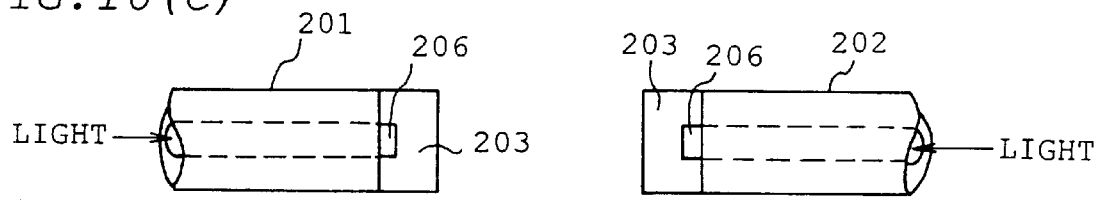
Figure 16D:
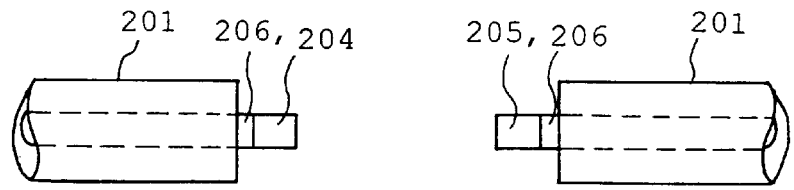

Next, a first and a second waveguides 204 and 205 are formed on the extensions of the cores 201a and 202a of the first and the second optical fibers 201 and 202 by the same method as that of the eighth embodiment. Namely, as shown in FIGS. 16(c) and 16(d), the photosensitive material (the photosensitive organic material) 203 is applied to the end portions (faces) of the first and the second optical fibers 201 and 202 on which the wettability adjusting materials 206 are formed in the core extended areas only, and then the photosensitive material 203 is irradiated with light through the first and the second optical fibers 201 and 202 and the wettability adjusting material 206, and furthermore, the non-irradiated portion is removed by the organic solvent, thereby to leave the photosensitive material 203 on the extensions of the cores 201a and 202a of the first and the second optical fibers 201 and 202 interposing the wettability adjusting material 206 and thereby forming the fist and second waveguide protruding portion 204,205.

Figure 16E:
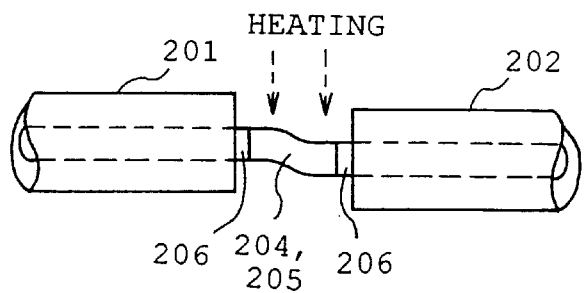

Next, as shown in FIG. 16(e), the first and the second waveguides 204 and 205 on the end faces of the first and the second optical fibers 201 and 202 are made to approach each other, and when the first and the second waveguides 204 and 205 are heated to a temperature at which temperature the photosensitive material 203 of the waveguides 204 and 205 is fused, the first and the second waveguides 204 and 205 are fused and coupled with each other. The temperature for fusing the first and the second waveguides 204 and 205 is set to a temperature at which temperature the wettability adjusting material 206 is not fused.

The photosensitive material 203 that becomes the first and the second waveguides 204 and 205, being a material resembling to the wettability adjusting material 206, has high wettability and will never move to cladding portion of the first and the second optical fibers 201 and 202 at time of fusion of the photosensitive material 203.

Besides, it is more desirable if the wettability adjusting material 206 is one that improves the wettability with the optical fiber end face also when the photosensitive material is applied.

The Tenth Embodiment

Figure 17A:
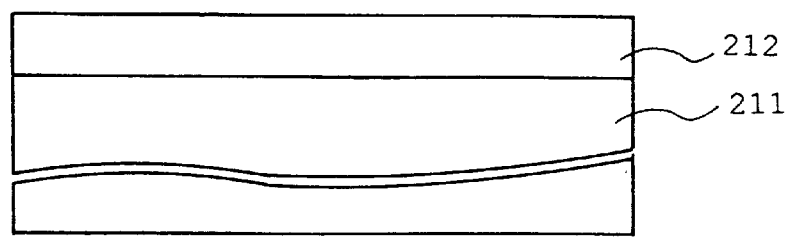
FIGS. 17(*a*) to 17(*c*) are sectional views showing a process of forming a mirror finished surface in an optical waveguide of a tenth embodiment of the present invention.
Figure 17B:
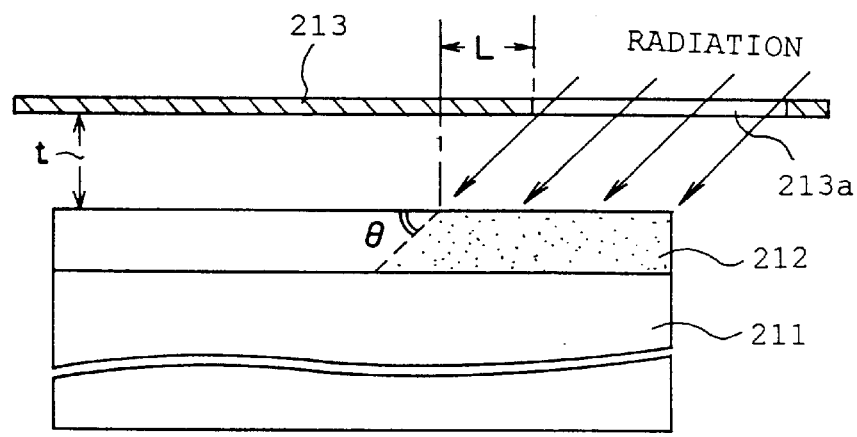
Figure 17C:
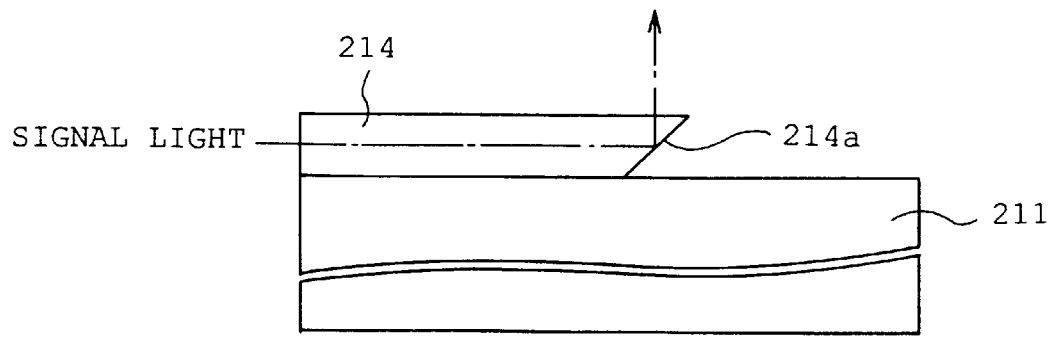

FIGS. 17(a) to 17(c) are sectional views showing a manufacturing process of a reflecting mirror according to a tenth embodiment of the present invention.

First, a photosensitive material 212 having a refractive index higher than that of a substrate 211 is applied onto the substrate 211 as shown in FIG. 17(a). A photosensitive organic substance or photosensitive glass can be used as the material for the photosensitive material 212. It is possible to use as the photosensitive organic compound, what is called a positive type photosensitive organic compound in which optical modifing or optical denaturation or photodissociation etc. occurs by irradiation with light for instance and which becomes dissolvable for the solvent. As to the photosensitive organic compound, a compound obtained by adding o-naphtoquinonediazido into such alkali soluble resin such as novolak type phenol resin and P(MMA-MA) (copolymer of methylmethacrylate and maleic anhydride), a compound in which o-naphtoquinonediazido sulfonic acid is esterified into novolak resin, a compound obtained by adding 1-azidepyrene to methacresol type novolak resin, a compound obtained by adding acid chloride ester having o-nitrobenzyl radical to a copolymer of methylmethacrylate and methacrylic acid, a compound obtained by adding a dihydropyridine compound and hexaallylbisimidazole to alkali soluble polymer, a compound obtained by adding Nifedipine to novolak resin, and a compound obtained by adding diphenyliodonium-salt to N-(t-butyroxycarbonyl) maleimide can be used. Further, it is also possible to use poly(p-acetoxystyrene), poly(p-formyloxystyrene), poly(p-acetamidestyrene), poly(phenylmethacrylate), poly (methacrylanilide) and so on. Further, as the positive type or photodissociation type, polymethyl methacrylate, polymethyl isopropenylketone, poly(o-nitrobenzaldehydeglycolacetal) and others, and furthermore, positive type photosensitive polyimide and others can be used.

Further, the photosensitive glass includes that which has such a composition that a small quantity of sensitive material containing Au, Ag, Cu or the like and sensitizer of $CeO_2$ are added to $SiO_2$—$Li_2O$—$Al_2O_3$ glass.

Next, as shown in FIG. 17(b), a light is irradiated obliquely (at an angle θ) to a part of the photosensitive material 212 using a first exposure mask 213. In this case, the positional relationship between an opening portion 213a of the first exposure mask 213 and the light irradiation area of the photosensitive material 212 is such that they are off from each other at a distance L that is shown with t/tan θ with respect to a distance t in the perpendicular direction thereof.

Thereafter, the photosensitive material 212 is exposed using a second exposure mask (not shown), thus forming a pattern latent image having a plane in a stripe form.

When the portion irradiated with light among the photosensitive material 212 is removed (positive type) thereafter by an organic solvent, the photosensitive material 212 in a stripe form having such an oblique mirror finished surface 214a at the end portion thereof as shown in FIG. 17(c) is left behind, which is used as a waveguide 214.

The mirror finished surface 214a formed in the waveguide through such a process is formed simply by what is called exposure and development. Therefore, the throughput is improved, and moreover, high mass-producibility is achievable.

Besides, the required portions only may be irradiated with collimated optical beams without using an exposure mask. Further, a positive type photosensitive material is used in the present embodiment, but a negative type photosensitive material may also be used. In this case, the area that becomes the waveguide among the photosensitive material is irradiated with light, and then the no-irradiated portion is removed with an organic solvent. The negative type photosensitive organic compound described in the eighth embodiment can be used as it is as the negative type photosensitive material.

The 11th Embodiment

Figure 18A:
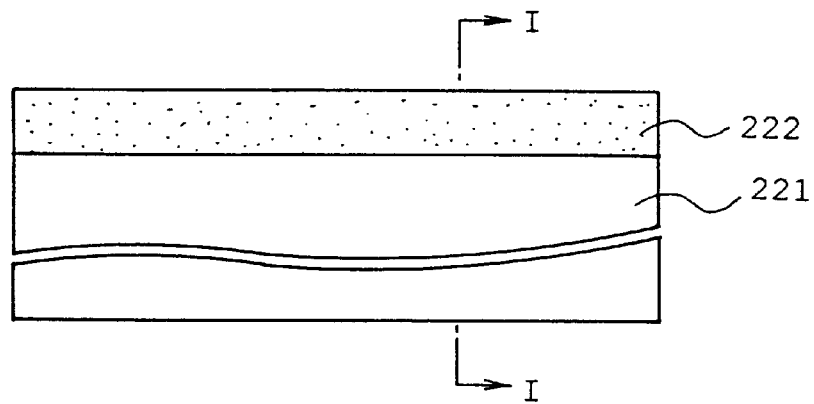
FIGS. 18(*a*) to 18(*c*) are sectional views showing a process of forming a mirror finished surface in an optical waveguide of an 11th embodiment of the present invention.
Figure 18B:
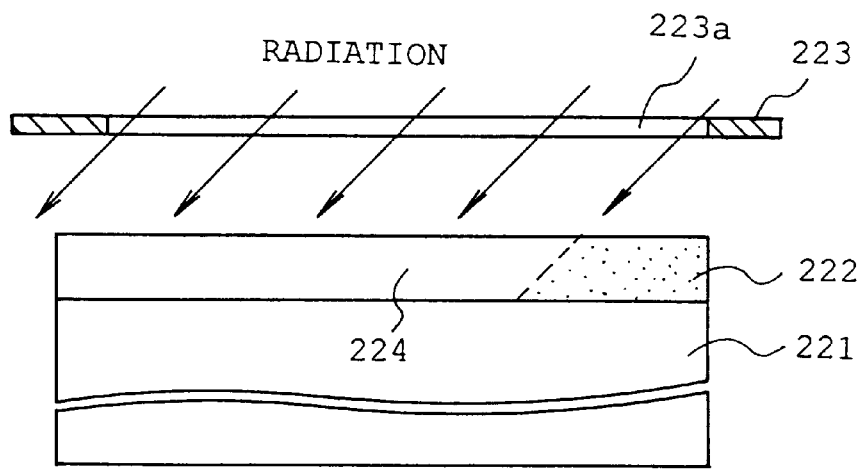
Figure 18C:
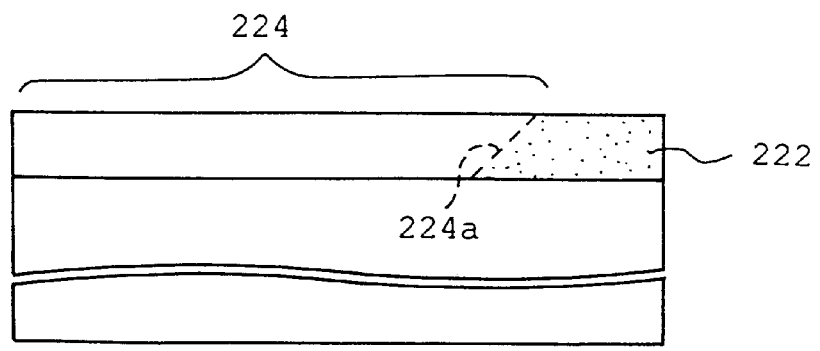
Figure 19A:
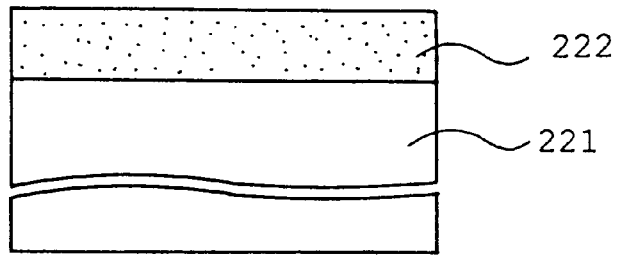
FIGS. 19(*a*) to 19(*c*) show a process of forming a mirror finished surface in an optical waveguide of the 11th embodiment of the present invention.
Figure 19B:
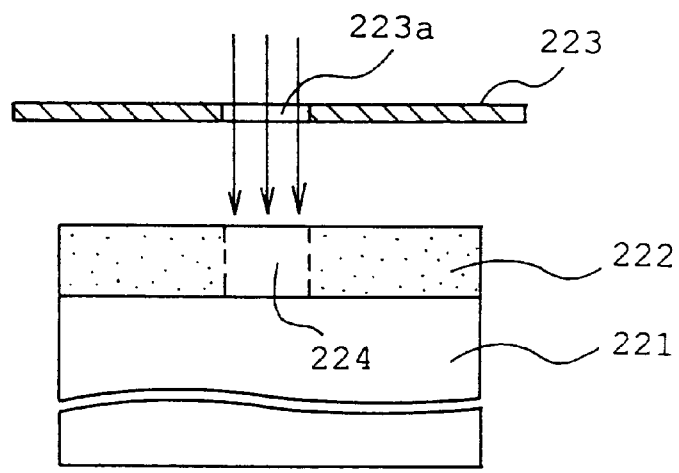
Figure 19C:
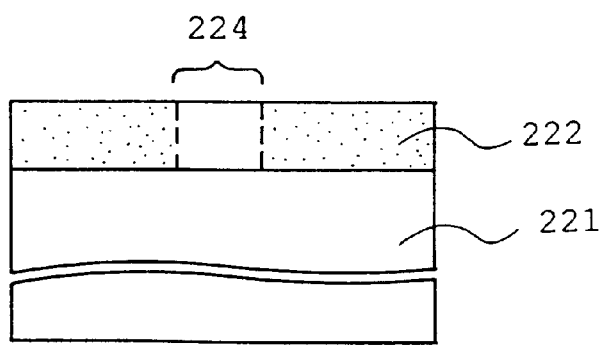

FIGS. 18(a) to 18(c) and FIGS. 19(a) to 19(c) are sectional views showing a manufacturing process of a reflecting mirror according to an 11th embodiment of the present invention. FIGS. 19(a) to 19(c) are sectional views taken along a line I—I in FIG. 18(a).

First, as shown in FIG. 18(a) and FIG. 19(a), a refractive index distribution forming (imaging) material 222 is applied onto a substrate 221. For this refractive index imaging material 222, a direct type that the refractive index is made larger instantly by light irradiation is used, or an amplification type such as chemical amplification type that the area where a latent image has been formed by light irradiation is heated so as to change the refractive index is used.

Next, as shown in FIG. 18(b) and FIG. 19(b), a light (radioactive rays) for sensitization is radiated to the stripe area of the refractive index imaging material 222 using an exposure mask 223, and a light is irradiated at a point of the stripe area in an oblique direction with respect to the length direction of the stripe area. FIGS. 18(a) to 18(c) are sectional views showing the length direction of the stripe area, and FIGS. 19(a) to 19(c) are sectional views showing the width direction of the stripe area.

Besides, a reference numeral 223a in the figures indicates an opening portion of the exposure mask 223, and the positional relationship between the light irradiation position in the length direction of the stripe area and the opening portion 223a of the exposure mask 223 is similar to that in the tenth embodiment.

When the direct type refractive index distribution forming (imaging) material is used, a waveguide 224 in a stripe form having a higher refractive index is formed in the refractive index imaging material 222 by the light irradiation, and the refractive index imaging material 222, the substrate 221 or air having a low refractive index as it is exist around the waveguide 224 having the higher refractive index then that of than that of the material 222, substrate, or air. With this, the waveguide 224 having a high refractive index is completed as shown in FIG. 18(c) and FIG. 19(c), but it acts as a mirror finished surface 224a since the boundary surface is formed oblique.

When an amplification type such as chemical amplification type refractive index distribution forming (imaging) material is used, the refractive index of the light irradiated portion becomes higher when heated after the light is irradiated in a stripe form. Therefore, the waveguide 224 appears for the first time at time of heating.

Since the mirror finished surface 224a formed on the boundary surface between the waveguide 224 and the refractive index imaging material 222 having a lower refractive index as it is can be formed simply only by employing light irradiation or collimated optical beams using the exposure mask 223, the throughput is improved, and moreover, high mass-producibility can be achieved.

Next, an example of the structure of the direct type refractive index imaging material will be shown.

As a first example, there is a composition composed of an alicyclic compound or a chain compound having an epoxy radical, an ethylenically unsaturated compound having aromatic ring or halogen, polyfunctional acrylate or polyfunctional methacrylate, and a photopolymerization initiator. As a second example, there is a composition composed of organic modified (denatured) silicone, an ethylenically unsaturated compound containing aromatic ring or halogen, polyfunctional acrylate or polyfunctional methacrylate, and a photopolymerization initiator.

As the alicyclic or chain epoxy, 3,4-epoxy cyclohexylmethyl-3,4-epoxycyclohexancarboxylate, ERL-4299 (made by UCC), BRL-4092 (made by UCC), EHPE-3150 (made by DAICEL CHEMICAL), EPOLAITO 4000, EPOLAITO 100MF, EPOLAITO 80MF, EPOLAITO 1600, EPOLAITO 1500NP, EPOLAITO 400P, EPOLAITO 400E, EPOLAITO M-1230 (Kyoeisha Oils and Fats), and a mixture or copolymer of the above-mentioned compounds can be used.

As the organic modified (denatured) silicone, acrylic modified or denatured silicone, methacrylic modified or denatured silicone or epoxy modified or denatured silicone can be used.

Further, it is also possible to use ethylenically unsaturated compound containing silicon and copolymers obtained by heating the ethylenically unsaturated compounds in a solvent so as to copolymerize them partially as a binder. As the monomer for copolymerization, polyfunctional acrylate or polyfunctional methacrylate may also be added. As the ethylenicaly unsaturated compound containing silicon, 3-acryloxypropyltrimethoxy silane, 3-methacryloxypropyltrimethoxy silane, methacryloxypropyltris (trimethylsiloxy) silane, acryloxypropylmethylbis (trimethylsiloxy) silane, acrylic modified (denatured) silicone, and methacrylic modified (denatured) silicone, and a mixture of these compounds can be used. As the ethylenically unsaturated compound, methylmethacrylate, ethylmethacrylate, propylmethacrylate, isopropylmethacrylate, n-butylmethacrylate, isobutylmethacrylate, t-butylmethacrylate, ethylacrylate, n-butylacrylate, and a mixture of these compounds can be used.

An ethylenically unsaturated monomer containing aromatic ring or halogen has a higher refractive index, and increases the refractive index of a light irradiated portion as compared with non-irradiated portion by polymerizing and making high in density in the light irradiated portion by light irradiation. As the ethylenically unsaturated monomer containing aromatic ring or halogen, arylcarbazole, methacryloyloxyethylcarbozole, acryloylethyloxycarbozole, vinylcarbozole, vinylbenzylcarbozole, vinyloxyethylcarbozole, vinylnaphthalene, naphthylacrylate, tribromophenylacrylate, dibromophenylacrylate, phenoxyethylacrylate, fluorenehydroxyacrylate, 2,2'-(2-hydroxyethylmethacrylate), (2,3-dihydroxypropylmethacrylate) dipheneto, 2,2'-(2-hydroxyethylmethacrylate) hydrogendiphenate, and a mixture of these compounds can be used.

As the multifunctional acrylate or multifunctional methacrylate, trimethylolpropanetriacrylate, neopentylglycol diacrylate, pentaerythritol triacrylate, pentaerythritol tetracrylate, trimethylol propane trimethacrylate, and a mixture of these compounds can be used.

The photopolymerization initiator includes organic peroxides such as 2,4,6-trimethylbenzoyldiphenylphosphineoxide, benzyl, benzoin isopropylether, BTTB (3,3',4,4'-tetra(t-butylperoxycarbonyl) benzophenone), benzoyl peroxide, and di(t-butylperoxy) isophthalate; imidazole groups such as benzoimidazole and 2-(o-chlorophenyl) 4,5-diphenylimidazole dimer; combined mixtures selected from compounds such as 2-mercaptbenzothiazole, p-diethylaminobenzophenone, 1H-1,2,4-triazole-3-thiol, and 4-methyl-4H-1,2,4-triazole-3-thiol, and iron-allene complex such as pyrene-cyclopentadienyl-iron-hexafluoroantimonate. Moreover, the sensitizing dye includes 4-(dicyanomethylene)-2-methyl-6-(p-dimethylaminostyryl)-4H-pyrane, 3,3'-carbonylbis (7-diethylaminocoumarin), 2,5-bis(4-diethylaminobenzylidene) cyclopentanone, and 2,6-bis(4-dimethylaminobenzilidene) cyclohexanone.

Further, a thermosetting agent may also be used for the purpose of thermosetting of a thermosetting non-photosensitive component. For example, the thermosetting agent when using a binder containing an epoxy group includes amino acids such as hexamethylenediamine, trimethylhexamethylenediamine, diethylenetriamine, triethylenetetramine, tri(methylamino) hexane, diethylaminopropylamine, menthendiamine and isophoronediamine; acid anhydrides such as methyltetrahydro phthalic anhydride and methylhexanhydro phthalic anhydride; and imidazole groups such as 2-ethyl-4-methylimidazole and 2-phenylimidazole. The thermosetting agent when a binder having an epoxy group is used includes isocianate-based thermosetting agent such as COLONEITO EH (NIPPON POLYURETHANE), COLONEITO 2092 (NIPPON POLYURETHANE), DULANEITO THA-100 (ASAHI CHEMICAL INDUSTRY), DULANEITO TPA-100 (ASAHI CHEMICAL INDUSTRY), SUMIPALU (SUMITOMO BEYER URETHANE), and TAKENEITO D-170N (Takeda Chemical), and melamine-based thermosetting agents such as NIKALAKU MW030 (SANWA CHEMICAL), NIKALAKU MX-40 (SANWA CHEMICAL) and SAIMELU (Mitsui Toatsu Chemicals).

Next, an example of the structure of an chemical amplification type refractive index distribution forming (imaging) material will be shown.

As a refractive index imaging material of the present embodiment, a catalyzer type functional material that is a composition composed of a material having a catalyzer effect having a chemical amplification effect and a functional material for instance is used. The chemical amplification effect is to generate an active material composed of a material having the catalyzer effect by light irradiation, and then to have this active material and the functional material react on each other by heating treatment, thereby to increase refractive index distribution. The material having the catalyzer effect for generating an active material with a light irradiation is selected in accordance with the used functional material.

As the functional material, there is a compound having a functional group of cation polymerization nature such as a compound having an epoxy group. For example, as the compound having an epoxy group, 3,4-epoxycyclohexilmethyl-3,4-epoxycyclohexanecarboxylate, ERL-4299 (made by UCC), ERL-4092 (made by UCC), 2021P (made by DAICEL CHEMICAL), EHPE-3150 (made by DICEL-UCB Co., Ltd.), EPOLAITO 4000, EPOLAITO 100MF, EPOLAITO 80MF, EPOLAITO 1600, EPOLAITO 1500NP, EPOLAITO 400P, EPOLAITO 400E, EPOLAITO M-1230 (kyoeisha Oil and Fat Chemical Industry Co., Ltd.), poly(glycizilmethacrylate), poly(epitiopropylmethacrylate), and a mixture or a copolymer of some compounds among them can be used. Further, as the compound having a functional group of cation polymerization nature, there are novolak resin, a compound having a butoxycarbonyl group, maleimidstyrenecopolymer, copolymerized polymer of p-vinylphenol and p-vinylbenzylacetate, poly(p-trimethylcycloxystyrene), poly(4,5-bis(trimethylsylil) phthalaldehyde) or the like.

As the material having the catalyzer effect, that which generates acid efficiently by a light is recommended, and for example, iron-allene complex, silanol/aluminium complex, benzointocylate, o-nitrobenzyltocylate, onium salt, halide organic compound, quinonediazide compound, α,α-bis (sulfonyl) diazomethane compound, α-carbonyl-α-sulfonyl-diazomethane compound, sulfonic compound, organic acid ester compound, organic acid amide compound, organic acid imide compound or the like may be mentioned.

As exemplifications of onium salt, diazonium salt, ammonium salt, iodonium salt, sulfonium salt, phosphonium salt, arsonium salt, oxonium salt or the like having non-saturated, symmetrically or asymmetrically substituted alkyl group, alkenyl group, aralkyl group, aromatic group or heterocyclic ring group may be mentioned. As the exemplifications of these onium salts against anion, for example, boron acid, arsenic acid, phosphoric acid, antimonic acid, sulfonic acid, carboxylic acid, or their halides may be mentioned.

As the exemplifications of organic halide, various compounds such as halogen containing oxadiazole compound, halogen containing triazine compound, halogen containing acetophenone compound, halogen containing benzophenone compound, halogen containing sulfoxide compound, halogen containing sulfone compound, halogen containing thiazole compound, halogen containing oxazole compound, halogen containing triazole compound, halogen containing 2-pyrone compound, halogen containing aliphatic hydrocarbon compound, halogen containing aromatic hydrocarbon compound, other halogen containing heterocyclic compound and sulfanilic halide compound may be mentioned.

Furthermore, as organic halide, halogen containing flame retarders such as tris(2,3-dibromopropyl) phosphate, tris (2,3-dibromo-3-chloropropyl) phosphate, chlorotetrabromoethane, hexachlorobenzene, hexabromobenzene, hexabromocyclodecane, hexabromophenyl, tribromophenylarylether, tetrachlorobisphenol A, tetrabromobisphenol A, bis(bromoethylether) tetrabromobisphenol A, bis(chloroethylether) tetrachlorobisphenol A, tris(2,3-dibromopropyl) isocyanurate, 2,2-bis (4-hydroxy-3,5-dibromophenyl) propane, and 2,2-bis(4-hydroxythoxy-3,5-dibromophenyl) propane or the like, and organic chloro system agricultural chemicals such as dichlorodiphenyltrichloroethane, benzenehexachloride, pentachlorophenol, 2,4,6-trichlorophenyl 4-nitrophenylether, 2,4-dichlorophenyl 3'-methoxy-4'-nitrophenyl ether, 2,4-dichlorophenoxy acetic acid, 4,5,6,7-tetrachlorophthalide, 1,1-bis(4-chlorophenyl) ethanol, 1,1-bis(4-chlorophenyl)-2,2,2-trichloroethanol, ethyl 4,4-dichlorobenzylate, 2,4,5,4'-tetrachlorodiphenylsulfide, 2,4, 5,4'-tetrachlorodiphenylsulfone or the like may be mentioned.

As the exemplifications of the quinonediazido compounds, o-quinonediazido compounds such as 1,2-benzoquinonediazido-4-sulfonate, 1,2-naphthoquinonediazido-4-ester sulfonate, 1,2-naphthoquinonediazido-6-ester sulfonate, 2,1-naphthoquinonediazido-4-ester sulfonate, 2,1-naphthoquinonediazido-5-ester sulfonate, 2,1-naphthoquinonediazido-6-ester sulfonate, and other ester sulfonate of quinonediazido derivative; 1,2-benzoquinonediazido-4-chloride sulfonate, 1.2-naphthoquinonediazido-4-chloride sulfonate, 1.2-naphthoquinonediazido-5-chloride sulfonate, 1.2-naphthoquinonediazido-6-chloride sulfonate, 2,1-naphthoquinonediazido-4-chloride sulfonate, 2,1-naphthoquinonediazido-5-chloride sulfonate, 2,1-naphthoquinonediazido-6-chloride sulfonate, and chloride sulfonate of other quinonediazido derivative and so on may be mentioned.

As the exemplifications of α,α-bis(sulfonyl) diazomethane compound, α,α-bis(sulfonyl)diazomethane or the like having non-substituted, symmetrically or asymmetrically substituted alkyl group, alkenyl group, aralkyl group, aromatic group or hetero ring group may be mentioned.

As the exemplifications of α-carbonyl-α-sulfonyldiazomethane compound, α-carbonyl-α-sulfonyldiazomethane having unsubstituted, symmetrically or asymmetrically substituted alkyl group, alkenyl group, aralkyl group, aromatic group or hetero ring group may be mentioned.

As the exemplifications of the sulfone compounds, sulfone compounds, disulfone compounds or the like having unsubstituted, symmetrically or asymmetrically substituted alkyl group, alkenyl group, aralkyl group, aromatic group or hetero ring group may be mentioned.

As the exemplifications of organic acid ester, carboxylic acid ester, sulfonic acid ester or the like having unsubstituted, symmetrically or asymmetrically substituted alkyl group, alkenyl group, aralkyl group, aromatic group or hetero ring group may be mentioned.

As the exemplifications of organic acid amide, carboxylic acid amide and sulfonic acid amide having unsubstituted, symmetrically or asymmetrically substituted alkyl group, alkenyl group, aralkyl group, aromatic group or hetero ring group may be mentioned.

As the exemplifications of organic acid imide, carboxylic acid imide, sulfonic acid imide or the like having unsubstituted, symmetrically or asymmetrically substituted alkyl group, alkenyl group, aralkyl group, aromatic group or hetero ring group may be mentioned.

The compounds capable of cleaving by irradiation with these active rays thereby to generate acid can be used independently respectively or by combining two types or more.

Furthermore, other reactive monomer, binder polymer, photopolymerization initiator or the like may be added as occasion demands.

Further, these materials are dissolved in a solvent and adjusted as a solution as occasion arises. The refractive index imaging material composed of a material having such a catalyzer effect or a functional material is activated by heating at a temperature of 45 to 150° C. after light irradiation.

The 12th Embodiment

The light irradiated in the 11th and the 12th embodiments is ultraviolet radiation, visible radiation, infrared radiation or radiation containing electron beams, but may also be irradiation such as excimer laser and YAG laser.

Figure 20:
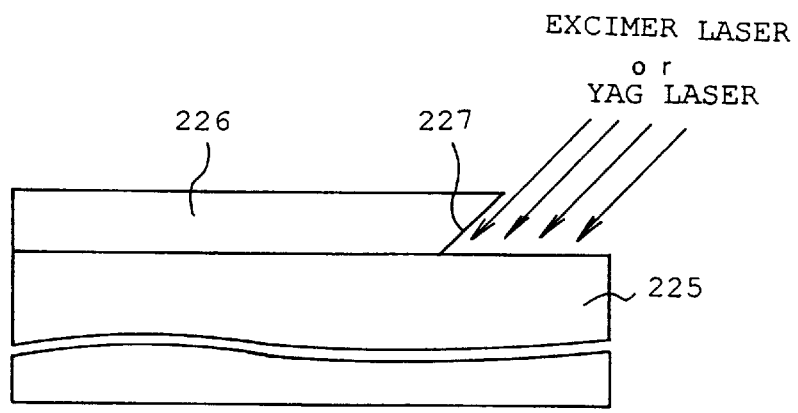
FIG. 20 is a side view showing a method of forming a mirror finished surface in an optical waveguide of a 12th embodiment of the present invention.

The process of forming a mirror finished surface at a waveguide end using excimer laser or YAG laser will be described with reference to FIG. 20.

First, a waveguide 226 made of an organic compound (such as polyimide) or lithium niobate is formed on a substrate 225. Next, when excimer laser or YAG laser is irradiated from an oblique direction toward the end face of the waveguide 226, the portion irradiated with the laser is disappeared, thereby to form a reflecting mirror finished surface inclined with respect to the waveguide direction easily on an end face 227 of the waveguide 226.

Figure 21:
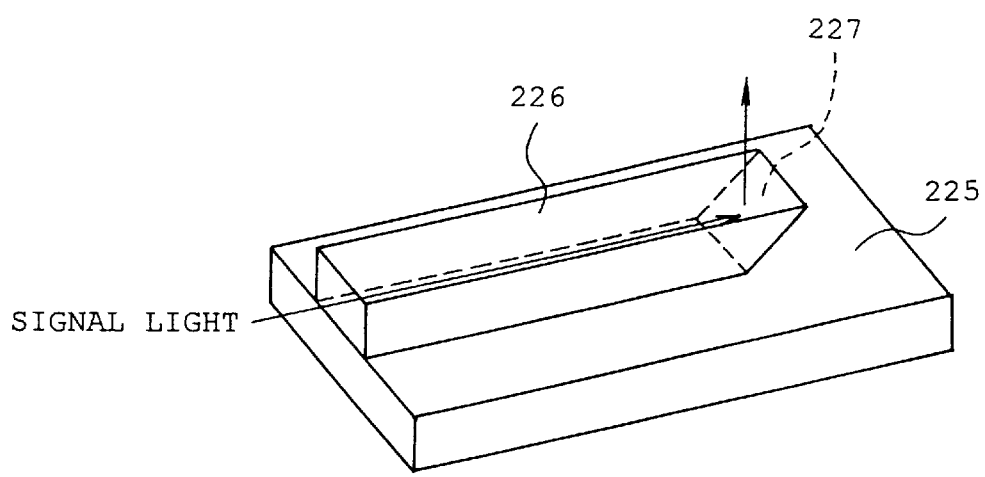
FIG. 21 is a perspective view showing an optical waveguide formed according to the 12th embodiment of the present invention.

A state that such waveguide 226 is irradiated with an optical signal is shown in FIG. 21.

The 13th Embodiment

FIGS. 22 (a) to 22 (d) are sectional views showing the optical part coupling method of the first embodiment of the present invention.

First, as shown in FIG. 22 (a), optical fibers 103 and 104 are set to a V-groove 102 of a support substrate 101 to secure them by facing them each other and giving a gap between the edges of them. In this case, the distance between the fiber edges is set to 0.1 mm or more.

Then, a refractive-index imaging material whose refractive index increases by applying a light with a specific wavelength and which is dissolved in a solvent is dripped into the gap between the edges of the optical fibers 103 and 104 and their periphery as shown in FIG. 22 (b). Then, they are left as they are for several hours to dry them.

The refractive-index imaging material uses, for example, a material containing an alicyclic compound or chain compound having an epoxy group, ethylene unsaturated compound having an aromatic ring or halogen, multifunctional acrylate or methacrylate, and photopolymerization initiator. Other materials are described in later embodiments.

Thereafter, light is applied to the refractive-index imaging material 105 from at least one of the optical fibers 103 and 104. Though it is desirable that the wavelength of the light is long, the wavelength is concretely selected by considering the photosensitive wavelength zone of the refractive-index imaging material 105.

It is estimated that a high refractive-index image is formed because polymerization of photopolymerizable monomers having a high refractive index at a portion exposed to the light starts, the monomer density is increased due to the polymerization, and a refractive-index difference occurs between the above portion and a portion at a low monomer density not exposed to the light. Refractive-index imaging materials constituting the refractive-index imaging material 105 are concretely described in later embodiments.

Thereby, a high refractive-index image 106 based on the intensity distribution of the light emitted from the optical fibers 103 and 104 is formed in the refractive-index imaging material 105. Concretely, when light is emitted from the optical fiber 103, a horn-shaped high refractive-index image 106 in which the diameter increases starting with its core is formed as shown in FIG. 22 (c). When light is emitted from both the optical fibers 103 and 104, a high refractive-index image 106a with a shape whose central portion is the widest such as a rhombus is formed as shown in FIG. 23.

Thereafter, unreacted monomers in the refractive-index imaging material 105 are made to react by applying light such as ultraviolet rays to or heating the material to stabilize and cure the material according to necessity. When applying light to the refractive-index imaging material 105, it is possible to destroy pigments remaining in the material 105 and increase the light transmittance.

Through the above steps, the optical fibers 103 and 104 are optically coupled each other and bonded to the support substrate 101.

And, when the horn-shaped high refractive-index image 106 is formed in the refractive-index imaging material 105 present between the edges of the optical fibers 103 and 104 and signal light is applied into the widest edge of the high refractive-index image 106 from the optical fiber 104 contacting the widest edge, the light collects to the narrowest portion of the high refractive-index image 106 according to the lens effect of the image 106 and enters the core of the optical fiber 103. In general, signal light uses an infrared beam of a semiconductor laser or the like. However, because there are only a few materials sensing the infrared beam, the wavelength is frequently different from that of the light for forming the refractive-index image 106.

As a result, a high coupling efficiency is obtained by the light absorbing function of the refractive-index image 106 even if the accuracy for aligning the optical fibers 103 and 104 is moderate.

Moreover, a high isolation characteristic is obtained by increasing the interval between the edges of the optical fibers 103 and 104 and the coupler length.

The following is the analysis result obtained by the two-dimensional waveguide analysis method using Fourier transform {Thesis of DENSHI TSUSHIN GAKKAI: J66-C, 10(1983)72}.

Figure 24:
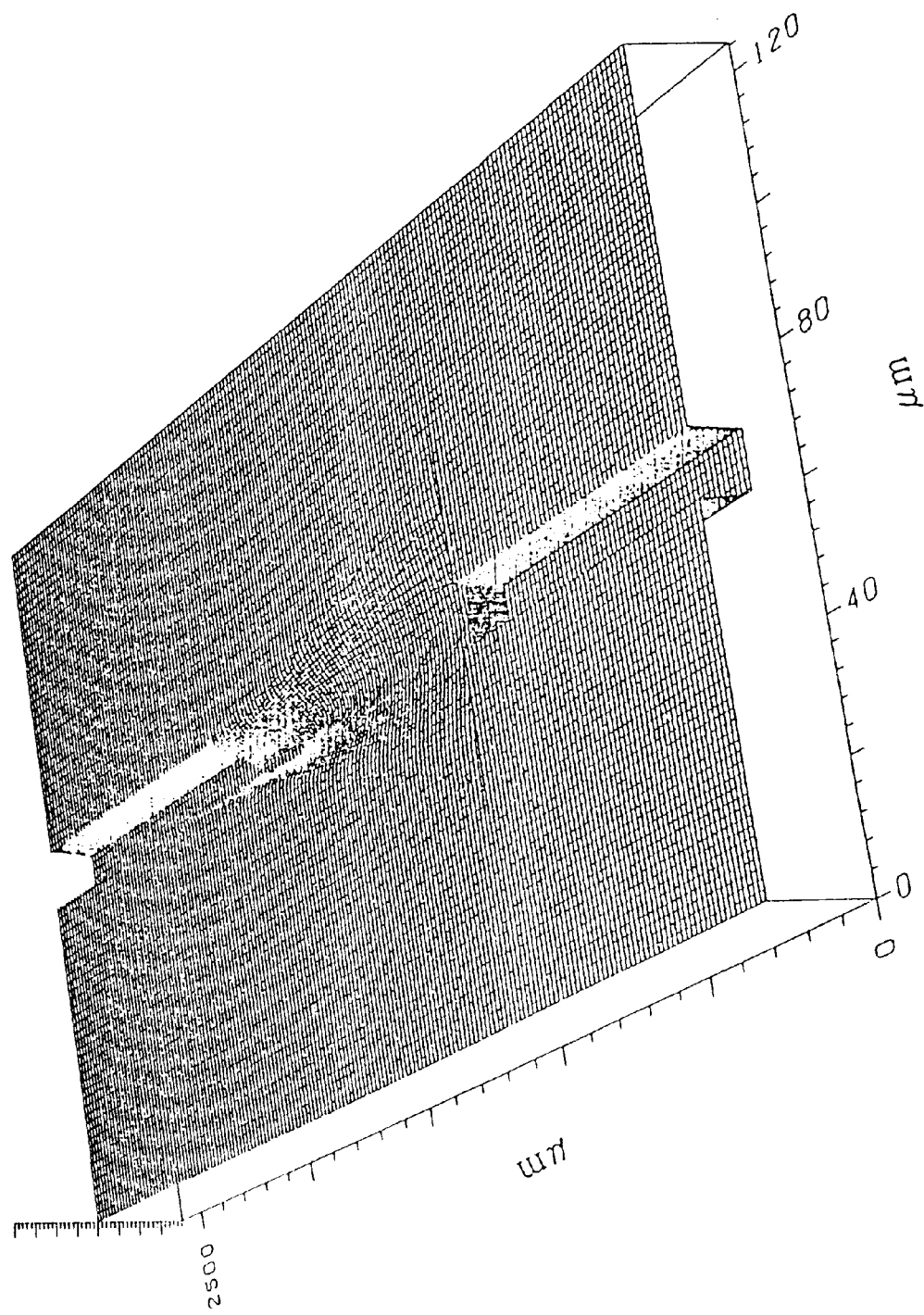
FIG. 24 is a refractive-index distribution diagram between optical parts coupled by the thirteenth embodiment of the present invention.

When it is assumed that a refractive-index distribution corresponding to a light intensity distribution is formed in the refractive-index imaging material 105, the refractive-index distribution shown in FIG. 24 is obtained after applying the light for forming a high refractive-index image from either optical core. In this analysis example, the core diameter of an optical fiber is assumed as 10 μm, distance between cores as 1,000 μm, misalignment value of optical axes between core layers as 0 μm, refractive index of a core layer as 1.60, refractive index of a clad as 1.58, wavelength of light applied to the material as 488 nm, refractive index of the periphery of the material after forming a refractive-index image as 1.58, and refractive-index difference between high refractive-index image of the material and its periphery as 0.01.

Figure 25:
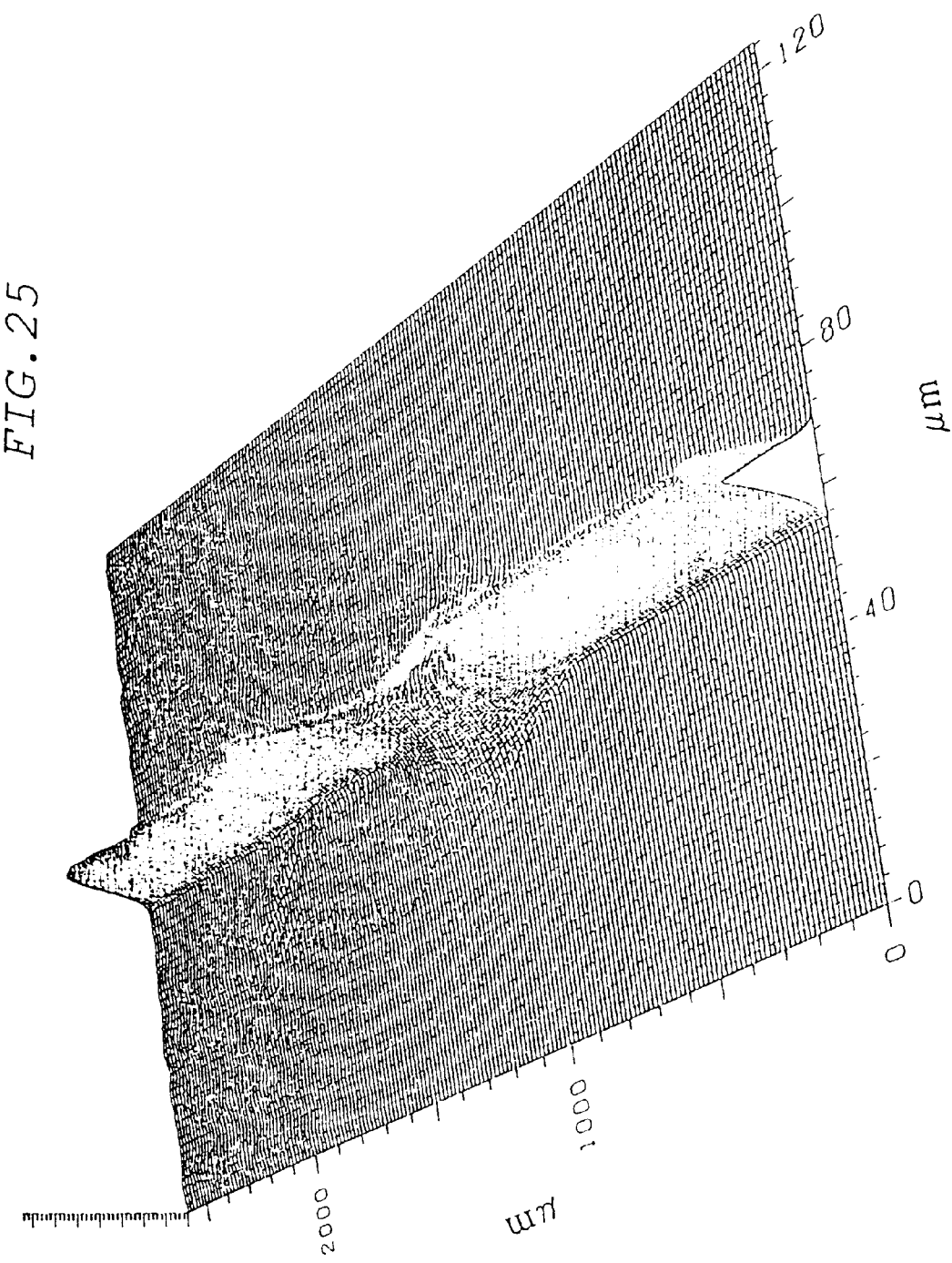
FIG. 25 is an illustration showing a light propagation pattern between optical parts coupled by the thirteenth embodiment of the present invention.

As the result of applying the light with the wavelength of 1.3 μm to a refractive-index image material with the above refractive-index distribution from the core of the optical fiber 103, the light propagation pattern shown in FIG. 25 is obtained and the light is collected to the core of the optical fiber 104 by a high refractive-index image. When excluding the optical loss due to light absorption and scattering by the refractive-index imaging material 105, a theoretical coupling efficiency of 90% or more is obtained.

When coupling optical parts such as optical fibers, semiconductor lasers, optical waveguides, or light amplifiers each other, tolerances for misalignment of optical axes and angle formed between axes are increased by using the above method.

Figure 26:
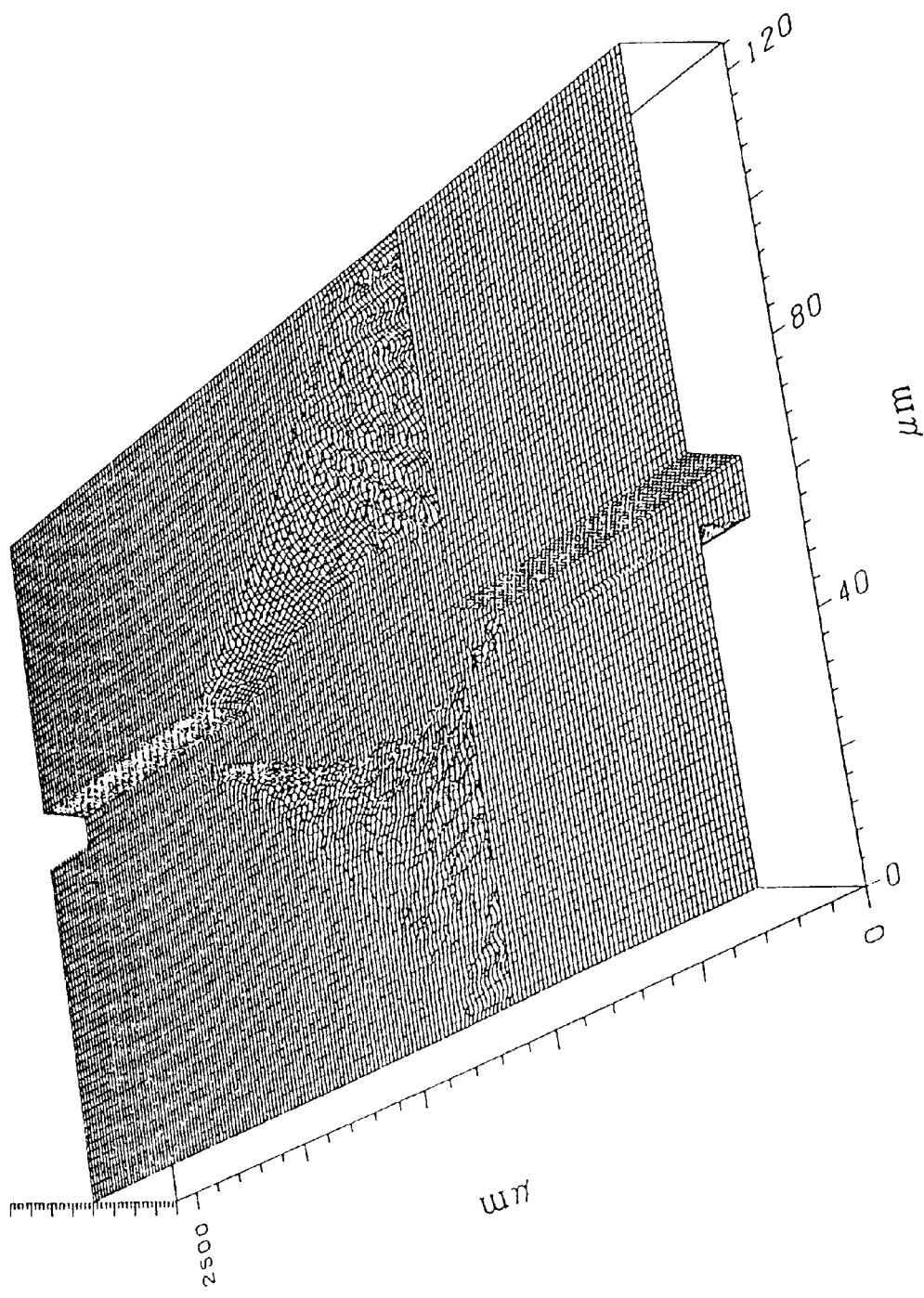
FIG. 26 is a refractive-index distribution diagram between optical parts with misalignment of optical axes coupled by the thirteenth embodiment of the present invention.

For example, when the optical axes of core layers are misaligned by 10 μm, the refractive-index distribution shown in FIG. 26 is obtained after applying the light for forming a high refractive-index image from either optical core.

In this example, the distance between core layers of the optical fibers 103 and 104 is assumed as 1,000 μm, each core diameter as 10 μm, refractive index of a core layer as 1.60, refractive index of a clad as 1.58, wavelength of the light applied to a refractive-index imaging material as 1.3 μm, refractive index of the periphery of the refractive-index imaging material as 1.58, and refractive-index difference between high refractive-index image of the material and its periphery as 0.01.

Also for the optical axis misalignment value of 10 μm, a theoretical coupling efficiency of 50% or more is obtained by excluding the optical loss due to the material.

As described above, because optical parts are optically coupled by the self-alignment system, the tolerance for alignment in first securing the optical parts is large, no high accuracy is requested, and thus the coupling efficiency between the optical parts is improved.

The tolerance for alignment between the optical parts formed by the above way gets large.

Figure 27A:
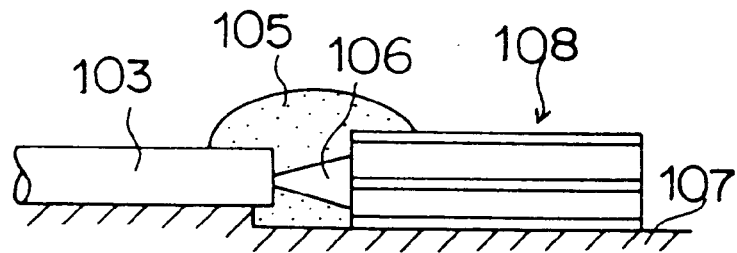
FIG. 27 (*a*) is a sectional view showing the state of coupling the optical fiber with the semiconductor laser in the thirteenth embodiment of the present invention, FIG. 27(*b*) is a sectional view showing the state of coupling the optical fiber with the semiconductor laser in the fifteenth embodiment of the present invention, and FIG. 27 (*c*) is a sectional view showing the state of coupling the optical fiber with the photodiode in the sixteenth embodiment of the present invention.
Figure 27B:
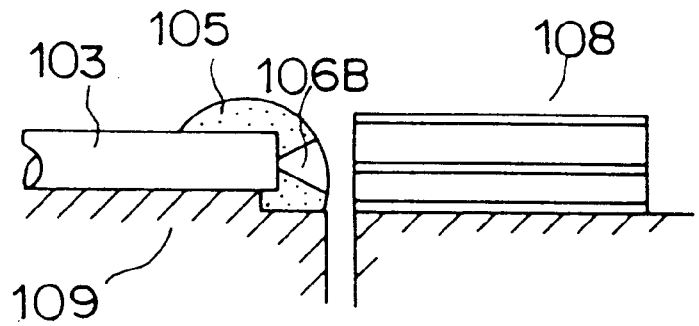
Figure 27C:
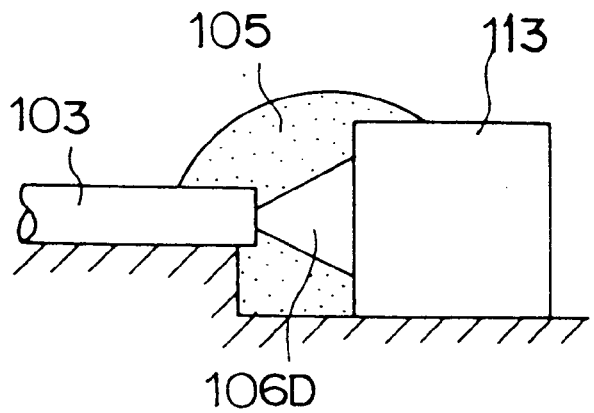
Figure 28A:
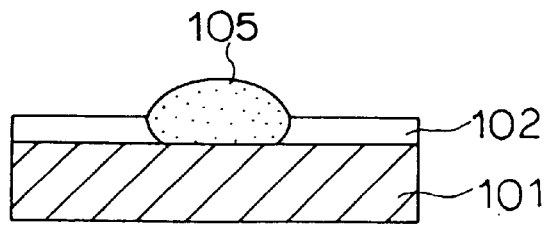
FIGS. 28(a) to 28(d) are sectional views showing the steps of the optical coupling method of the fourteenth embodiment of the present invention.
Figure 28B:
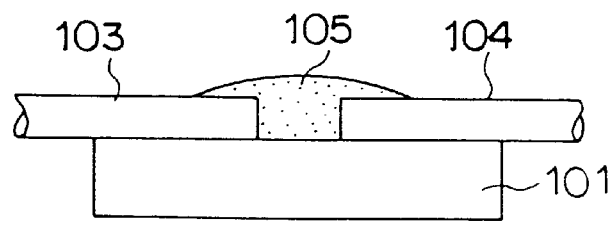
Figure 28C:
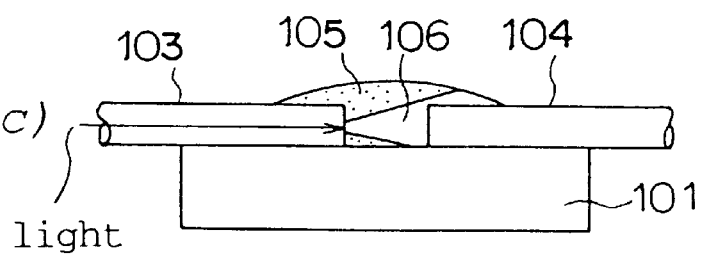
Figure 28D:
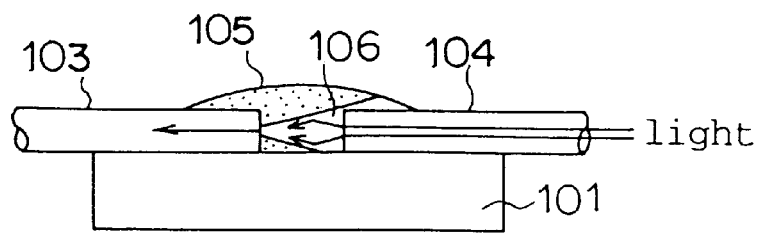
Figure 29A:
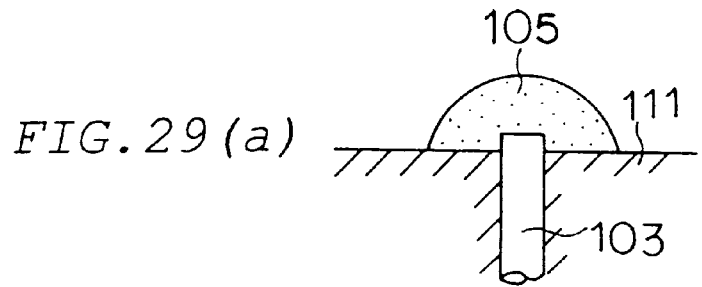
FIGS. 29(a) to 29(c) are sectional views showing the steps of the optical coupling method of the seventeenth embodiment of the present invention and FIG. 29(d) is a sectional view showing another configuration of the optical coupling method of the twelfth embodiment of the present invention.
Figure 29B:
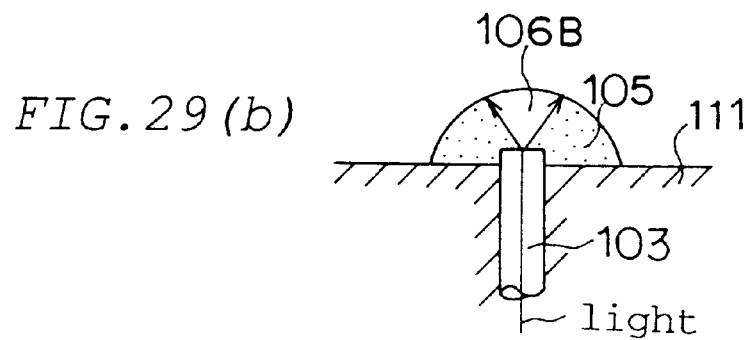
Figure 29C:
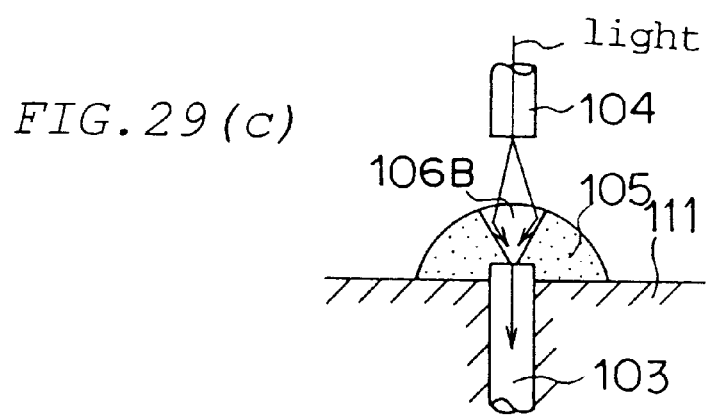
Figure 29D:
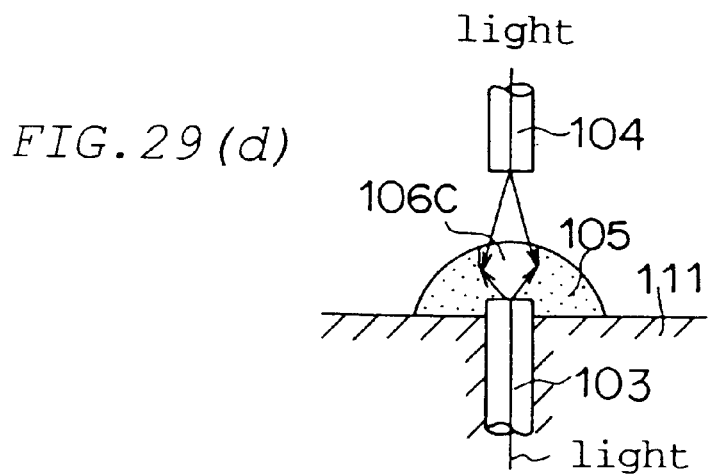
Figure 30A:
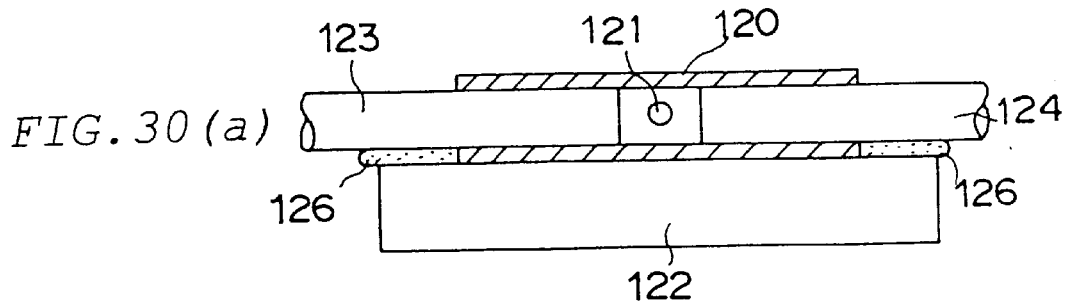
FIGS. 30(a) to 30(c) are sectional views showing the steps of the optical coupling methods of the eighteenth to twenty-second embodiments of the present invention and FIG. 30(d) is a sectional view showing another configuration of the optical coupling methods of the eighteenth to twenty-second embodiments of the present invention.
Figure 30B:
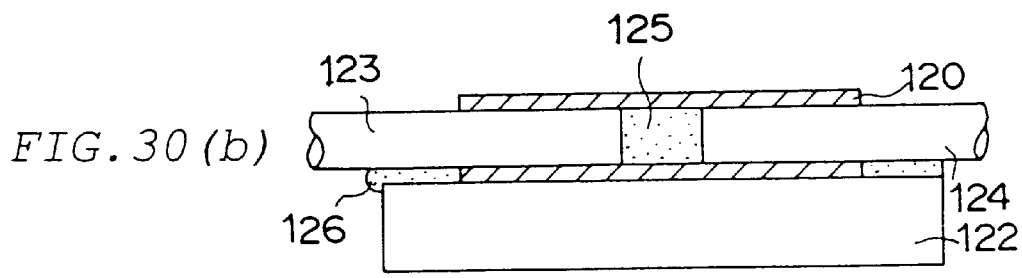
Figure 30C:
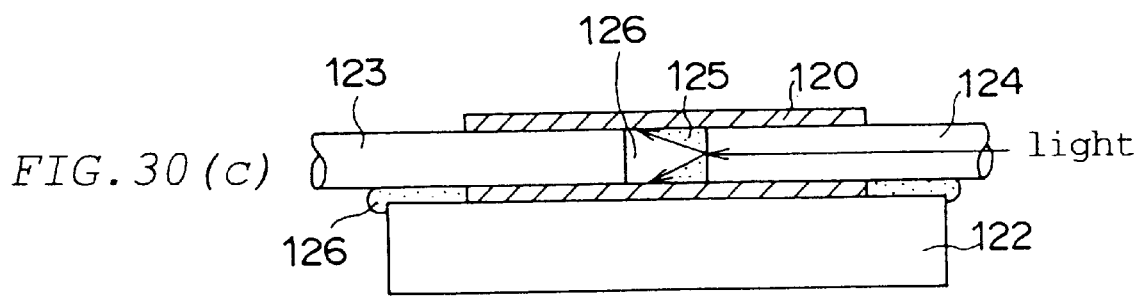
Figure 30D:
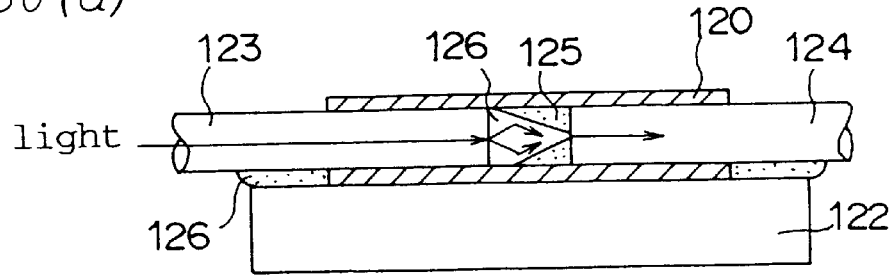

When optically coupling an optical fiber with a semiconductor layer, the optical fiber 103 and semiconductor laser 108 are mounted on the support substrate 107 to feed the refractive-index imaging material 105 between them as shown in FIG. 27 (*a*). Thereafter, the refractive-index imaging material 105 is dried and the optical fiber 103 is bonded with the semiconductor laser 108 before introducing the light for forming a high refractive-index image from the optical fiber 103 to form the horn-shaped high refractive-index image 106 in the refractive-index imaging material 105. Thereby, the light emitted from the edge of the semiconductor laser 108 is absorbed by the high refractive-index image 106 and enters the core of the optical fiber 3.

The 14th Embodiment

For the eighth embodiment described above, the edges of two optical parts are faced each other and thereafter a refractive-index imaging material is fed to the gap between them and its periphery. However, it is also possible to previously feed the refractive-index imaging material onto a support substrate thickly, put two optical parts there, and couple their devices.

The embodiment is described below by referring to FIGS. 28 (*a*) to 28 (*d*).

First, as shown in FIG. 28 (*a*), a refractive-index imaging material 105 dissolved in a solvent is dripped into a V-groove 102 on a support substrate 101. Then, as shown in FIG. 28 (*b*), optical fibers 103 and 104 are mounted on the V-groove 102 so that the refractive-index imaging material 105 is held between the edges of the optical fibers 103 and 104.

Then, the refractive-index imaging material 105 is left as it is for several hours before applying the light for forming a high refractive-index image to the refractive-index imaging material 105 from at least the core of the optical fiber 103 as shown in FIG. 28 (*c*). to form the high reflective portion 106 described in the first embodiment.

Thereafter, the refractive-index imaging material is cured by applying light such as ultraviolet rays to or heating the material according to necessity, similarly to the case of the first embodiment.

The optical fibers 103 and 104 thus connected are bonded to the support substrate 101 by the refractive-index imaging material 105 similarly to the case of the first embodiment and emission of light is prevented by the high refractive-index image 106 formed in the material 105 to transmit light from the optical fiber 104 to the optical fiber 103 as shown in FIG. 28(*d*).

The 15th Embodiment

For the thirteenth and fourteenth embodiment described above, a refractive-index imaging material is fed to the gap between the edges of two optical parts and its periphery to pass light through the material. However, the light emitted from a light-emitting device may be made to enter an optical fiber or light-detecting device through the space or light propagating in the space may be received by the light-detecting device.

The following is the description of optical coupling when sending or receiving light propagating in the space.

First, as shown in FIG. 29 (*a*), a refractive-index imaging material 105 is applied to the optical input/output portion of a first optical fiber 103 and then dried to secure it to a support substrate 111.

Then, the light for changing refractive indexes is inputted to the refractive-index imaging material 105 from the optical fiber 103 to form a horn-shaped high refractive-index image 106B whose space side is widened according to a light intensity distribution as shown in FIG. 29 (*b*). Thereafter, the refractive-index imaging material is cured by applying light such as ultraviolet rays to or heating the material according to necessity.

As shown in FIG. 29 (*d*), it is also possible to form a high refractive-index image 106C whose central portion is the widest by applying light to the material 105 from both the optical fibers 103 and 104.

Then, as shown in FIG. 29 (*c*), when the edge of the second optical fiber 104 is set toward a high refractive-index image 106B, the light emitted from the edge is collected by the high refractive-index image 106B and enters the core of the first optical fiber 103. In this case, it is not required to accurately position the second optical fiber 104.

Then, a case in optically coupling a semiconductor laser with an optical fiber through the space is described below by referring to FIG. 27 (b).

When the optical fiber 103 is mounted on a support substrate 109 and the refractive-index imaging material 105 is fed to the edge of the fiber 103 and thereafter light is applied to the refractive-index imaging material 105 through the optical fiber 103, the horn-shaped high refractive-index image 106B whose space side is widened due to the light intensity distribution is formed in the refractive-index imaging material 105. When light is emitted toward the high refractive-index image 106 from a semiconductor laser 108, the light is focused by the high refractive-index image 106B and enters the optical fiber 103.

This is effective in transmitting light between optical parts secured separately from each other or making a space light beam enter a light-electricity transforming device.

For this embodiment, an optical part is mounted on a support substrate and thereafter a refractive-index imaging material is fed to at least the edge of the part. However, it is also possible to feed the refractive-index imaging material onto the support substrate and thereafter mounting the optical part on the support substrate.

The 16th Embodiment

The above thirteenth to fifteenth embodiments use optical fibers as two optical parts to be connected. However, it is also possible to use the above coupling method when coupling same optical parts or different optical parts among optical fibers, waveguides, semiconductor lasers, semiconductor light amplifiers, waveguide-type photodiodes, and edge emitting devices.

To form a high refractive-index image in a refractive-index imaging material fed to the space between two optical parts and its periphery, for example, light is applied from one or both of the parts when coupling, for example, an optical fiber with a waveguide.

When coupling an optical fiber or waveguide with a photodiode, light is applied only from the optical fiber or waveguide to form a conical high refractive-index image. In this case, the light is not focused by the high refractive-index image. To propagate a divergent light, however, a propagative beam pattern whose divergence is prevented in self-focusing by the conical high refractive-index image is formed and the intensity of the light entering the light-detecting portion of the light-electricity transforming device can be increased.

As shown in FIG. 27 (c), for example, a photodiode 113 with the light-detecting face of 50 $\mu$m in diameter is secured, a gap of 1 mm is formed on the light-detecting face so that the edge of the optical fiber 103 faces the gap to feed the refractive-index imaging material 105 to the gap and its periphery while keeping the state. Then, the light with the wavelength of 488 nm is applied to the refractive-index imaging material 105 from the optical fiber 103 to form a high refractive-index image 106D. As a result, it is found that approximately 100% of the light is collected to the light-detecting face when providing the material with a refractive-index difference of up to 0.01. However, when no refractive-index distribution is formed in the above refractive-index imaging material, the light entering the light-detecting face of the photodiode is decreased to approximately 47%.

The 17th Embodiment

For this embodiment, experiment results are described when a high refractive-index image is formed and not formed in a refractive-index imaging material.

As shown in FIG. 30 (a), a glass cylinder 120 having a transverse groove with the diameter of 145 $\mu$m is set to a support substrate 122 and thereafter first and second optical fibers 123 and 124 with the clad diameter of 125 $\mu$m and core diameter of 10 $\mu$m are inserted into the glass cylinder 120 from the both sides of the cylinder. In the glass cylinder 120, the edges of the optical fibers 123 and 124 are set to the both sides of the transverse groove 121 at the interval of 400 $\mu$m. Under this state, the optical fibers 123 and 124 are bonded to the support substrate 122 with an adhesive 127.

Then, the refractive-index imaging material 125 shown in Table 1 is dripped onto the transverse groove 121 of the glass cylinder 120 to fill the gap between the optical fibers 123 and 124 as shown in FIG. 30 (b), and this state is left as it is to dry the material.

TABLE 1

| MATERIAL | WEIGHT (g) |
| --- | --- |
| alicyclic epoxy | 1.5 |
| (EHPE-3150, DAISEL UCB Co., Ltd.) | |
| allylcarbazole | 0.4 |
| (NIPPON JORYU KOGYO Co., Ltd.) | |
| N-($\beta$-acryloyloxyethy)carbazole | 0.1 |
| (NIPPON JORYU KOGYO Co., Ltd.) | |
| trimethylolpropane triacrylate | 0.25 |
| (KYOEISHA YUSHI KAGAKUKOGYO Co., Ltd.) | |
| multifunctional monomer | 0.25 |
| (ART RESIN UN-100X, NEGAMI KOGYO Co., Ltd.) | |
| bi-imidazole | 0.02 |
| (B1225, TOKYO KASEI KOGYO Co., Ltd.) | |
| methyl triazole tiol | 0.02 |
| cyclopentanone Pigment | 0.0004 |
| (MKX1460, NIPPON KANKO SHIKISO Co., Ltd.) | |
| dichloromethane | 1.0 |
| tetrahydrofuran | 1.0 |

As the result of connecting the second optical fiber 124 to a not-illustrated light intensity measuring instrument and then applying a He—Ne laser beam with the wavelength of 632.8 nm to the first optical fiber 123 by using a laser focusing holder (not illustrated), the intensity of the light entering the light intensity measuring instrument through the second optical fiber 124 is 410 nW.

As the result of applying the He—Ne laser beam to the light intensity measuring instrument through a not-illustrated another optical fiber, the light intensity of 43 $\mu$W is obtained.

These measured values obtained from the light intensity measuring instrument are average values of the upper and lower limit values when performing measurement for approximately 1 min (the same is applied to the following description).

Then, the second optical fiber 124 is removed from the light intensity measuring instrument and an argon laser beam with the wavelength of 488 nm is applied to the refractive-index imaging material 125 through the optical fiber 124 for approximately 50 min by using the laser focusing holder. The intensity of the beam is set to 1,000 nW. Thereby, as shown in FIG. 30 (c), a high refractive-index image 126 is formed in the refractive-index imaging material 125.

Thereafter, as the result of connecting the second optical fiber 124 to the light intensity measuring instrument and introducing a laser beam with the wavelength of 632.8 nm into the second optical fiber 124 again through the first optical fiber 123 as shown in FIG. 30 (b), the light intensity measuring instrument shows the value of 6,780 nW.

Therefore, by applying the argon laser beam, it is confirmed that the high refractive-index image 126 is formed in the refractive-index imaging material 125.

Thereby, the intensity of the laser beam propagating from the first optical fiber 123 to the second optical fiber 124 increases up to approximately 16 times and the high refractive-index imaging material effect is confirmed. The optical coupling efficiency is calculated as approximately 16%.

The refractive-index imaging material shown in Table 1 is also applied to the thirteenth to sixteenth embodiments. At a portion to which the argon laser beam is applied, monomers are polymerized, the monomer density increases according to the intensity distribution, and the refractive-index rises. The refractive-index imaging material also serves as an adhesive.

The 18th Embodiment

The first and second optical fibers 123 and 124 are secured in the glass cylinder 120 in the same way as the seventeenth embodiment.

Then, the support substrate 122 supporting the glass cylinder 120 is mounted on a heating table (not illustrated) and the refractive-index imaging material 125 is fed into the gap between the edges of the optical fibers 123 and 124 to heat and dry the material at the temperature of 60° C. in the same way as the twelfth embodiment.

Then, as the result of connecting the second optical fiber 124 to the light intensity measuring instrument and introducing the He—Ne laser beam into the second optical fiber 124 through the first optical fiber 123 and refractive-index imaging material 125 by using the laser focusing holder, the light intensity measuring instrument shows the light intensity of 110 nW.

Thereafter, a laser beam with the wavelength of 488 nm is introduced into the second optical fiber 124 to apply it to the refractive-index imaging material 125 for 30 min.

Thereafter, the material is cooled at the temperature lowering rate of 0.5° C./min. Then, as the result of connecting the second optical fiber 124 to the light intensity measuring instrument and introducing the He—Ne laser beam into the first optical fiber 123 again and measuring the intensity of the light passing through the second optical fiber 124, the light intensity of 5520 nW is obtained.

Therefore, by heating and drying the refractive-index imaging material 125 and then applying the argon laser beam to the material, a high refractive-index image is formed. Thereby, the intensity of the laser beam entering the second optical fiber 124 from the firs optical fiber 123 increases up to approximately 50 times and the high refractive-index image effect is confirmed. The optical coupling efficiency is calculated as approximately 13%.

From the above mentioned, it is found that there is no bad influence even if heating is performed at approximately 60° C. before forming the high refractive-index image 126 in the refractive-index imaging material 125.

The 19th Embodiment

As the result of making the diameters of the cladding and cores of the first and second optical fibers 123 and 124 described in the seventeenth embodiment differ from each other and changing the refractive-index imaging material 125, the following results are obtained.

For example, the diameter of the cladding of the first optical fiber 123 is set to 125 μm, the diameter of the core of it is set to 10 μm, and the diameter of the cladding of the second optical fiber 124 is set to 125 μm and the diameter of the core of it is set to 50 μm.

TABLE 2

| MATERIAL | WEIGHT (g) |
|---|---|
| acrylic denatured silicone | 1.5 |
| (KR9706, SHINETSU KAGAKU KOGYO Co., Ltd.) | |
| allylcarbazole | 0.3 |
| (NIPPON JORYU KOGYO Co., Ltd.) | |
| vinylcarbazole (ANAN) | 0.1 |
| vinylnaphthalene (POLYSCIENCE) | 0.1 |
| multifunctional monomer | 0.2 |
| (ART RESIN UN-100X, NEGAMI KOGYO Co., Ltd.) | |
| 1,6-hexanediolmethacrylate | 0.2 |
| (KYOEISHA YUSHI KAGAKUKOGYO Co., Ltd.) | |
| trimethylolpropane triacrylate | 0.2 |
| (KYOEISHA YUSHI KAGAKUKOGYO Co., Ltd.) | |
| bi-imidazole | 0.02 |
| (B1225, TOKYO KASEI KOGYO Co., Ltd.) | |
| methyl triazole tiol | 0.02 |
| cyclopentanone pigment | 0.0004 |
| (MKX1460, NIPPON KANKO SHIKISO Co., Ltd.) | |
| dichloromethane | 1.0 |
| tetrahydrofuran | 1.0 |

Thereafter, as the result of connecting the optical fiber 123 to the light intensity measuring instrument and introducing a beam with the wavelength of 632.8 nm into the second optical fiber 124, the light intensity measuring instrument indicates the light intensity of 55 nW.

Then, the first optical fiber 123 is removed from the light intensity measuring instrument and ultraviolet rays are introduced into the first optical fiber 123 to apply the rays to the refractive-index imaging material 125 present between the optical fibers 123 and 124 for 30 min.

Thereafter, as the result of connecting the second optical fiber 124 to the light intensity measuring instrument again and introducing a beam with the wavelength of 632.8 nm through the first optical fiber 123 and high refractive-index image 126, the light intensity measuring instrument indicates the light intensity of 1,730 nW. Thus, the intensity of the light propagating in the optical fibers 123 and 124 increases up to approximately 31 times.

The refractive-index imaging material shown in Table 2 is applied to the thirteenth to sixteenth embodiments. At a portion to which the argon laser beam is applied, monomers are polymerized, the monomer density increases according to the beam intensity distribution, and the refractive index rises. The refractive-index imaging material also serves as an adhesive.

The 20th Embodiment

The refractive-index imaging material of this embodiment is compounded as follows:

First, 1.6 g of acrylic denatured silicone varnish KR9706, 0.8 g of methylmethacrylate, 0.3 g of glycidyl methacrylate, and 0.04 g of azobis(isobutyronitrile) are dissolved in dioxane of 7.2 g and they are heated and agitated at 70° C. for 1 hr. Then, they are cooled up to the room temperature and thereafter, 40 μl (microlitter) of trimethylolpropane triacrylate and 40 μl of neopentyl glycol diacrylate are dripped into them and they are agitated and then moreover heated and agitated at 70° C. for 1 hr.

Then, they are cooled up to the room temperature. Thereafter, 1.0 g of tetrahydrofuran, 0.66 g of allyl carbazole, 0.66 g of N-vinyl carbazole, 0.66 g of trimethylolpropane triacrylate, 0.04 g of bi-imidazole (B1225, TOKYO KASEI Co., Ltd.), 0.04 g of methyl triazole thiol, and 0.04 g of cyclopentanone pigment (NKX1460, NIPPON KANKO SHIKISO Co., Ltd.) are added to them.

This completes compounding of the refractive-index imaging material.

Thereafter, the first and second optical fibers 123 and 124 same as those used for the twelfth embodiment are inserted into the glass cylinder 120.

Then, as the result of connecting the first optical fiber 123 to a light intensity measuring instrument (not illustrated) and introducing a beam with the wavelength of 632.8 nm into the second optical fiber 124 without filling the gap between the optical fibers 123 and 124 with any material, the light intensity measuring instrument indicates the light intensity of 8 $\mu$W.

As the result of inputting a beam with the wavelength of 632.8 nm to the light intensity measuring instrument through another optical fiber, the instrument indicates the light intensity of 60 $\mu$W.

Then, the above refractive-index imaging material 125 is dripped into the transverse groove 121 of the glass cylinder 120 to fill the gap between the optical fibers 123 and 124 with the material, and this state is left as it is for 14 hr to dry the material.

Then, as the result of connecting the first optical fiber 123 to the light intensity measuring instrument and introducing a beam with the wavelength of 632.8 nm into the second optical fiber, the instrument indicates the light intensity of 9 $\mu$W.

Then, an argon laser beam is applied to the refractive-index imaging material 125 for 80 min through the second optical fiber 124. Thereby, the high refractive-index image 126 is formed.

Thereafter, as the result of applying a beam with the wavelength of 488 nm to the light intensity measuring instrument by using another optical fiber, the instrument indicates the light intensity of 40 nW. As the result of connecting the first optical fiber 123 to the light intensity measuring instrument and introducing a beam with the wavelength of 632.8 nm into the second optical fiber 124, the instrument indicates the light intensity of 30 $\mu$W. The coupling efficiency is calculated as 50%.

The 21th Embodiment

The refractive-index imaging material of this embodiment is compounded as follows:

First, 1.6 g of acrylic denatured silicone varnish KR9706 0.8 g of methylmethacrylate, 0.4 g of glycidyl methacrylate, and 0.04 g of azobis(isobutyronitrile) are dissolved in dioxane of 7.2 g and they are heated and agitated at 70° C. for 2 hr.

Then, they are cooled up to the room temperature and thereafter, 0.66 g of allyl carbazole, 0.66 g of N-vinyl carbazole, 0.66 g of trimethylolpropane triacrylate, 0.04 g of bi-imidazole, 0.04 g of methyl triazole thiol, and 0.0004 g of cyclopentanone pigment are added to them and agitated. This completes compounding of the refractive-index imaging material.

An experiment is performed by using the above material and a beam with the wavelength of 1.3 $\mu$m instead of the beam with the wavelength of 632.8 nm used for the fifteenth embodiment.

First, the optical fibers 123 and 124 same as those used for the fifteenth embodiment are inserted into the glass cylinder 120.

Then, the refractive-index imaging material 125 shown in the fifteenth embodiment is dripped into the transverse groove of the glass cylinder to fill the gap between the optical fibers 123 and 124 with the material, and this state is left as it is for 17 hr to dry the material.

Then, as the result of connecting the first optical fiber 123 to a light intensity measuring instrument (not illustrated) and introducing a beam with the wavelength of 1.3 $\mu$m into the second optical fiber 124, the instrument indicates the light intensity of 50 $\mu$W.

As the result of inputting a beam with the same wavelength to the light intensity measuring instrument through another optical fiber (not illustrated), the instrument indicates the light intensity of 180 $\mu$W.

Then, an argon laser beam is applied to the refractive-index imaging material 125 through the second optical fiber 124 to form the high refractive-index image 126.

Thereafter, as the result of connecting the first optical fiber 123 to the light intensity measuring instrument and introducing the beam with the wavelength of 1.3 $\mu$m into the second optical fiber 124 again, the instrument indicates the light intensity of 170 $\mu$W.

When the refractive-index imaging material 125 is left as it is, unreacted monomers in the material are polymerized with elapse of time and the light intensity decreases. Therefore, the stability of the material becomes degraded.

Therefore, the high refractive-index image 126 is formed to measure the light intensity and thereafter ultraviolet rays are applied to the material for 160 min from the outside. When 10 min passes after start of application of ultraviolet rays, the entire portion is heated at 40° C.

Thereafter, as the result of measuring the intensity of the light passing through the first optical fiber 123, high refractive-index image 126, and second optical fiber 124, the light intensity of approximately 100 $\mu$W is obtained.

As the result of leaving this stage as it is for 17 hr and mesuring the light intensity again, it is found that the value hardly changes, the light intensity is not decreased due to applying of ultraviolet rays or heating, and the material is stable.

The 22th Embodiment

The refractive-index imaging material of this embodiment is compounded as follows:

First, 0.1 g of silicon contained monomer (V4800, CHISSO Co., Ltd.), 0.35 g of methyl methacrylate, 0.35 g of trifluoromethyl methacrylate, 0.1 g of glycidyl methacrylate, and 0.02 g of azobisisobutyronitrile are dissolved in dioxane of 4.0 g and they are heated and agitated at 70° C. for 1 hr.

Then, they are cooled up to the room temperature and thereafter, 40 $\mu$l (microlitter) of trimethylolpropane triacrylate and 40 $\mu$l of neopentyl glycol diacrylate are dripped into them and they are agitated and then moreover heated and agitated at 70° C. for 6 hr.

Then, they are cooled up to the room temperature. Thereafter, 1.0 g of tetrahydrofuran, 0.25 g of allyl carbazole, 0.25 g of N-vinyl carbazole, 0.25 g of methacryloxyethyl oxycarbazole, 0.25 g of trimethylolpropane triacrylate, 0.04 g of bi-imidazole (B1225, TOKYO KASEI Co., Ltd.), 0.04 g of methyl triazole thiol, and 0.04 g of cyclopentanone pigment (NKX1460, NIPPON KANKO SHIKISO Co., Ltd.) are added to them.

This completes compounding of the refractive-index imaging material.

Figure 31A:
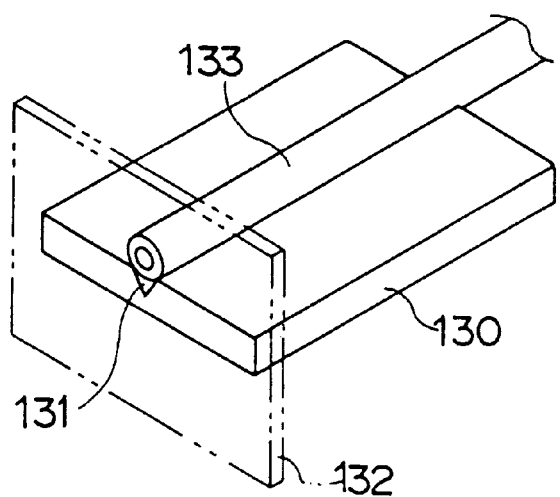
FIG. 31(a) is a perspective view showing the initial state of the optical coupling method of the twenty-third embodiment of the present invention and FIGS. 31(b) to 31(c) are sectional views showing the steps of the optical coupling method of the twenty-third embodiment of the present invention.
Figure 31B:
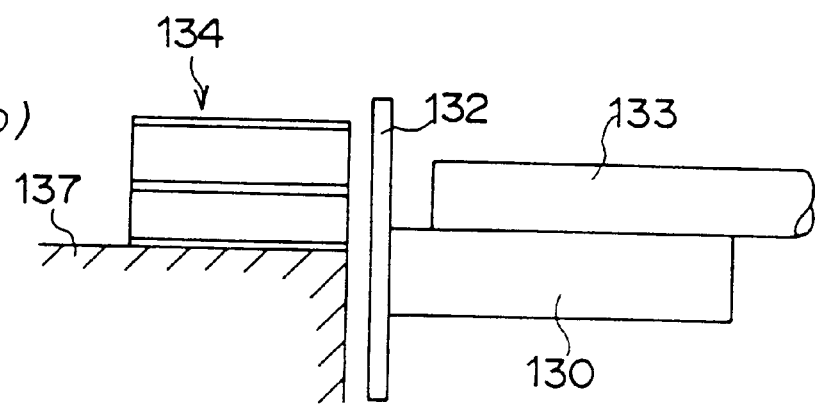
Figure 31C:
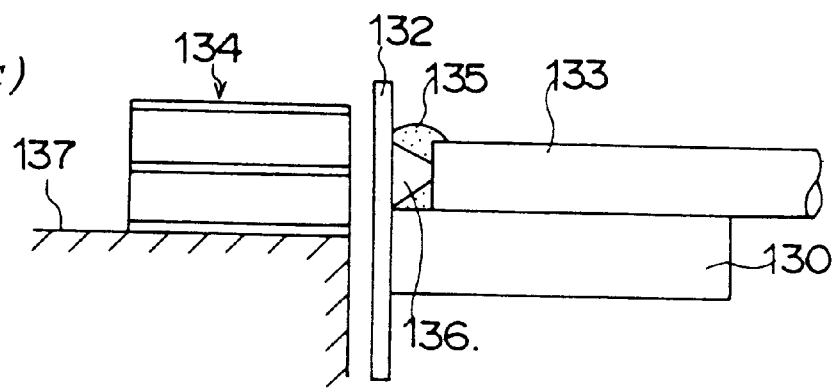

Then, as shown in FIG. 31 (a), one face of a second glass plate 132 with the thickness of 0.2 mm is bonded to one edge of a first glass plate 130 with the dimensions of 30×30×5 mm having a V-groove 131 with the maximum width of 300 μm.

Then, the other end of an optical fiber 133 with one end connected to a connector and its periphery are stripped and fitted into the V-groove 131 of the first glass plate 130 and secured so that the other end is separate 1 mm from the second glass plate 132.

Then, as shown in FIG. 31 (b), a semiconductor laser 134 is mounted on a slow-motion stage 137 so that the light output portion of the laser 134 faces the edge of the optical fiber 133 through the second glass plate 132. Moreover, the connector at one end of the optical fiber 133 is connected to a light intensity measuring instrument (not illustrated).

As the result of applying the current of 40 mA to the laser 134 to emit light, the light intensity measuring instrument indicates the light intensity of 15 nW.

Then, as shown in FIG. 31 (c), the refractive-index imaging material 135 is dripped into the gap between the edge of the optical fiber 133 and second glass plate 132 to dry the material. Then, an argon laser beam with the wavelength of 515 nm is applied to the refractive-index imaging material 135 for 150 min through the optical fiber 133. Thereby, a horn-shaped high refractive-index image 136 is formed.

Thereafter, as the result of making the semiconductor laser 134 emit light again, the light intensity indicated by the light intensity measuring instrument increases up to 190 nW.

The refractive-index imaging material of this embodiment is applied to the thirteenth to sixteenth embodiments. At a portion to which the argon laser beam is applied, monomers are polymerized, the monomer density increases according to the intensity distribution, and the refractive index rises. The refractive-index imaging material also serves as an adhesive.

The 23th Embodiment

In the above refractive-index imaging material, it is possible to form not only the above-mentioned refractive-index image having the focusing lens effect but an interference-fringe image formed through interference exposure with coherent light as a refractive-index image. The following is the description of characteristics when forming a refractive-index image from an interference-fringe image and generating a hologram.

First, the refractive-index imaging material shown in Table 3 is applied to a glass substrate of 70×70 mm with a doctor blade and dried in a nitrogen box for 1 hr and then in an oven at 70° C. for 10 min to use it as a sensitized plate.

TABLE 3

| MATERIAL | WEIGHT (g) |
|---|---|
| alicyclic epoxy | 1.0 |
| (EHPE-3150, DAISEL UCB Co., Ltd.) | |
| allylcarbazole | 0.2 |
| (NIPPON JORYU KOGYO Co., Ltd.) | |
| vinylcarbazole (ANAN) | 0.2 |
| multifunctional monomer | 0.2 |
| (ART RESIN UN-100X, NEGAMI KOGYO Co., Ltd.) | |
| trimethylolpropane triacrylate | 0.2 |
| (KYOEISHA YUSHI KAGAKUKOGYO Co., Ltd.) | |
| bi-imidazole | 0.04 |
| (B1225, TOKYO KASEI KOGYO Co., Ltd.) | |
| methyl triazole tiol | 0.04 |

TABLE 3-continued

| MATERIAL | WEIGHT (g) |
|---|---|
| cyclopentanone pigment | 0.0008 |
| (MKX1460, NIPPON KANKO SHIKISO Co., Ltd.) | |
| dioxane | 2.0 |
| tetrahydrofuran | 2.0 |

A transmission-type hologram image with the spatial frequency of 2,500 interference-fringes/nm and the fringe inclination of 0° is exposed to the sensitized plate by using an argon laser beam with the wavelength of 488 nm. The exposure intensity is set to 2 mW/cm² and the exposure time is set to 200 sec. As the result of measuring the diffraction efficiencies (ηs: diffraction efficiency in regenerating s-polarized light, ηp: diffraction efficiency in regenerating p-polarized light), values of ηs=55% and ηp=80% are obtained.

Then, the transmission-type hologram is heated in an oven at 80° C. for 1 hr. As the result of measuring the diffraction efficiencies again, values of ηs=19% and ηp=74% are obtained. The film thickness of 23 μm is obtained. The film thickness is measured with a probe-type film thickness meter (ALPHASTEP TENCOL Inc.).

The 24th Embodiment

A hologram image is also described in this embodiment.

First, the refractive-index imaging material shown in Table 4 is applied to a glass substrate of 70×70 mm with a doctor blade and dried in a nitrogen box for 1 hr and then in an oven at 70° C. for 10 min to use it as a sensitized plate.

TABLE 4

| MATERIAL | WEIGHT (g) |
|---|---|
| chlorotrifluoroethylene/vinyl trimethyl acetate/hydroxyethlacrylate = 31/51/18 mol ratio polymerization | 1.0 |
| allylcarbazole | 0.2 |
| (NIPPON JORYU KOGYO Co., Ltd.) | |
| vinylcarbazole (ANAN) | 0.2 |
| naphtylacrylate (POLYSCIENCE) | 0.2 |
| multifunctional monomer | 0.2 |
| (ART RESIN UN-100X, NEGAMI KOGYO Co., Ltd.) | |
| trimethylolpropane triacrylate | 0.2 |
| (KYOEISHA YUSHI KAGAKUKOGYO Co., Ltd.) | |
| bi-imidazole | 0.04 |
| (B1225, TOKYO KASEI KOGYO Co., Ltd.) | |
| methyl triazole tiol | 0.04 |
| cyclopentanone pigment | 0.0008 |
| (MKX1460, NIPPON KANKO SHIKISO Co., Ltd.) | |
| dioxane | 2.0 |
| tetrahydrofuran | 2.0 |

A mirror-reflection-type hologram image with the incident angle of 45° is exposed to the sensitized plate by using an argon laser beam with the wavelength of 488 nm. The exposure intensity is set to 1 mW/cm² and the exposure time is set to 400 sec.

After exposure of the image, transmission spectrum is measured through vertical incidence by using an instantaneous spectrophotometer (MCPD-100, OTSUKA DENSHI Co., Ltd.). As a result, a spectrum having a small-transmittance region due to diffraction around the wavelength of 540 nm is obtained. The diffraction efficiency is 48% and the diffraction wavelength width is 9 nm.

Then, the reflection-type hologram is heated in an oven at 80° C. for 1 hr. Then, as the result of measuring the transmission spectrum and calculating the diffraction efficiency and diffraction wavelength width is measured in the same way as the twelfth embodiment, the diffraction efficiency is 69%, the diffraction wavelength width is 28 nm, and the film thickness is 26 μm.

The 25th Embodiment

A hologram image is also described in this embodiment.

First, the refractive-index imaging material shown in Table 4 is applied to a glass substrate of 70×70 mm with a doctor blade and dried in a nitrogen box for 1 hr and then in an oven at 70° C. for 10 min to use it as a sensitized plate.

TABLE 5

| MATERIAL | WEIGHT (g) |
|---|---|
| acrylic denatured silicone (KR9706, SHINETSU KAGAKU KOGYO Co., Ltd.) | 1.0 |
| allylcarbazole (NIPPON JORYU KOGYO Co., Ltd.) | 0.2 |
| vinylcarbazole (ANAN) | 0.2 |
| ALONIX M315 (TOAGOSEI KAGAKUKOGYO Co., Ltd.) | 0.2 |
| trimethylolpropane triacrylate (KYOEISHA YUSHI KAGAKUKOGYO Co., Ltd.) | 0.2 |
| bi-imidazole (B1225, TOKYO KASEI KOGYO Co., Ltd.) | 0.04 |
| methyl triazole tiol | 0.04 |
| cyclopentanone pigment (MKX1460, NIPPON KANKO SHIKISO Co., Ltd.) | 0.0008 |
| dioxane | 1.5 |
| tetrahydrofuran | 1.5 |

A transmission-type hologram is exposed to the sensitized plate in the same way as the eleventh embodiment. As the result of measuring the diffraction efficiencies, values of $\eta s=75\%$ and $\eta p=49\%$ are obtained.

Then, the transmission-type hologram is heated in an oven at 80° C. for 1 hr. As the result of measuring the diffraction efficiencies, values of $\eta s=82\%$ and $\eta p=87\%$ are obtained. The film thickness is 31 μm.

Moreover, as the result of using epoxy denatured silicone (SR2115, TORAY DOW CORNING Co., Ltd.) shown in Table 5 instead of acrylic denatured silicone, compounding a solution by adding 0.05 g of a hardener (SR2115K, TORAY DOW CORNING Co., Ltd.), and similarly making a hologram, diffraction efficiencies of $\eta s=78\%$ and $\eta p=70\%$ are obtained.

The 26th Embodiment

A hologram image is also described in this embodiment.

First, a sensitized plate is made by similarly applying the refractive-index imaging material used for the twenty-fifth embodiment.

A reflection-type hologram is exposed to the sensitized plate by using an argon laser beam with the wavelength of 488 nm and reflection-type hologram making optical system with the incident angle of 30–60°.

Then, as the result of measuring the transmission spectrum and examining characteristics in the same way as the twenty-third embodiment, the diffraction efficiency is 32% and the diffraction wavelength width is approximately 9 nm.

Then, the reflection-type hologram is heated in an oven at 80° C. for 1 hr. As the result of measuring the spectrum and examining characteristics again, the diffraction efficiency is 42% and the diffraction wavelength width is approximately 14 nm.

The 27th Embodiment

A hologram image is also described in this embodiment.

First, the refractive-index imaging material compounded in the nineteenth embodiment is applied to a glass substrate of 70×70 mm with a doctor blade and dried in a nitrogen box for 1 hr and then in an oven at 70° C. for 10 min.

A reflection-type hologram is exposed to the sensitized plate by using an argon laser beam with the wavelength of 488 nm and a reflection-type hologram making optical system with the incident angle of 30–60°.

As the result of measuring the transmission spectrum and examining characteristics in the same way as the sixteenth embodiment, the diffraction efficiency is 41% and the diffraction wavelength width is approximately 9 nm.

The 28th Embodiment

The following is the description of refractive-index imaging materials.

<1> Refractive-index imaging materials are made of, for example, the following materials.

The first refractive-index imaging material is made of an alicyclic or chain compound having an epoxy group, ethylene unsaturated compound containing an aromatic ring or halogen, multifunctional acrylate or multifunctional methacrylate, and photopolymerization initiator.

The second refractive-index imaging material is made of an organic denatured silicone, ethylene unsaturated compound containing an aromatic ring or halogen, multifunctional acrylate or multifunctional methacrylate, and photopolymerization initiator. The organic denatured silicone is any one of acrylic denatured silicone, methacrylic denatured silicone, and epoxy denatured silicone.

The third refractive-index imaging material is compounded by the following method.

First, an ethylene unsaturated compound containing silicone, an ethylene unsaturated compound whose general expression is shown as "$R_1CH\!=\!CHCOOR_2$", and thermopolymerization initiator are dissolved in a solvent and heated and agitated to make a copolymer solution. Then, the copolymer solution is cooled up to the room teperature and thereafter, an ethylene unsaturated compound containing an aromatic ring or halogen, multifunctional acrylate or multifunctional methacrylate, and photopolymerization initiator are added to the copolymer solution. Thus, the refractive-index imaging material is completed. In this case, $R_1$ in the general expression is $CH_3$ or H and $R_2$ is a chain compound or alicyclic compound group having carbon atoms of 1 to 4 (the same is applied to the following).

The fourth refractive-index imaging material is compounded by the following method.

First, an ethylene unsaturated compound containing silicone, an ethylene unsaturated compound whose general expression is shown as "$R_1CH\!=\!CHCOOR_2$", multifunctional acrylate or multifunctional methacrylate, and thermopolymerization initiator are dissolved in a solvent and heated and agitated to make a copolymer solution. Then, the copolymer solution is cooled up to the room temperature and thereafter, an ethylene unsaturated compound containing an aromatic ring or halogen, multifunctional acrylate or multifunctional methacrylate, and photopolymerization initiator are added to the copolymer solution. Thus, the refractive-index imaging material is completed.

The fifth refractive-index imaging material is made of a thermosetting copolymer containing acrylate or methacrylate having a hydrogen group at its end in the building block of the copolymer, an ethylene unsaturated compound containing an aromatic ring or halogen, multifunctional acrylate or multifunctional methacrylate, and photopolymerization initiator. The thermosetting copolymer is a substance containing, for example, chlorotrifluoroethylene, vinyl trimethyl acetate, and acrylate or methacrylate having a hydroxyl group at its end in the building block of the substance.

In the above refractive-index imaging material s, the ethylene unsaturated compound containing an aromatic ring or halogen is any one of, for example, allyl carbazo e, methacryloyloxyethylcarbazole, acryloylethyloxycarbazole, vinylcarbazole, vinylnaphthalene, naphtylacrylate, tribromophenylacrylate, dibromophenylacrylate, and phenoxyethylacrylate, or a mixture of any ones of these compounds.

<2> The following are components of a refractive-index imaging material.

The refractive-index imaging material is made of at least a binder, photosensitive monomer, and optical initiator.

(i) The binder of the refractive-index imaging material uses a copolymer having alicyclic epoxy, chain epoxy, organic denature silicone, and ethylene unsaturated compound containing a hydroxyl group at its end in the building block of the copolymer or a copolymer having an ethylene unsaturated compound containing silicone in the building block of the copolymer. These binders have a reactive group, which can be made to react through heating or optical reflection. Thus, a high durability can be obtained.

It is possible to use 3,4-epoxycyclohexylmethyl-3,4-epoxycyclohexanecarboxylate, ERL-4299 (made by UCC), ERL-4092 (made by UCC), EHPE-3150 (DAISERU UCB Co., Ltd.), EPOLAITO 4000, EPOLAITO 100MF, EPOLAITO 80MF, EPOLAITO 1600, EPOLAITO 1500NP, EPOLAITO 400P, EPOLAITO 400E, EPOLAITO M-1230 (KYOEISHA YUSHI KAGAKUKOGYO Co., Ltd.), and a mixture or copolymer of these compounds for the alicyclic or chain epoxy. EPOLAITO is a trade name.

It is possible to use acrylic denatured silicone, methacrylic denatured silicone, or epoxy denatured silicone for the organic denatured silicone. Moreover, it is possible to use a copolymer made by heating an ethylene unsaturated compound containing silicone and other ethylene unsaturated compounds in a solvent and partially copolymerizing them for the binder. It is also possible to add multifunctional acrylate or multifunctional methacrylate as a monomer to be copolymerized.

The ethylene unsaturated compound containing silicon includes 3-acryloxypropyltrimethoxy silane, 3-methacryloxylpropyltrimethoxy silane, methacryloxypropyltris (trimethylsiloxy) silane, acryloxypropylmethylbis (trimethylsiloxy) silane, acrylic denatured silicone, and methacrylic denatured silicone, and a mixture of these compounds.

The ethylene unsaturated compound includes methylmethacrylate, ethylmethacrylate, propylmethacrylate, isopropylmethacrylate, n-butylmethacrylate, isobutylmethacrylate, t-butylmethacrylate, ethylacrylate, and n-butylacrylate, and a mixture of these compounds.

(ii) The photosensitive monomer uses a mixture of multifunctional acrylate or methacrylate and ethylene unsaturated monomer containing an aromatic ring or halogen.

The ethylene unsaturated monomer containing an aromatic ring or halogen has a high refractive index. When light is applied to a portion of the monomer to polymerize the monomer at the portion and increase the density, the refractive index of the portion is improved compared with that of a portion to which no light is applied. The multifunctional acrylate or multifunctional methacrylate improves the durability by improving the photosensitivity and three-dimensionally cross-linking a polymer.

The ethylene unsaturated monomer containing an aromatic ring or halogen includes allylcarbazole, methacryloyloxyethylcarbazole, acryloylethyloxycarbazole, vinylcarbazole, vinylbenzylcarbazole, vinyloxyethylcarbazole, vinylnaphthalene, naphthylacrylate, tribromophenylacrylate, dibromophenylacrylate, phenoxyethylacrylate, 2,2'-(2-hydroxyethylmethacrylate) (2,3-hydroxyethylmethacrylate) dipheneto, 2,2'-(2-hydroxyethylmethacrylate) hydrogendiphenate, and a mixture of these compounds.

The multifunctional acrylate or multifunctional methacrylate includes trimethylolpropane triacrylate, neopentyl glycol diacrylate, pentaerythritol triacrylate, pentaerythritol tetracrylate, trimethylolpropane trimethacrylate, and a mixture of these compounds.

(iii) The photopolymerization initiator includes organic peroxides such as 2,4,6-trimethylbenzoyldiphenylphosphine oxide, benzyl, benzoin isopropylether, BTTB (3,3',4,4'-tetra (t-butylperoxycarbonyl) benzophenone, benzoyl peroxide, di(t-butylperoxy) isophthalate; imidazole groups such as benzoimidazole and 2-(0-chlorophenyl)4,5-diphenylimidazole dimer; mixtures made by combining compounds such as 2-mercaptobenzothiazole, P-diethylaminobenzophenone, 1H-1,2,4-triazole-3-thiol, and 4-methyl-4H-1,2,4-triazole-3-thiol, and iron-allene complex such as pyrene-cyclopentadienyl-iron-hexafluoroantimonate. Moreover, the sensitizing pigment includes 4-(dicyanomethylene)-2-methyl-6-(P-dimethylaminostyryl)-4H-pyrane, 3,3-carbonylbis(7-diethylaminocoumarin), 2,5-bis(4-diethylaminobenzylidene) cyclopentanone, and 2,6-bis(4-dimethylaminobenzylidene) cyclohexane.

(iv) It is possible to use a thermosetting agent so as to thermoset a thermoset non-photosensitive component.

For example, the thermosetting agent when using a binder containing an epoxy group includes amino acids such as hexamethylenediamine, trimethylhexamethylenediamine, diethylenetriamine, triethylenetetramine, tri(methylamino) hexane, diethylaminopropylamine, menthenediamine, and isophoronediamine; acid hydrides such as methyltetrahydro acid phthalic anhydride and methylhexahydro acid phthalic anhydride; and imidazole groups such as 2-ethyl-4-methylimidazole and 2-phenylimidazole. The thermosetting agent when using a binder having a hydroxyl group includes isocyanate-based thermosetting agents such as COLONEITO EH (trade name) (NIPPON POLYURETHANE Co., Ltd.), COLONEITO 2092 (trade name) (NIPPON POLYURETHANE Co., Ltd.), DULANEITO THA-100 (trade name) (ASAHI CHEMICAL INDUSTRY CO., LTD.), DULANEITO TPA-100 (trade name) (ASAHI CHEMICAL INDUSTRY CO., LTD.), SUMIDALU N3500 (trade name) (SUMITOMO BEYER URETHANE, LTD.), and TAKENEITO D-170N (trade name) (Takeda Chemical Industries, Ltd.) and melamine-based thermosetting agents such as NIKALAKU MW030 (trade name) (SANWA CHEMICAL Co., Ltd.), NIKALAKU MX-40 (trade name) (SANWA CHEMICAL Co., Ltd.), and SAIMELU 325 (trade name) (Mitsui Toatsu Chemicals, Inc.).

(v) Materials of the above binders and photosensitive monomers are dissolved in a solvent to be compounded as a solution according to necessity. For the solvent, a solvent for dissolving a material to be used is selected among tetrahydrofuran, tetrahydropyrane, acetone, methanol, diacetone alcohol, dichloromethane, dichloroethane, ethyl acetate, butyl acetate, dioxane, and toluene.

The compounded solution is fed or set through a method such as injection, dripping, spin coating, knife coating, dipping, or screen printing. When a solution contains a solvent, the solvent is removed through a method such as leaving, heating, or decompressing.

A refractive-index distribution is formed by applying light to a material. A light applying method such as one-light-flux exposure, multiple-light-flux exposure, or interference exposure is used according to the formed refractive-index distribution. A light source is selected among ultraviolet rays, visible rays, and infrared rays according to the photosensitive wave range of a photopolymerization initiator or sensitizer added to a material. The interference exposure uses a coherent light source.

To form a refractive-index distribution, it is possible to heat a material at 40 to 140° C. in addition to the above light applying step and moreover apply light to the entire material. With these steps, it is possible to make unreacted monomers reactive to cure them and destroy unreacted photopolymerization initiator or sensitizer.

As described above, the refractive-index imaging material of the present invention can be cross-linked or polymerized by heating the material or applying light to it and therefore a high durability can be obtained because it uses a compound with reactive groups such as a copolymer having alicyclic or chain epoxy, acrylic denatured silicone, methacrylic denatured silicone, epoxy denatured silicone, and ethylene unsaturated compound including a hydroxyl group at its end in the building block of the copolymer.

The 29th Embodiment

Figure 22A:
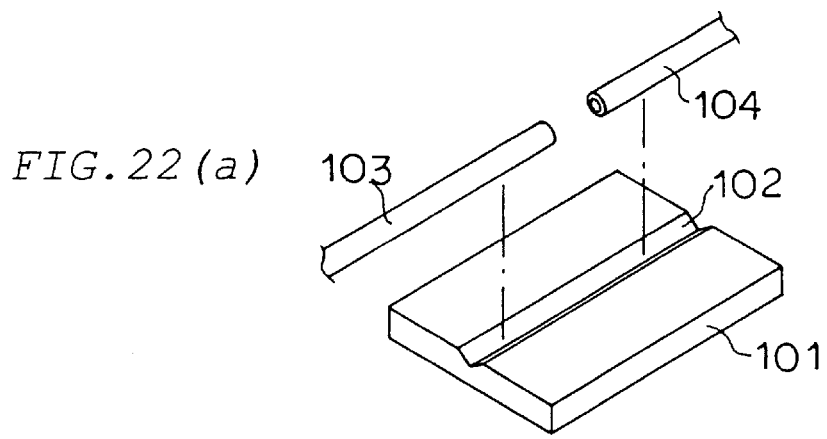
FIG. 22 (*a*) is a perspective view showing the initial state of the optical coupling method of the thirteenth embodiment of the present invention and FIGS. 22 (*b*) to 22 (*d*) are sectional views showing the optical coupling method of the thirteenth embodiment of the present invention.
Figure 22B:
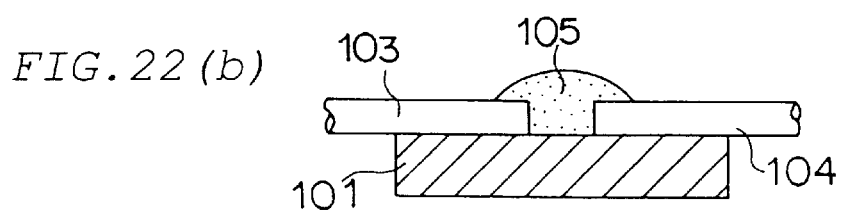
Figure 23:
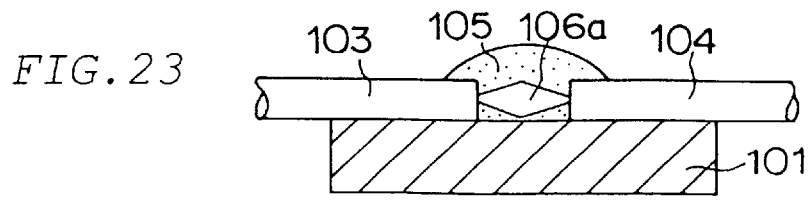
FIG. 23 is a sectional view showing another configuration of the optical coupling method of the thirteenth embodiment of the present invention.

In a refractive index distribution material 105 shown in FIG. 22(b), refractive index distribution is formed simultaneously with irradiation with a light, and the more the light irradiation quantity is, the higher the refractive index becomes. Therefore, as the time of irradiation with a light is made longer, the high refractive index area is liable to become narrower momently, thus requiring to control the time of irradiation with a light.

Figure 22C:
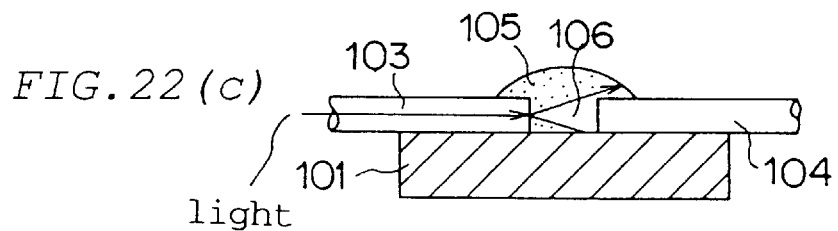
Figure 22D:
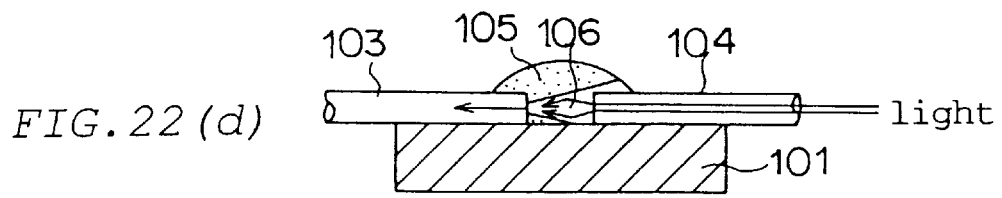
Figure 32:
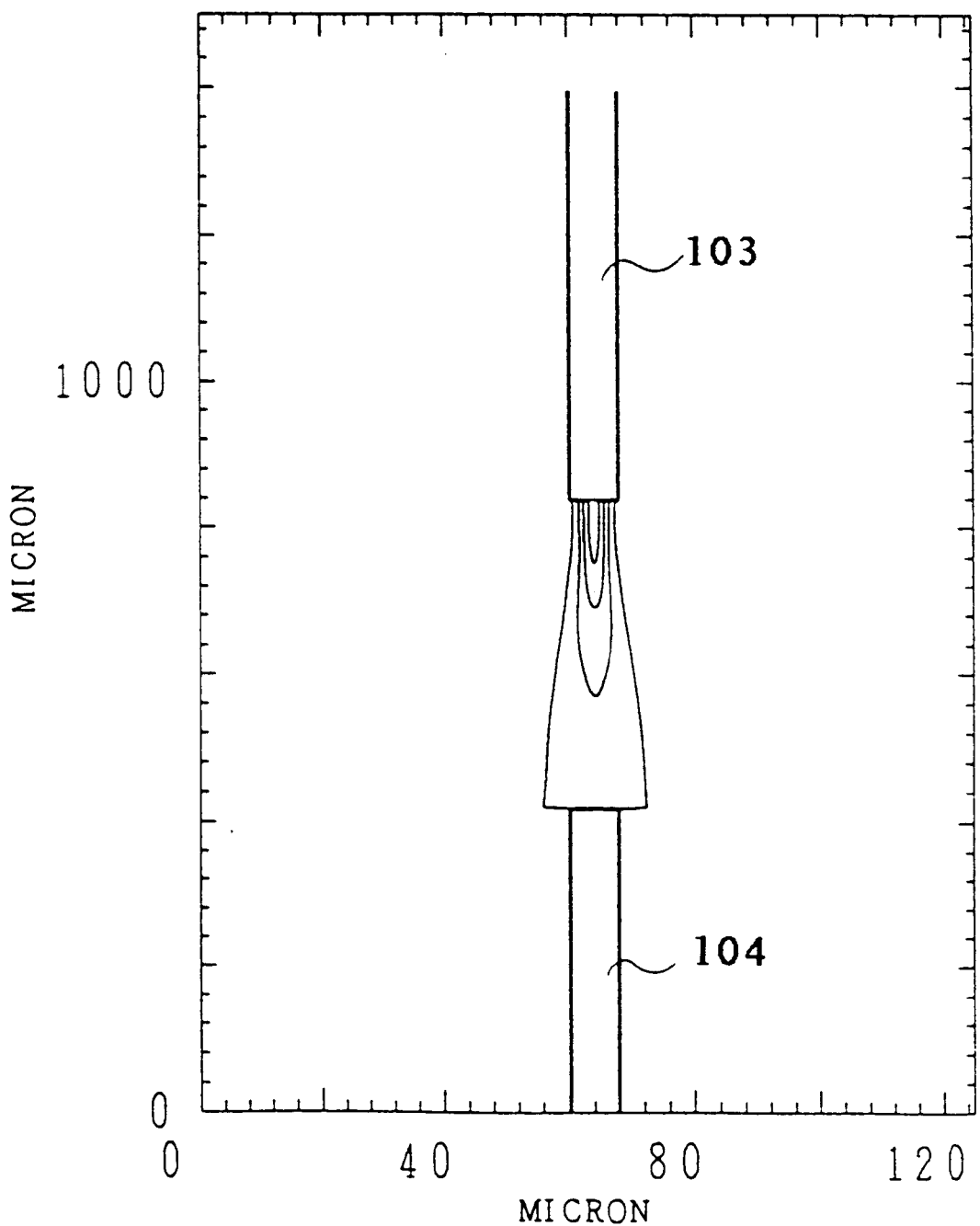
FIG. 32 is a refractive index distribution diagram showing an initial state when optical fibers are coupled optically with each other by a conventional method.
Figure 33:
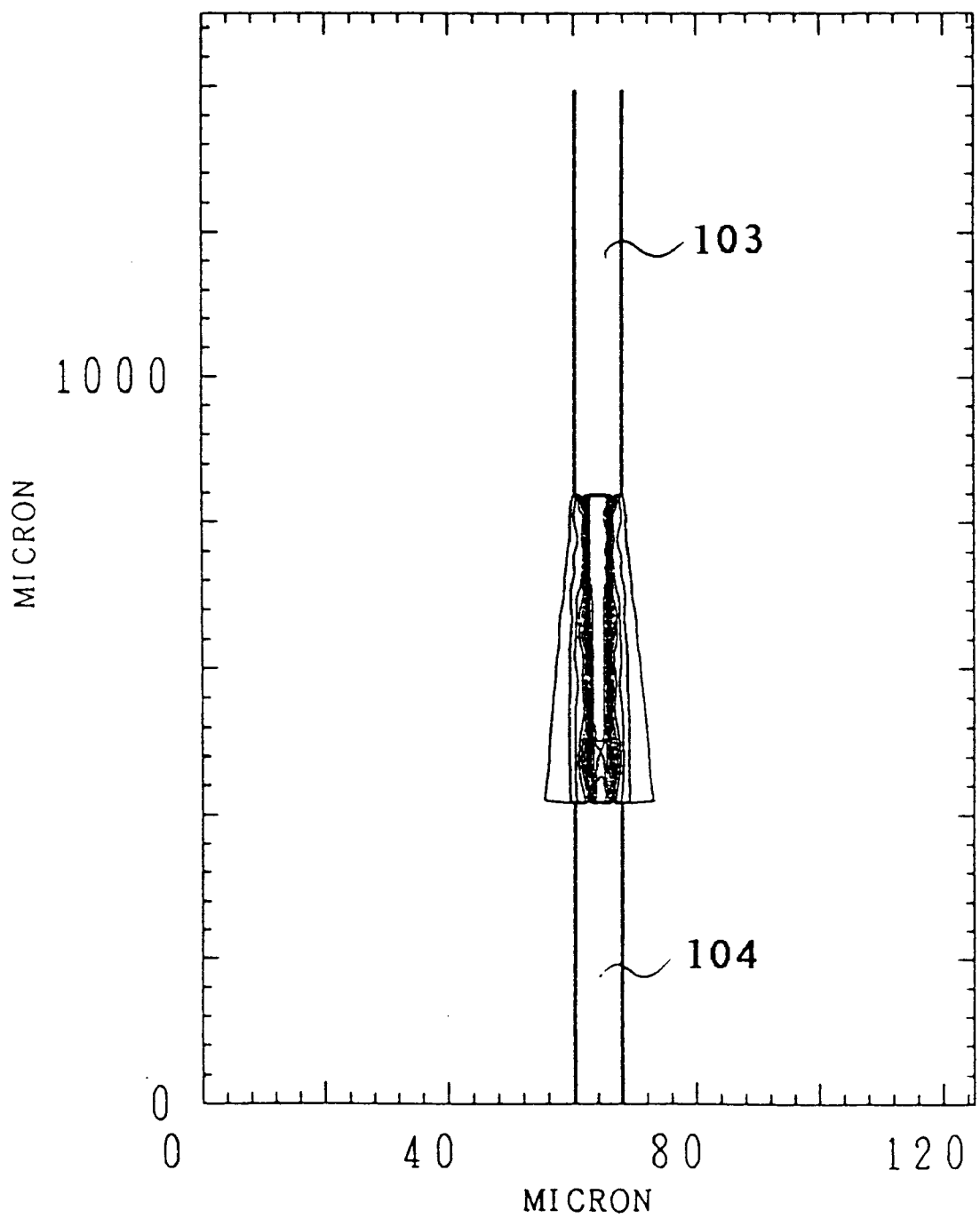
FIG. 33 is a refractive index distribution diagram showing a state that optical coupling between optical fibers has been completed by a conventional method.

For example, when a refractive index distribution forming (imaging) material is irradiated with a light at time of light irradiation as shown in FIG. 22(c) assuming that a refractive index distribution corresponding to a light intensity distribution is formed, a refractive index distribution such as shown in FIG. 32 is formed in the refractive index imaging material at an initial stage, and further, the refractive index distribution changes as shown in FIG. 33 after the lapse of certain period of time. This refractive index distribution was analyzed by using a two-dimensional waveguide analysis method (Papers of Institute of Electronics and Communication Engineers of Japan; J66-C, 10(1983)732). Two optical fibers having a core diameter of 8 µm are coupled optically as an optical element in this case, and further, the distance between optical fibers is set to 400 µm, the optical axis deviation between these cores is 0 µm, the refractive index of the core is set to 1.60, the wavelength of a light irradiated onto the material is set to 488 nm, the average refractive index of the material is set to 1.58, and the refractive index modulation factor of the refractive index imaging material is set to 0.01.

The fact that the refractive index distribution becomes narrower with the lapse of time as described above is related to narrowing of the scope of allowable positional deviation between optical elements, resulting in lowering of the effectiveness of this method.

The present embodiment of the invention provides a method of coupling optical elements and a refractive index distribution forming material capable of forming a refractive index distribution that is not influenced by the time of irradiation with a light for forming the refractive index distribution.

FIG. 34(a) to FIG. 34(d) are sectional views showing a method of coupling optical elements according to a 29th embodiment of the present invention.

Figure 34A:
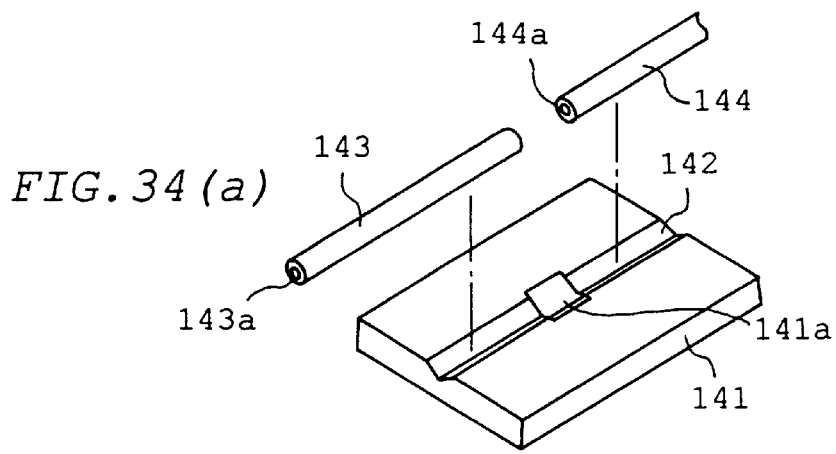
FIG. 34(a) is a perspective view showing a fitting state of an optical fiber used in a first embodiment of the present invention.

First, as shown in FIG. 34(a), a first and a second optical fibers 143 and 144 are fitted into a first V-shaped groove 142 that is formed on a supporting substrate 141 and extends in a straight line, and end faces thereof are made to oppose each other at an interval of 0.1 mm or more. A deep second V-shaped groove 141a for filling a refractive index imaging material 145 described later is formed between the first optical fiber 143 and the second optical fiber 144.

Figure 34B:
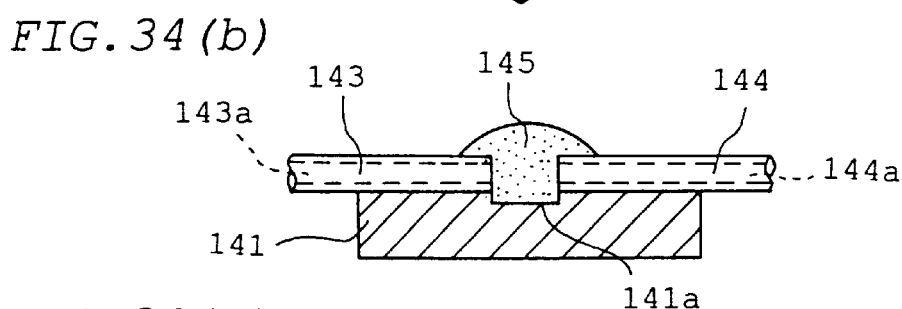
FIG. 34(b) to FIG. 34(e) are sectional views showing a method of optical coupling in a 29th embodiment of the present invention.

Next, the refractive index imaging material 145 having such a property that a latent image of the refractive index distribution is formed by irradiation with light and a refractive index distribution image is not actualized until activation processing thereafter is prepared. Then, as shown in FIG. 34(b), a solution of the refractive index imaging material 145 using a solvent or using no solvent is dropped into a gap between the first and the second optical fibers 143 and 144 and to the perimeter thereof. The solvent is removed after this solution is left as it is for several hours. The refractive index imaging material 145 is prevented from flowing out by means of the second V-shaped groove 141a.

As the refractive index imaging material, there is a material that a catalyzer type functional material having a chemical amplification effect is used and the portion irradiated with a light is activated by heat treatment. The chemical amplification effect is to heat a material (such as acid) generated by light irradiation so as to have it act as a catalyzer, thereby to increase the refractive index of the area irradiated with a light.

Figure 34C:
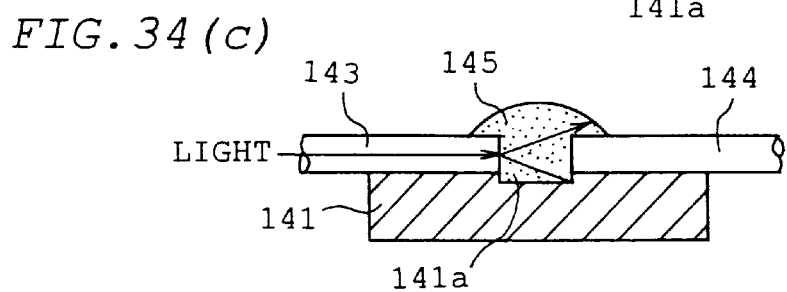

Thereafter, as shown in FIG. 34(c), a light is irradiated from a core 143a of the first optical fiber 143 for instance toward the refractive index imaging material 145. The wavelength of this light is desirable to be a long wavelength in order to make the spread of the light larger, but, to be concrete, it is selected taking a photosensitive wavelength band of the refractive index imaging material 145 into consideration. The refractive index image does not appear at this stage.

Figure 34D:
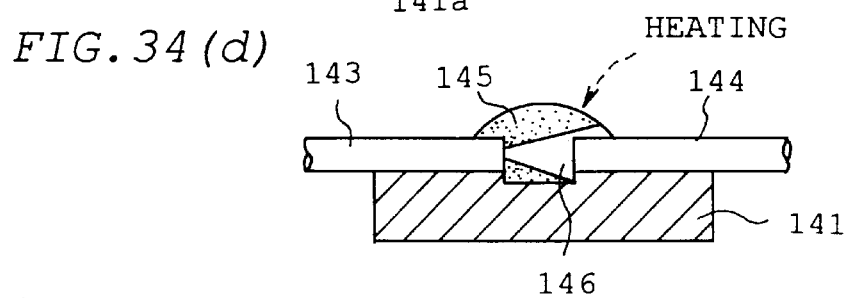

Next, as shown in FIG. 34(d), when the refractive index imaging material 145 is heated, a higher refractive index distribution (image) 146 based on the intensity distribution of the light emitted from the core 143a of the first optical fiber 143 appears in the refractive index imaging material 145. To be concrete, such a cone-shaped higher refractive index distribution (image) 146 that the diameter spreads from the core 143a end of the first optical fiber 143 as shown in FIG. 34(d) is formed.

Through the process described above, the first and the second optical fibers 143 and 144 are coupled optically through the high refractive index image 146 of the refractive index imaging material 145.

Figure 34E:
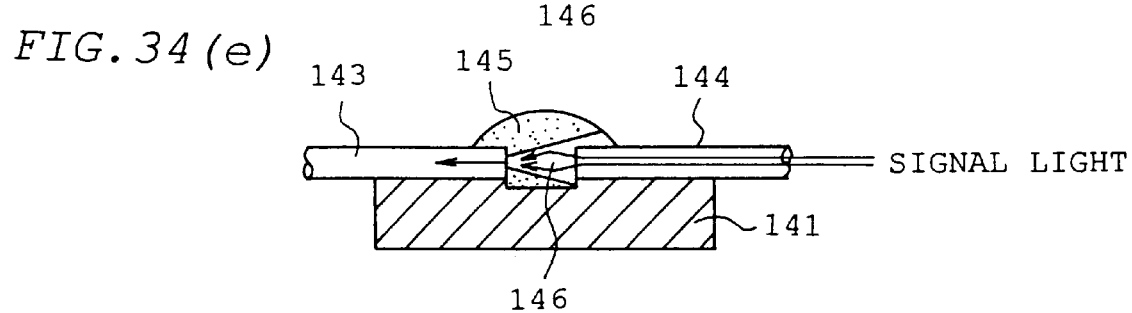

Then, as shown in FIG. 34(e), a signal light is emitted toward the first optical fiber 143 from a core 144a of the second optical fiber 144 in contact with a wider end portion of the cone type high refractive index image 146, the signal light is condensed to the most restricted portion of the optical fiber 143 and is made incident to the core 143a of the first optical fiber 143.

As a result, even wh n the alignment accuracy between the first optical fiber 143 and the second optical fiber 144 is rough, a high optical coupling efficiency is obtainable by the condensing function of the high refractive index image 146.

Besides, it is possible to provide a high isolation property by expanding the gap between the end faces of the first and the second optical fibers 143 and 144 so as to make the optical coupler length longer.

Next, the result obtained by analysis using a two-dimensional waveguide analysis method (Papers of Institute of Electronics and Communication Engineers in Japan; J66-C, 10(1983)732) using Fourier transform.

Figure 35:
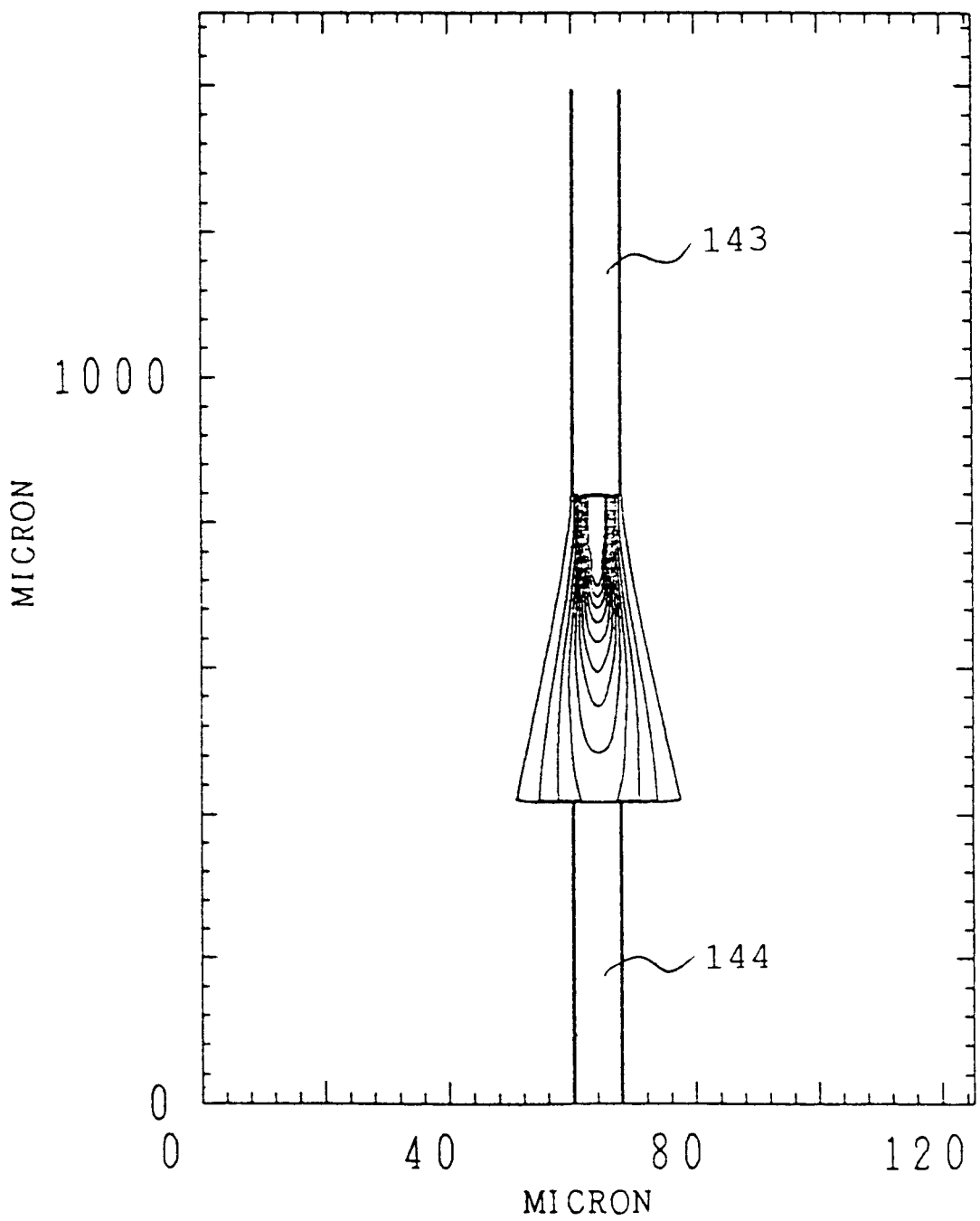
FIG. 35 is a refractive index distribution diagram between optical fibers coupled according to the 29th embodiment of the present invention.

When it is assumed that a refractive index distribution corresponding to a light irradiation intensity distribution is formed in the refractive index imaging material 145, a refractive index distribution such as shown in FIG. 35 has been formed after a light for forming a high refractive index image is irradiated from the core 143a of the first optical fiber 143.

In this analysis example, it is assumed that the diameters of the cores 143a and 144a of the first and the second optical fibers 143 and 144 are 8 $\mu$m, respectively, the distance between cores is 400 $\mu$m, the optical axis deviation of the optical fibers 143 and 144 between cores is 0 $\mu$m, the refractive index of the core is 1.60, the refractive index of cladding is 1.58, the wavelength of the imaging light irradiated to the refractive index imaging material 145 is 488 nm (Ar laser beam), the irradiation time of the imaging light is 10 minutes, the refractive index of the refractive index imaging material 145 around the high refractive index image 146 is 1.58, and the refractive index difference between the high refractive index image and therearound is 0.01.

As it is apparent from FIG. 35, it has been found that the refractive index distribution does not change even when the irradiation period of time of the imaging light is long. This is because of such a reason that the higher refractive index distribution (image) is not formed simultaneously with irradiation with a light, but appears by activation by heat treatment after irradiation with a light.

Since optical elements or devices are coupled optically by a self-alignment system as described above, the tolerance for alignment when the optical element device is fixed in the first place is large, and high accuracy becomes no longer required, thus making coupling easier. Further, a light is condensed in accordance with the formed refractive index distribution, and the coupling efficiency between optical elements is improved.

An allowable error on the alignment between optical elements formed as described above becomes larger.

Now, in the refractive index imaging material, the refractive index is increased very slightly sometimes at time of irradiation with a light in a specific wavelength band.

The 30th Embodiment

FIGS. 36(a) to 36(d) are sectional views for explaining a method of coupling optical fibers optically with each other using a cylinder.

Figure 36A:
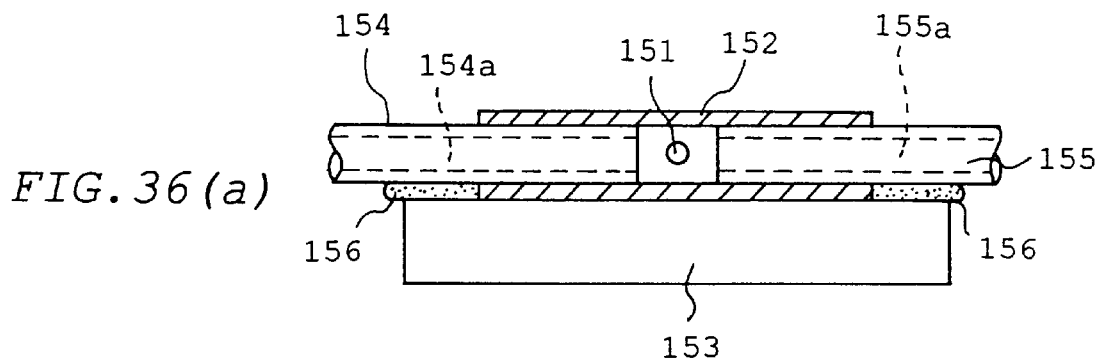
FIG. 36(a) to FIG. 36(d) are sectional views showing a method of optical coupling between optical elements according to a 30th embodiment of the present invention.

First, as shown in FIG. 36(a), after a glass cylinder 152 of 145 $\mu$m in diameter having a transverse hole 151 through a central wall is fitted to a supporting substrate 153, a first and a second optical fibers 154 and 155 have been inserted into the glass cylinder 152 from both ends thereof. The diameter of claddings of the first and the second optical fibers are 125 $\mu$m, respectively, and the diameters of cores thereof are 10 $\mu$m, respectively.

The first and the second optical fibers 154 and 155 are arranged so as not to overlap with the transverse hole 151 of the glass cylinder 152, and the gap between the end faces thereof is set to 400 $\mu$m at the same time. The first and the second optical fibers 154 and 155 were fixed to a supporting substrate 153 with adhesives in this state.

Figure 36B:
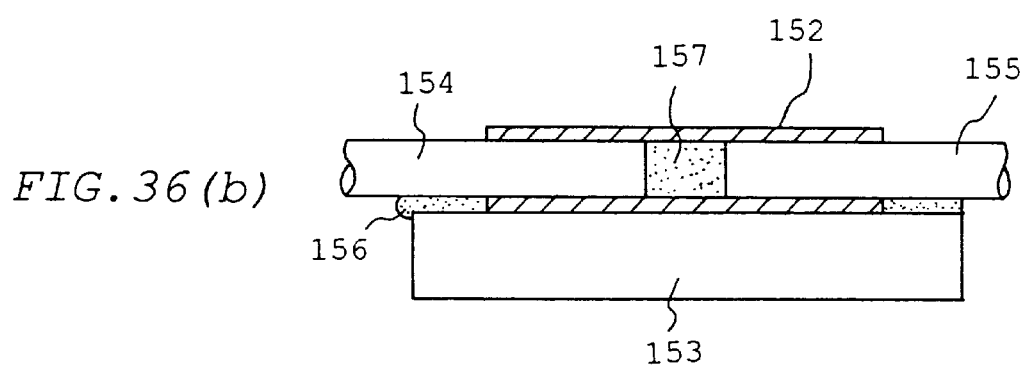

Thereafter, as shown in FIG. 36(b), a refractive index imaging material 157 dissolved in a solvent was filled in a gap between the first optical fiber 154 and the second optical fiber 155 through the transverse hole 151 of the glass cylinder 152 and dried by leaving it as it is. The compositions forming the refractive index imaging material 157 and the weight thereof are shown in Table 1. Besides, dichloromethane and tetrahydrofuran are solvents in Table 6.

TABLE 6

| MATERIAL | WEIGHT (g) |
|---|---|
| epoxy (EHPE-3150, made by DAICEL CHEMICAL) | 1.5 |
| epoxy (2021P, made by DAICEL CHEMICAL) | 0.5 |
| iron-allene complex | 0.01 |
| dichloromethane | 1.0 |
| tetrahydrofuran | 1.0 |

Next, when the second optical fiber 155 was connected to a light intensity measuring instrument (not shown), and further a laser light having a wavelength 1.3 $\mu$m and a light intensity of 200 $\mu$W was irradiated toward the refractive index imaging material 157 through the first optical fiber 154 in a state shown in FIG. 36(b), it was found that the intensity of the light that was incident to the light intensity measuring instrument through the second optical fiber 155 was 50 $\mu$W and $I/I_0=0.25$.

The measured value of the light intensity with the light intensity measuring instrument is the mean of an upper limit value and a lower limit value obtained when measured for approximately one minute (the same is applied in the description hereinafter).

Figure 36C:
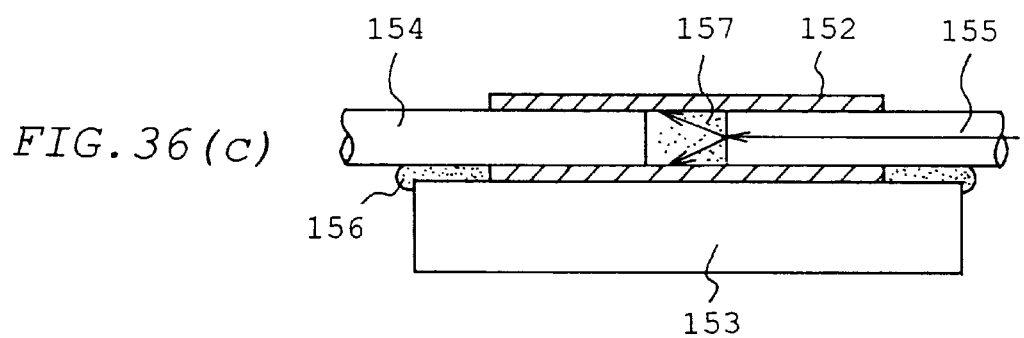
Figure 36D:
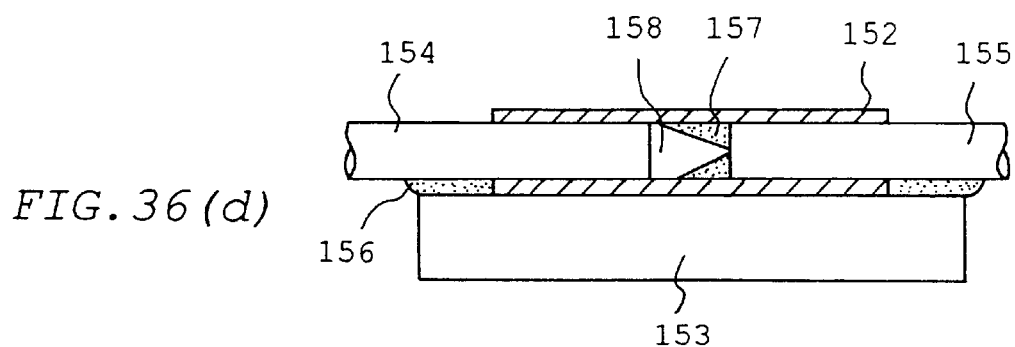

Next, the light intensity measuring instrument was removed from the second optical fiber 155, and the refractive index imaging material 157 was irradiated with radiation having a wavelength of 500 nm through the second optical fiber 155 for approximately one minute (FIG. 36(c)). Then, as shown in FIG. 36(d), the refractive index imaging material 157 is heated at 80° C. for 30 minutes, and a higher refractive index image 158 is formed in the area irradiated with a light.

Thereafter, when the light intensity measuring instrument was connected to the second optical fiber 155, and a laser light having a wavelength of 1.3 $\mu$m and a light intensity of 200 $\mu$W was emitted toward the refractive index imaging material 157 through the first optical fiber 154, the intensity of the light incident on the light intensity measuring instrument through the second optical fiber 155 was 100 $\mu$W and $I/I_0=0.5$.

It has been confirmed from the foregoing that the optical coupling intensity from the first optical fiber 154 to the second optical fiber 155 has been increased twice by irradiation with radiation (500 nm light) and heating of the chemical amplification type refractive index imaging material 157. Further, when the optical coupling efficiency approximately 50% was obtained.

In the present embodiment, the high refractive index image 158 was neither formed only by irradiation with radiation, but did not appear until after the heat treatment. The high refractive index image (distribution) 158 did not become narrower with the lapse of time by the irradiation with radiation.

The 31st Embodiment

In the present embodiment, optical coupling of a waveguide with an optical fiber will be described.

Figure 37A:
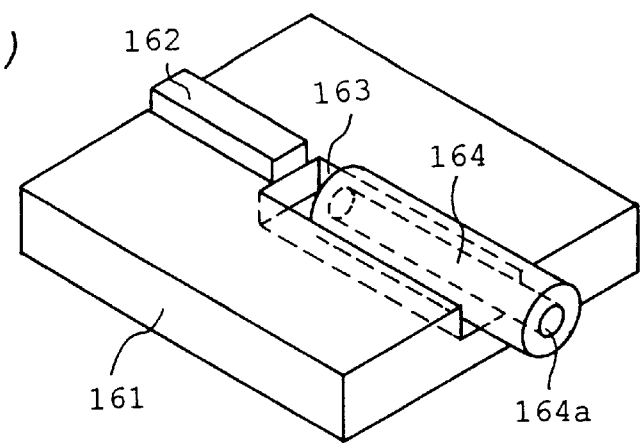
FIG. 37(a) to FIG. 37(c) are perspective views showing a method of optical coupling between optical elements according to a 31st embodiment of the present invention.

As shown in FIG. 37(a), a waveguide 162 in a stripe form is formed on a supporting body (substrate) 161 made of polyimide, and a U-shaped groove 163 for fitting an optical fiber is formed in front of an end portion of the waveguide 162 in the supporting body 161 by excimer laser abrasion. The U-shaped groove 163 is formed in a size of 125 $\mu$m wide, 10 mm long and 70 $\mu$m depth.

In order to couple the waveguide 162 optically with an optical fiber 164, the optical fiber 164 is fitted into the U-shaped groove 163 of the supporting body 161, and the optical fiber 164 is fixed to the supporting body 161 with adhesives (not shown) in that state. In this case, a gap of 400 $\mu$m exists between the end portion of the optical fiber 164 and the end portion of the waveguide 162.

Figure 37B:
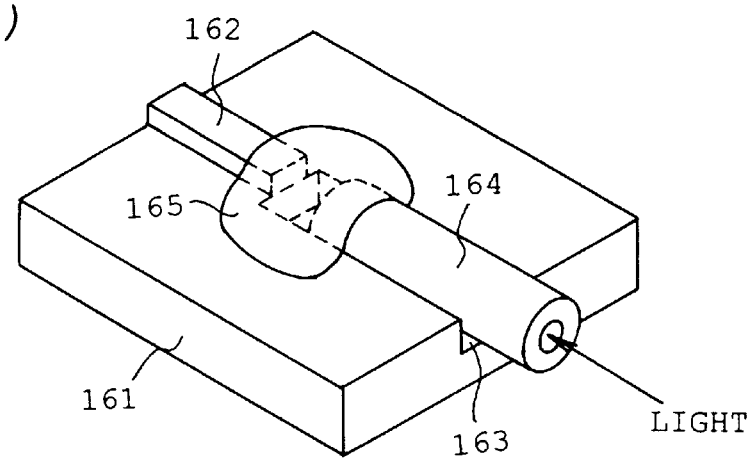

Next, as shown in FIG. 37(b), after a chemical amplification type refractive index distribution forming (imaging) material 165 dissolved in a solvent was filled in a gap between the end portion of the optical fiber 164 and the end portion of the waveguide 162, the refractive index imaging material 165 was left as it is so as to remove the solvent. The refractive index imaging material 165 is composed of composition such as shown in Table 7. Dichloromethane and tetrahydrofuran are solvents in Table 7.

TABLE 7

| MATERIAL | WEIGHT (g) |
|---|---|
| poly (glycyzilmethacrylate) | 1.5 |
| epoxy (2021P, made by DAICEL CHEMICAL) | 0.5 |
| diarylindonium salt | 0.01 |
| dichloromethane | 1.0 |
| tetrahydrofuran | 1.0 |

Next, when the optical fiber 164 was connected to the light intensity measuring instrument (not shown), and further, a laser light having a wavelength of 1.3 $\mu$m and a light intensity of 200 $\mu$W was emitted toward the refractive index imaging material 165 through the waveguide 162, the intensity of the light measured by the light intensity measuring instrument after passing through a core 164a of the optical fiber 164 was 40 $\mu$W and $I/I_0=0.2$.

Figure 37C:
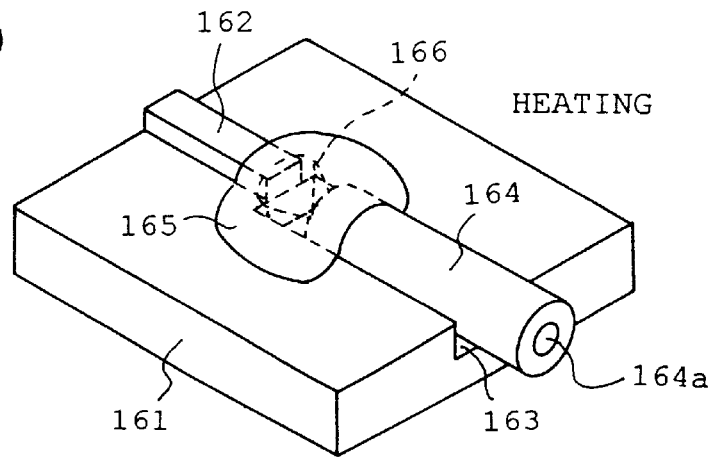

Thereafter, the light intensity measuring instrument was removed from the optical fiber 164, and radiation having a wavelength of 500 nm was emitted toward the refractive index imaging material 165 for approximately one minute through the optical fiber 164. Then, when the refractive index imaging material 165 was heated at 80° C. for 30 minutes, a cone-shaped higher refractive index distribution (image) 166 appeared in a portion irradiated with radiation (wavelength $\lambda$=500 nm) in the refractive index imaging material 165 as shown in FIG. 37(c).

Next, the light intensity measuring instrument was connected to the optical fiber 164, and furthermore, the intensity of the light obtained by making a laser light having a wavelength of 1.3 $\mu$m and a light intensity of 200 $\mu$W incident on the light intensity measuring instrument through the waveguide 162, the high refractive index image 166 and the optical fiber 164 was 80 $\mu$W and $I/I_o=0.4$.

It has been confirmed from the foregoing that the optical coupling intensity from the waveguide 162 to the optical fiber 164 has been increased twice by irradiating the chemical amplification type refractive index imaging material 165 with radiation ($\lambda$=500 nm) and heating the material 165 thereafter. Further, the optical coupling efficiency thereof is approximately 40%.

In the present embodiment, the high refractive index image 166 is neither formed by irradiation with radiation only, but did not appear until after heat treatment. The high refractive index image (distribution) 166 did not become narrower by irradiation with radiation with the lapse of time.

The 32nd Embodiment

In the present embodiment, optical coupling between an optical fiber and a semiconductor laser will be described with reference to FIGS. 38(a) and 38(b).

Figure 38A:
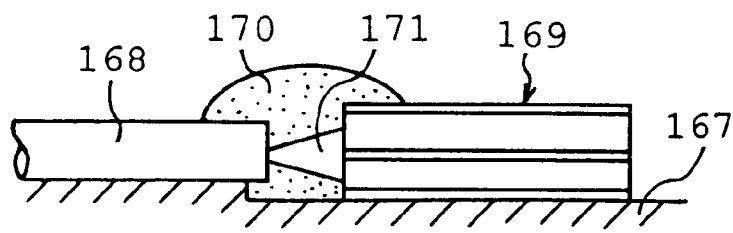
FIG. 38(a) and FIG. 38(b) are sectional views showing a method of optical coupling between optical elements according to a 32nd embodiment of the present invention.
Figure 38B:
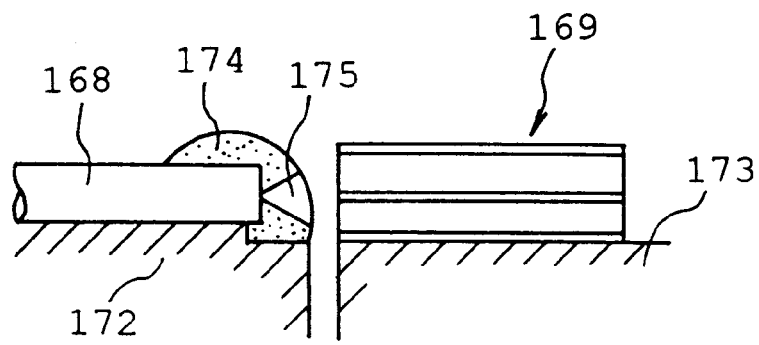

When an optical fiber and a semiconductor laser are coupled optically with each other, an optical fiber 168 and a semiconductor laser 169 are placed on a supporting substrate 167, and a refractive index imaging material 170 is fed therebetween as shown in FIG. 38(a). Thereafter, the refractive index imaging material 170 is irradiated with a light for high refractive index imaging from the optical fiber 168 thereby to form a latent image, and then the area irradiated with a light is activated by heat treatment thereby to form a cone-shaped high refractive index image 171. With this, the light emitted from the end face of the semiconductor laser 169 is condensed by the high refractive index image 171 and is made incident to the core of the optical fiber 168.

Next, a case that the semiconductor laser 169 and the optical fiber 168 are coupled optically with each other through space will be described with reference to FIG. 38(b).

The optical fiber 168 is placed or fixed on a supporting substrate 172 first and a refractive index imaging material 174 is fed to the point thereof, then the refractive index imaging material 174 is irradiated with a light for forming higher refractive index imaging thereafter through the optical fiber 168, and then a cone-shaped higher refractive index image 175 is formed by heat treatment. Then, when a light is outputted from the semiconductor laser 169 toward the high refractive index image 175, the light is converged by the high refractive index image 175 and incident to the optical fiber 168.

In this case, it is sufficient that the semiconductor laser 169 is fitted so that the light strikes the higher refractive index image 175 that is wider than the core of the optical fiber, and the margin for alignment is increased.

The 33rd Embodiment

Next, the refractive index imaging material will be described.

As a refractive index imaging material of the present invention, a material in which an effective refractive index distribution is not formed until activation processing is made after irradiation with a light is conducted.

For example, a catalyzer type functional material having a chemical amplification effect is used. The chemical amplification effect is to generate an active material from a material having a catalyzer effect by irradiation with a light, and then to have these active material and functional material react on each other by heat treatment so as to increase the refractive index distribution. The material having a catalyzer effect is selected in accordance with the functional material used.

As the functional material, there is a compound having a functional group of cationic polymerization property such as a compound having an epoxy group. For example, as the compound having an epoxy group, it is possible to use 3,4-epoxycyclohexylmethyl-3,4-epoxycyclohexanecarboxylate, ERL-4299 (made by UCC), ERL-4092 (made by UCC), 2021P (made by DAICEL CHEMICAL), EHPE-3150 (DAICEL UCB Co., Ltd.), EPOLAITO 4000, EPOLAITO 100MF, EPOLAITO 80MF, EPOLAITO 1600, EPOLAITO 1500NP, EPOLAITO 400P, EPOLAITO 400E, EPOLAITO M-1230 (KYOEISHA YUSHI KAGAKUKOGYO Co., Ltd.), poly (glycidyilmethacrylate), poly(epitiopropylmethacrylate), and a mixture or copolymer of these compounds. Further, as a compound having a functional group of cationic polymerization property, there are novolak resin, a compound having a botoxycarbonyl group, maleimide-styrene copolymer, copolymerized polymer of P-vinylphenol and p-vinylbenzilacetate, poly(p-trimethylsiloxystyrene), poly (4,5-bis(trimethylsilyl)phthalaldehyde) or the like.

On the other hand, as a material having a catalyzer effect, those that generate acid with high efficiency with a light irradiation are recommendable, and there are diazonium salt, diaryliodonium salt, triarylselenonium salt, silanol/aluminium complex, sulfonate, imidesulfonate groups, benzointosylate, o-nitrobenziltosylate, iron-allene complex or the like.

Furthermore, other reactive monomer, binder polymer, a photopolymerization initiator or the like may be added as occasion demands.

The photopolymerization initiator includes organic peroxides such as 2,4,6-trimethylbenzoyldiphenylphosphine oxide, benzil, benzoin isopropylether, BTTB (3,3',4,4'-tetra (t-butylperoxycarbonyl) benzophenone, benzoyl peroxide, di(t-butylperoxy) isophthalate; imidazole groups such as benzoimidazole and 2(o-chlorophenyl)4,5-diphenylimidazole dimer; mixtures made by combining compounds such as 2-mercaptobenzothiazole, p-diethylaminobenzophenone, 1H-1,2,4-triazole-3-thiol, and 4-methyl-4H-1,2,4-triazole-3-thiol, and 4-methyl-4H-1,2,4-triazole-3-thiol, and iron-allene complex such as pyrene-cyclopentadienyl-iron-hexafluoroantimonate.

These materials are dissolved in solvents and adjusted as solutions as occasion arises. As the solvent, a solvent that dissolves a material to be used is selected among tetrahydrofuran, tetrahydropyrane, acetone, methanol, dicetone alcohol, dichloromethane, dichloroethane, ethyl acetate, butyl acetate, dioxane, and toluene.

The refractive index imaging material composed of a material having such a catalyzer effect and a functional material is applied or processed with activation processing by heating at a temperature of 40 to 150° C. after irradiation with a light.

Besides, the refractive index imaging materials shown in the present embodiment may also be used when an element or device having a refractive index distribution such as a refractive index distribution type hologram is manufactured.

The 34th Embodiment

In the optical device formed by providing a refractive index material or photosensitive material on all area of the optical device or a partial area thereof including a light emitting end and causing a change of refractive index of the refractive index material or the photosensitive material by light emitted from an emitting end of the optical device, the refractive index material or the photosensitive material comprises a chemical amplification type material. And the optical device is an optical fiber, an LD, or waveguide.

In optical coupling method, by providing a refractive index material or photosensitive material on all area of the optical device or a partial area thereof including a light emitting end and forming a refractive index distribution in the refractive index material or the photosensitive material by light emitted from an emitting end of the optical device owing to a self-focusing effect of the emitted light, the refractive index material or the photosensitive material comprises a chemical amplification type material. And the optical device is an optical fiber, an LD, or a waveguide.

In the optical coupling module chracterized by providing a refractive index material or photosensitive material on all area of a plurality of optical devices or a partial area thereof including a light emitting end and forming a refractive index distribution in the refractive index material or the photosensitive material by light emitted from an emitting end of the optical device owing to a self-focusing effect of the emitted light, the refractive index material or the photosensitive material comprises a chemical amplification type material. And the optical devices are an optical fiber, an LD, a waveguide, or a PD. And the optical devices are fixed onto a substrate worked to form raised portion.

In the self-aligned optical coupling method, by being a self-aligned optical coupling for coupling of optical devices by situating a refractive index material or a photosensitive material in the entirety or part of a area between a plurality of optical devices and irradiating the refractive index material or the photosensitive material with light from the plurality of optical devices to impart a refractive index distribution, the emitted light from one of the devices is drawn by the refractive index distribution formed by emitted light from another of the devices, and this forms a refractive index distribution to form a coupling path between the devices, and the refractive index material or the photosensitive material comprises a chemical amplification type material.

In the optical coupling method, characterized by being an optical coupling for coupling of optical devices by situating a refractive index material or a photosensitive material in the entirety or part of an area between a plurality of optical devices and irradiating the refractive index material or the photosensitive material with light from the optical devices to impart a refractive index distribution, a refractive index distribution is formed by emitted light from an optical device with a small mode field size at the emitting end to form optical coupling between the devices, and the refractive index material or the photosensitive material comprises a chemical amplification type material. The optical device with a small mode field size at the emitting end is an optical fiber or an LD.

In the optical coupling method, by being an optical coupling for coupling of optical devices by situating a refractive index material or a photosensitive material in the entirety or part of an area between a plurality of optical devices and irradiating the refractive index material or the photosensitive material with light from the optical devices to import a refractive index distribution, whereby a refractive index distribution is formed by emitted light from an optical device with a small mode field size owing to a self-focusing effect of the emitted light, the refractive index material or the photosensitive material comprises a chemical amplification type material.

In the optical coupling method, by being an optical for coupling of optical devices by situating a refractive index material or a photosensitive material in the entirety or part of an area between a plurality of optical devices and irradiating the refractive index material or the photosensitive material with light from the plurality of optical devices to impart a refractlve index distribution, the wavelength of emitted light of at least 2 or more of the optical devices are differnt, and the refractive index material or the photosensitive material comprises a chemical amplification type material. In this case, all of the wavelengths of the emitted light of differing wave length are in the sensitivity range of a sensitizing agent of the refractive index material or the photosensitive material. More, in the case, at least one of the wavelength of the emitted light of the differing wavelength is in the sensitivity range of a sensitizing agent of the refractive index material or the photosensitive material, and the other wavelengths are outside the sensitivity range of a sensitizing agent of the refractive index material or the photosensitive material.

In the method of producing an optical waveguide characterized by irradiating on a refractive index material or a photosensitive materiall whose refractive index changes with light irradiation, light of a wavelength which changes its refractive index, and forming an optical waveguide or refractive index distribution while inducing self-focusing, the refractive index material or the photosensitive material comprises a chemical amplification type material. The photosensitive material is insolubilized with the light irradiation.

In the optical coupling method characterized by situating a refractive index material or a photosensitive material whose refractive index changes with light irradiation in the entirety or part of an area between a plurality of optical devices, irradiating the refractive index material or the photosensitive material with light from one or the plurality of the optical devices of a wave length at which its refractive index changes, and using an optical waveguide or refractive index distribution formed while inducing self-focusing, to acomlish optical coupling between the optical device, the refractive index material or the photosensitive material comprises a chemical amplification type material. The photosensitive material is insolubilized with the light irradiation.

In the above methods, the opical device is selected from optical waveguides, optical fibers, semiconductor laser(LD)s, light emmiting diode(LED)s, photodiode(PD)s, lenses, holograms, prisms, mirrors, pinholes, slits, and gratings.

In the above methods, a mirror, grating, hologram, prism, lens, optical waveguide, pinhole, optical fiber or slit is situated in the entirety or at least part of the region through which the light passes.

In the above methods, after light irradiation the soluble portion of the material is removed by development to form a waveguide pattern.

In the above methods, after the refractive index distribution and or pattern is imparted to the refractive index material or the photosensitive material, said material is cured by light irradiation and/or heating for stabilization and/or inactivation.

In the above methods, the light used for irradiation on the refractive index material or the photosensitive material is light generated by the optical device itself.

In the above methods, the light used for irradiation on the refractive index material or the photosensitive material is light introduced to the optical device from the outside.

In the method of producing an optical device characterized by irradiating light on a refractive index material or photosensitive material whose refractive index changes with light irradiation, and forming a refractive index distribution while inducing self-focusing, the refractive index material or the photosensitive material comprises a chemical amplification type material. The photosensitive material is cured and insolubilized with the light irradiation.

In the method of producing an optical device characterized in that a refractive index material or a photosensitive material produces a refractive index change by superimposing light of 2 or wavelengths which is larger than the sum of the refractive index changes produced by the light of each wavelength anlone, and upon superimposing the light of 2 or more wavelength an optical device is formed in the region lncluding the section of the superimposition of the light, the refractive index material or the photosensitive material comprises a chemical amplification type material.

In the optical coupling method characterized by situating a refractive index material or a photosensitive material in the entirety or part of an area between a plurality of optical devices and irradiating the refractive index material or the photosensitive material with light from one or the plurality of the optical devices to impart a refractive index distribution, so that in the optical coupling method which accomplishes coupling between the optical devices, the refractive index material or the photosensitive material produces a refractive index change by superimposing light of 2 or more wavelengths which is larger than the sum of the refractive index changes produced by the light of each wavelength alone, and upon superimposing the light of 2 or more wavelengths a waveguide or refractive index distribution is formed in the region including the section of superimposit ion of the light, and the light of at least 2 or more wavelengths is light emitted from the optical devices, so that the optical coupling between the optical device is achieved by the formed optical waveguide or refractive index distribution, the refractive index material or the photosensitive material comprises a chemical amplification type material. The photosensitive material is cured and insolubilized with the superimposing light irradiation.

The Other Embodiments

Optical coupling between optical fibers, optical coupling between an optical fiber and a waveguide and optical coupling between an optical fiber and a semiconductor laser have been described in the above-mentioned embodiments, but the tolerance limit is extended on initial optical axis deviation or angular divergence according to the methods described above in all of the cases when optical coupling is made by selecting any of optical elements such as optical fiber, waveguide, lens, diffraction grating, light receiving element such as PD (photo diode) PD and light emitting element such as LD (lase diode), LED (light emitting diode).

The material of the supporting body for supporting the optical elements, silicon quartz, glass, lithium niobate or the like may be used, but it is desirable to use a polymer material such as polyimide, polycarbonate, acrylic resin and photosensitive resin taking workability and consistency of the refractive index with the refractive index imaging material into consideration. Further, as a method of forming a groove formed in the supporting body, laser abrasion processing using excimer laser or the like or reactive ion etching with oxygen plasma or the like may also be used taking productivity into consideration. Further, the groove may be formed by photolithography using photosensitive resin as the material of the supporting body. Besides, a groove for filling the refractive index imaging material may be formed in the supporting body.

The refractive index distribution of the refractive index imaging material is formed by irradiating the refractive index imaging material with a light and then heating the material. A method of irradiation with a light such as one beam exposure, multiple beam exposure and interference exposure is used in accordance with the refractive index distribution to be produced. A light source for forming the refractive index distribution is selected among ultraviolet radiation, visible radiation and infrared radiation corresponding to a photosensitive wavelength band of the photopolymerization initiator and the sensitizer added to the material. In the case of interference exposure, a coherent light source is employed.

Besides, the refractive index imaging materials in respective embodiments described above are dissolved in solvents, and these solvents are fed thereafter to optical elements or the like by an injection method, a dip method, a spin-coating method and other methods.

What is claimed is:

1. A method of forming a mirror in a waveguide, comprising the steps of:

forming a layer constituting a waveguide on a substrate; and forming a mirror-finished surface at a boundary between a portion of said waveguide irradiated with radiation and a non-irradiated portion of said waveguide by obliquely irradiating the layer constituting the waveguide with radiation.

2. The method of forming a mirror in a waveguide according to claim 1, wherein said waveguide is composed of a photosensitive material, and a process of removing either an area irradiated with said radiation or an area that is not irradiated with said radiation by solvent is included.

3. The method of forming a mirror in a waveguide according to claim 1, wherein said waveguide is composed of a refractive index imaging material in which a refractive index distribution is formed by irradiation with said radiation.

4. The method of forming a mirror in a waveguide according to claim 1, wherein said radiation is either YAG laser or excimer laser.

5. The method of forming a mirror in a waveguide according to claim 1, wherein said waveguide is composed of a refractive index imaging material in which a refractive index is increased by heating an area irradiated with said radiation.

6. The method of forming a mirror in a waveguide according to claim 5, wherein said refractive index imaging material includes an alicyclic compound or a chain compound having an epoxy group, an ethylene unsaturated compound containing aromatic ring or halogen, multi-functional acrylate or multi-functional methacrylate, and a photopolymerization initiator.

7. The method of forming a mirror in a waveguide according to claim 5, wherein said refractive index imaging material includes organic modified silicone, an ethylenically unsaturated compound containing aromatic ring or halogen, multi-functional acrylate or multi-functional methacrylate, and a photopolymerization initiator.

8. The method of forming a mirror in a waveguide according to claim 5, wherein said refractive index imaging material includes a catalyzer composition comprising a material having a catalyzer effect and a catalyzer functional material, and, after generating an active material by irradiating said material having the catalyzer effect with a light, said active material and said catalyzer functional material are made to react on each other so as to increase the refractive index distribution of the area irradiated with a light.

* * * * *